(12) United States Patent  
Kishimoto et al.

(10) Patent No.: US 8,222,853 B2  
(45) Date of Patent: Jul. 17, 2012

(54) SERVO MOTOR CONTROL APPARATUS AND CONTROL METHOD

(75) Inventors: Kenichi Kishimoto, Osaka (JP); Tooru Tazawa, Osaka (JP)

(73) Assignee: Panasonic Corporation, Osaka (JP)

( * ) Notice: Subject to any disclaimer, the term of this patent is extended or adjusted under 35 U.S.C. 154(b) by 567 days.

(21) Appl. No.: 12/522,408

(22) PCT Filed: Jan. 11, 2008

(86) PCT No.: PCT/JP2008/050230  
§ 371 (c)(1),  
(2), (4) Date: Jul. 8, 2009

(87) PCT Pub. No.: WO2008/087893  
PCT Pub. Date: Jul. 24, 2008

(65) Prior Publication Data  
US 2010/0052593 A1    Mar. 4, 2010

(30) Foreign Application Priority Data

Jan. 17, 2007 (JP) ................................ 2007-007747  
Feb. 5, 2007 (JP) ................................ 2007-025020  
Apr. 2, 2007 (JP) ................................ 2007-096250

(51) Int. Cl.  
*G05B 1/06* (2006.01)

(52) U.S. Cl. ......................... 318/638; 318/602; 318/603

(58) Field of Classification Search .................. 318/638, 318/602, 603, 400.38, 400.39, 400.4  
See application file for complete search history.

(56) References Cited

U.S. PATENT DOCUMENTS 5,475,291 A    12/1995    Yoshida et al.

FOREIGN PATENT DOCUMENTS

| JP | 165550 A | 6/1994 |
|---|---|---|
| JP | 6-319284 A | 11/1994 |
| JP | 2003-52188 A | 2/2003 |
| JP | 2003052188 A | 2/2003 |
| JP | 2003189653 A | 7/2003 |
| JP | 2005006418 A | 1/2005 |
| JP | 2005332213 A | 12/2005 |

OTHER PUBLICATIONS

International Search Report for PCT/JP2008/050230, dated Apr. 1, 2008.  
English translation of the Informal Comments on the Written Opinion of the ISA, received by the International Bureau on Mar. 30, 2009.  
Japanese Application Serial No. 2008554018, Office Action dated Dec. 26, 2011, 2 pgs.

*Primary Examiner* — Walter Benson  
*Assistant Examiner* — Erick Glass  
(74) *Attorney, Agent, or Firm* — RatnerPrestia

(57) ABSTRACT

A servo motor control apparatus having a feedback loop includes: an oscillation detecting section, which detects oscillation of the feedback loop, to output an oscillation detection signal; a parameter operating section, which gives an operational instruction to set a control parameter in the feedback loop based upon the oscillation detection signal; and an updating section, which is supplied with a set value for setting a control parameter, and sets the control parameter in the feedback loop while making an update thereon in accordance with the operational instruction given by the parameter operating section, wherein when the oscillation detection signal indicates no detection of oscillation, the parameter operating section gives the updating section an operational instruction to set a control parameter in accordance with the supplied set value, and when the oscillation detection signal indicates detection of oscillation, parameter operating section gives the updating section an operational instruction to set such a control parameter as to narrow a frequency band width of the feedback loop.

14 Claims, 28 Drawing Sheets

SERVO MOTOR CONTROL APPARATUS AND CONTROL METHOD

This application is a U.S. National Phase Application of PCT International Application PCT/JP2008/050230.

TECHNICAL FIELD

The present invention relates to a control apparatus and a control method for mainly controlling an industrial FA servo motor.

BACKGROUND ART

In a control apparatus for driving a servo motor, a feedback loop is generally configured for detecting a rotational velocity or a rotational position of the motor so as to track a velocity command or a position command inputted from outside. In order to ensure operational stability of the feedback loop to sufficiently exert performance for tracking the velocity command or the position command, it is necessary to set appropriate values for a plurality of control parameters included in the feedback loop, namely a velocity gain and a position gain, in accordance with a moment of inertia and a state of the load of the servo motor.

A conventional servo motor control apparatus is mounted with parameter setting means for setting an appropriate value for the foregoing control parameter in accordance with the moment of inertia and the state of the load of the servo motor. Further, techniques with regard to a servo motor control apparatus mounted with such parameter setting means are, for example, disclosed in Patent Documents 1 and 2.

FIG. 29 is a block diagram showing a constitutional example of such a conventional control apparatus for a servo motor (hereinafter simply referred to as "motor" as appropriate).

In FIG. 29, motor 101 is connected with load 102. Motor 101 is also connected with encoder 103, and a value corresponding to a rotational position of motor 101 is outputted. An output value of encoder 103 is subjected to differential processing in differential operation section 111, and velocity detection signal dv indicating a value converted into the rotational velocity of motor 101 is outputted. The velocity command inputted from the outside is inputted into field forward gain multiplying section 110. Simultaneously, this velocity command is used to calculate a difference signal with velocity detection signal dv outputted by differential operation section 111 in subtraction section 114. This signal corresponds to a velocity error, and is inputted into integral operation section 112, to be converted into a signal corresponding to a position error. This signal is inputted into position gain multiplying section 109, multiplied by predetermined position gain Kp, and outputted. Further, the signal outputted from position gain multiplying section 109 is added with a signal of the velocity command outputted after multiplied by predetermined feedforward gain Kf in feedforward gain multiplying section 110, and a signal of a difference from velocity detection signal dv outputted by differential operation section 111 is calculated. Thereafter, the signal outputted from operating section 113 is inputted into velocity gain multiplying section 108, multiplied by predetermined velocity gain Kv and outputted, and based upon this outputted signal, servo motor 101 is driven. It is to be noted that for velocity gain Kv, a value obtained by multiplying a set value of inertia J by a set value of velocity band fv of motor 101 including load 102 in multiplication section 115 is set.

Further, the servo motor control apparatus shown in FIG. 29 is configured as parameter setting means, so as to set set values for inertia J, position gain Kp and velocity band fv included in the control parameters, from the outside.

In such a configuration, foregoing position gain Kp and velocity gain Kv corresponding to velocity band fv are what are referred to as control parameters, and for values of these respective control parameters, values inputted from the outside are set. At this time, these set values have influences on control performance of servo motor 101 and the oscillation stability of feedback loop 104, thereby requiring adjustment of these set values to the optimal values.

Incidentally, in general, the larger the value of velocity band fv, the larger the frequency band width of feedback loop 104, and hence excellent response or tracking can be obtained with respect to an input of the velocity command. On the other hand, load 102 including servo motor 101 generally has mechanical resonance characteristics, and when the value of velocity band fv is made too large, oscillation may occur in feedback loop 104. Further, when the value of position gain Kp is not appropriately given with respect to the value of velocity band fv, a damping factor of feedback loop 104 is affected, resulting in that an appropriate response cannot be obtained with respect to the command from outside due to vibrational response or, on the contrary, deterioration in tracking of the rotational position.

It is therefore necessary to raise or lower values of the respective parameters for adjustment while checking a response of servo motor 101 to the command, and this operation is generally referred to as manual adjustment of control parameters. On the other hand, an adjustment function of automatically adjusting these control parameters, generally referred to as auto tuning, has been in practical use.

However, even when the auto tuning is executed, the control parameters are not necessarily adjusted to optimal values with respect to any state of the load, and hence in the actual situation, the manual adjustment function has also been essential for a typical servo motor control apparatus.

Further, no matter whether manual adjustment or auto tuning is performed, in the case of raising or lowering the respective control parameters for adjustment to the optimal values, oscillation occurs in the feedback loop, leading to strong vibration of the servo motor, which might damage the load of the servo motor. When oscillation occurs in the feedback loop, it is necessary to perform a procedure such as a procedure of changing changed control parameter values again, or a procedure of changing control parameter values after temporarily cutting off and stopping a current flowing in the servo motor, and again flowing the current in the servo motor. There has thus been a problem with such a conventional servo motor control apparatus in that it takes a long time to stop the oscillation, to cause excessive damage on the load of the servo motor, or time and efforts to be expensed for adjustment of the control parameters. A technique with regard to a motor having a function to suppress such mechanical vibration is, for example, disclosed in Patent Document 3.

[Patent Document 1] Unexamined Japanese Patent Publication No. H06-165550
[Patent Document 2] Unexamined Japanese Patent Publication No. H06-319284
[Patent Document 3] Unexamined Japanese Patent Publication No. 2003-52188

DISCLOSURE OF THE INVENTION

A servo motor control apparatus of the present invention having a feedback loop which obtains an amount of deviations from command information notified from outside and information on a rotational operation detected by a detection section, performs arithmetic operation processing on the deviation amount by use of a predetermined control parameter group including a control gain, and controls a rotational operation of a servo motor by a rotation control signal generated by the arithmetic operation processing, to perform feedback control such that the rotational operation of the servo motor tracks the command information, the apparatus includes: an oscillation detecting section, which detects oscillation of the feedback loop, to output an oscillation detection signal indicating a result of the detection; a parameter operating section, which gives an operational instruction to set a control parameter in the control parameter group of the feedback loop based upon the oscillation detection signal; and an updating section, which is supplied with a set value for setting a control parameter, and sets the control parameter in the feedback loop while making an update thereon in accordance with the operational instruction given by the parameter operating section, and the apparatus is configured such that when the oscillation detection signal indicates no detection of oscillation, the parameter operating section gives the updating section an operational instruction to set a control parameter in accordance with the supplied set value, and when the oscillation detection signal indicates detection of oscillation, the parameter operating section gives the updating section an operational instruction to set such a control parameter as to narrow a frequency band width of the feedback loop.

Further, a servo motor control method of the present invention for a servo motor having a feedback loop which obtains an amount of deviations from command information notified from outside and information on a rotational operation detected by a detection section, performs arithmetic operation processing on the deviation amount by use of a predetermined control parameter group including a control gain, and controls a rotational operation of the servo motor by a rotation control signal generated by the arithmetic operation processing, to perform feedback control such that the rotational operation of the servo motor tracks the command information, the method includes the steps of: detecting oscillation of the feedback loop; performing operational control on setting of a control parameter in the control parameter group of the feedback loop based upon detection of the oscillation; and being supplied with a set value for setting a control parameter and setting the control parameter in the feedback loop while making an update thereon in accordance with the operational control, wherein, when the oscillation is not detected, a control parameter in accordance with the supplied set value is set in the feedback loop by the operation control, and when the oscillation is detected, such a control parameter as to narrow a frequency band width of the feedback loop is set in the feedback loop by the operational control.

With such configurations, changing control parameters, for example, exercises control so as to narrow the frequency band width of the feedback loop even in the case of occurrence of oscillation in the feedback loop, thereby it is possible to stop the oscillation promptly, keep damage inflicted to the load of the servo motor at the minimum and also perform adjustment of the control parameters smoothly in a short period of time.

| | |
|---|---|
| 101 | Servo motor |
| 102 | Load |
| 103 | Encoder |
| 104 | Feedback loop |
| 105 | Oscillation detecting section |
| 106 | Parameter operating section |
| 108 | Velocity gain multiplying section |
| 109 | Position gain multiplying section |
| 110 | Feedforward gain multiplying section |
| 111, 154 | Differential operation section |
| 112 | Integral operation section |
| 113 | Operation section |
| 114 | Subtraction section |
| 115 | Multiplication section |
| 116, 117, 118 | Parameter updating section |
| 120 | Band-pass filter |
| 121 | Amplitude determining section |
| 122 | Oscillation continuation determining section |
| 125 | Set value storing section |
| 126 | Set value update detecting section |
| 127 | Old value storing section |
| 128 | Output value deciding section |
| 130 | Parameter setting section |
| 131 | Stiffness value updating section |
| 141, 144 | Notch filter |
| 142 | Center frequency adjusting section |
| 143 | High-pass filter |
| 145 | Notch center frequency correcting section |
| 152 | Inertia setting section |
| 153 | Inertia estimating section |
| 157 | Stable stiffness value calculating section |
| 161 | Stiffness value determining section |

PREFERRED EMBODIMENTS FOR CARRYING OUT OF THE INVENTION

Hereinafter, embodiments of the present invention will be described with reference to the drawings.

Embodiment 1

Figure 1:
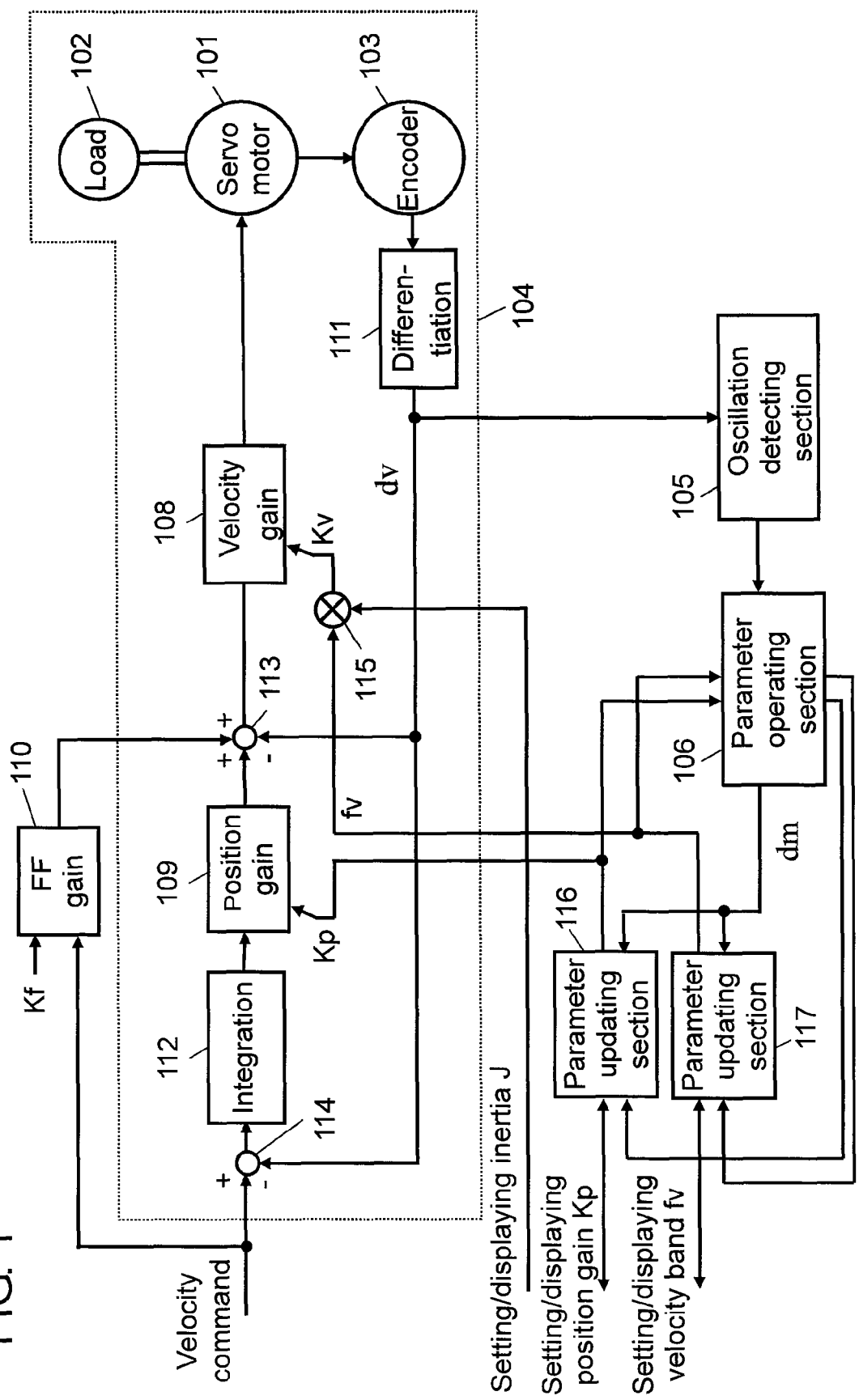
FIG. 1 is a block diagram of a servo motor control apparatus in Embodiment 1 of the present invention.

FIG. 1 is a block diagram of a servo motor control apparatus in Embodiment 1 of the present invention. In the present embodiment, a description is given, taking an example of a servo motor control apparatus (hereinafter simply referred to as "control apparatus" as appropriate) in which a motor rotational position is detected to configure a feedback loop so as to track a velocity command inputted from the outside and is also capable of manually setting appropriate set value for a plurality of control parameters included in the feedback loop, such as a velocity gain and a position gain.

In FIG. 1, servo motor 101 (hereinafter referred to as "motor" as appropriate) is connected with encoder 103 for detecting a rotational position. Encoder 103 outputs a position detection signal indicating a value corresponding to the detected rotational position of motor 101. The position detection signal is subjected to differential operation processing in differential operation section 111 for performing a differential operation, and thereby, velocity detection signal dv indicating the rotational velocity of motor 101 is outputted from differential operation section 111.

Further, a velocity command signal indicating a value of the velocity command inputted from outside is supplied to feedforward gain multiplying section 110, and also supplied to subtraction section 114.

Feedforward gain multiplying section 110 multiplies the supplied velocity command signal by predetermined feedforward gain Kf, and outputs the obtained signal as a feedforward signal.

Meanwhile, subtraction section 114 performs a subtraction operation on the velocity command signal and velocity detection signal dv, and outputs a result of this subtraction operation as a velocity error signal. This velocity error signal corresponds to a velocity error as an amount of deviation between the velocity command and the detected velocity. The velocity error signal is supplied to integral operation section 112 for performing an integral operation, and subjected to integral operation processing. Thereby, the velocity error signal is converted into a position error signal corresponding to a position error. This position error signal is supplied to position gain multiplying section 109. Position gain multiplying section 109 multiplies the position error signal by predetermined position gain Kp as one of the control gains, and outputs the obtained signal as a position correction signal. Further, position gain multiplying section 109 is supplied with a set value of such position gain Kp from parameter updating section 116 described below.

Next, arithmetic operation section 113 is supplied with the position correction signal, the feedforward signal and velocity detection signal dv. Arithmetic section 113 performs an addition operation on the position correction signal and the feedforward signal, and further performs a subtraction operation on a result of this addition operation and velocity detection signal dv, to output the obtained signal as a velocity control signal. This velocity control signal is supplied to velocity gain multiplying section 108. Velocity gain multiplying section 108 multiplies the velocity control signal by predetermined velocity gain Kv as one of the control gains, and outputs the obtained signal as a rotation control signal. Further, velocity gain multiplying section 108 is supplied with a set value of such velocity gain Kv from multiplication section 115 described below.

Subsequently, a drive signal corresponding to the rotation control signal is supplied to motor 101, and motor 101 is thereby rotationally driven.

Further, motor 101 rotationally driven in such a manner is connected with load 102, and thereby load 102 is driven so as to rotate.

With the configuration as described above, feedback loop 104 is configured which detects, from the velocity command as command information notified from the outside and the position detection signal as information on a rotational operation detected by encoder 103 as a detection section, an amount of deviations of those, performs arithmetic operation processing on the deviation amount by use of a predetermined control parameter group including a control gain, and controls a servo motor rotational operation by means of a rotation control signal generated by the arithmetic operation processing, to perform feedback control such that a rotational operation of servo motor 101 tracks the command information. In the present embodiment, as shown in FIG. 1, servo motor 101 including load 102, encoder 103 and a portion for feedback processing until generation of a driving signal are collectively referred to as feedback loop 104. It is to be noted that, although a form of inputting the velocity command into feedback loop 104 is taken here, an integral operation is performed on the velocity error signal by integral operation section 112 inside feedback loop 104. Hence, this configuration is substantially equivalent to such a configuration as to exercise control so that the position command is inputted from the outside and tracked control by the rotational position of servo motor 101.

Further, as described above, the control apparatus of the present embodiment is configured so as to manually set set values with respect to a plurality of control parameters in feedback loop 104, namely by hand-operated manual adjustment. Namely, in the present embodiment, as shown in FIG. 1, the constitutional example is cited where, set values with respect to position gain Kp, velocity band fv and inertia J as the control parameters included in the predetermined control parameter group can be respectively set from the outside into the present control apparatus, along with the velocity command value as the velocity command signal. Such set values for the control parameters are notified from host equipment, such as a microprocessor or a microcomputer apparatus, a panel switch of a controller apparatus to house the present control apparatus, or the like. Further, FIG. 1 cites such an example where set values of position gain Kp and velocity band fv set in the present control apparatus are notified to the outside such as the host equipment, and the set values are, for example, displayed in the host equipment or the like.

Since each of such set values of the control parameters are set inside feedback loop 104, the control apparatus of the present embodiment further includes: parameter updating sections 116 and 117 for updating respective values of a plurality of control parameters included in the feedback loop in accordance with set values from the outside; parameter operating section 106 for storing update history of respective output values outputted from parameter updating sections 116 and 117; and oscillation detecting section 105 for detecting oscillation of the feedback loop and notifying parameter operating section 106 of a result of the detection. It should be noted that parameter updating sections 116 and 117 constitute an updating section.

Parameter updating section 116 is supplied with a set value of position gain Kp from the external host equipment or the like, and parameter updating section 117 is supplied with a set value of velocity band fv. Further, parameter updating sections 116 and 117 select the optimal set values in accordance with an operational instruction of operation command signal dm of parameter operating section 106, to output the selected set values. It is to be noted that in the following description, a set value notified from the external host equipment or the like and a set value outputted from parameter updating section 116 or 117 are respectively classified and referred to as an external set value and an internal set value.

The internal set value of position gain Kp which was outputted from parameter updating section 116 is supplied to position gain multiplying section 109. Thereby, position gain Kp inside the feedback loop is set as the control parameter.

Further, the internal set value of velocity band fv outputted from parameter updating section 117 is supplied to multiplication section 115. Here, when a moment of inertia, namely inertia J, of both motor 101 and load 102 is allocated along with frequency band fs of the feedback loop, a relation of: $Kv/J=2\pi cfs$ (symbol $\pi$ denotes a circular constant), is established among velocity gain Kv, inertia J and frequency band fs. Moreover, assuming that a response attenuation coefficient of feedback loop 104 is one, a relation of: position gain $Kp=\frac{1}{4} \cdot Kv/J$, is established. Based upon this, in the present invention, such a configuration is formed as to allow setting of velocity band fv and inertia J from the outside and set a result of multiplication of velocity band fv and inertia J as velocity gain Kv. Namely, as shown in FIG. 1, such a configuration is formed where multiplication section 115 is provided, and multiplication section 115 performs a multiplication operation on the internal set value of velocity band fv and the set value of inertia J, and a value as a result of the multiplication is set in velocity gain multiplying section 108 as velocity gain Kv. In such a manner, inertia J and velocity band fv are set as the control parameters, and velocity gain Kv inside the feedback loop is also set. In addition, such a configuration may be formed where the external set value of velocity gain Kv is notified from the outside to parameter updating section 117, and the internal set value outputted from parameter updating section 117 is supplied to velocity gain multiplying section 108.

Figure 2A:
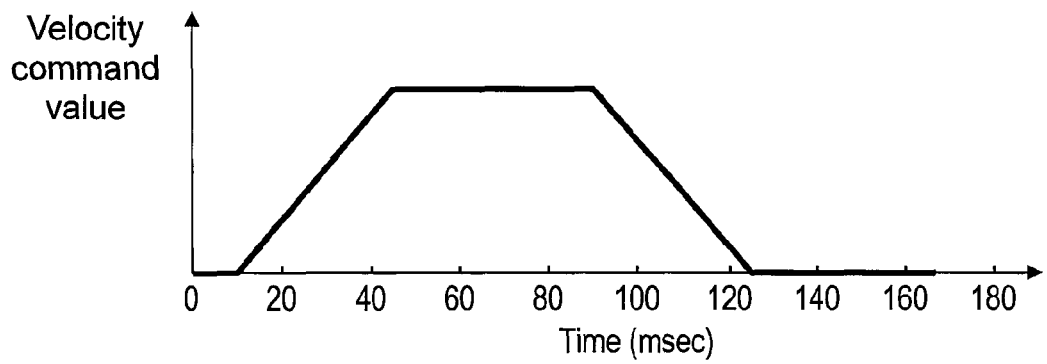
FIG. 2A is a diagram showing an example of changing a velocity command signal with passage of time.
Figure 2B:
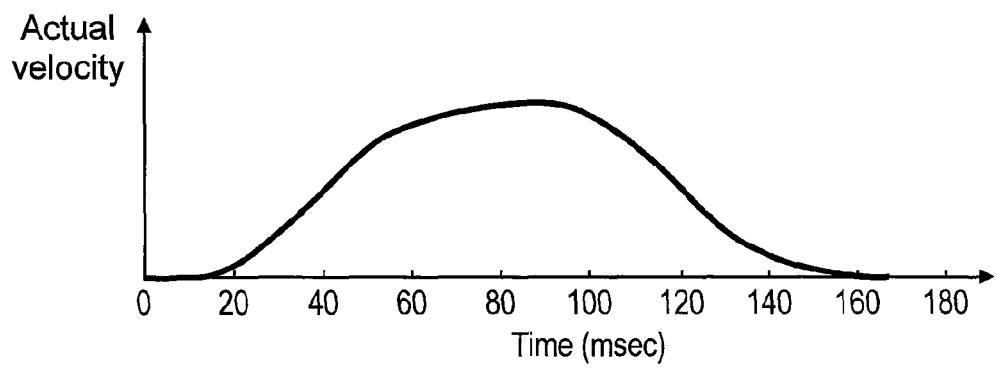
FIG. 2B is a diagram showing a change in actual rotational velocity in the servo motor when position gain Kp and velocity gain Kv are set low to a certain extent.
Figure 2C:
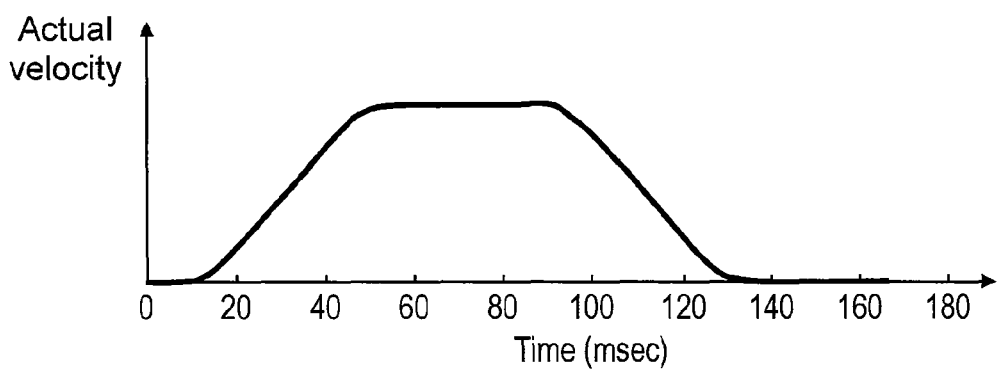
FIG. 2C is a diagram showing a change in actual rotational velocity in the servo motor when position gain Kp and velocity gain Kv are set higher than the case of FIG. 2B.

As thus described, appropriately setting the control parameters which are position gain Kp and velocity gain Kv can give excellent response and tracking with respect to the velocity command. FIGS. 2A, 2B and 2C respectively show examples of response characteristics with respect to changes in velocity command in the case of changing settings of the control parameters.

FIG. 2A shows an example of changing the velocity command signal with passage of the time. FIG. 2B shows a change in actual rotational velocity in motor 101 with respect to the changes in velocity command signal shown in FIG. 2A when position gain Kp and velocity gain Kv are set low to a certain extent. FIG. 2C shows a change in actual rotational velocity in motor 101 with respect to the change in velocity command signal shown in FIG. 2A when position gain Kp and velocity gain Kv are set higher than the case of FIG. 2B.

As seen from comparison between FIGS. 2B and 2C, the higher position gain Kp and velocity gain Kv are set, the larger the frequency band width of feedback loop 104 becomes, and hence excellent response or tracking can be obtained with respect to a change in input of the velocity command. However, load 102 including servo motor 101 generally has mechanical resonance characteristics. Further, when stiffness of load 102 is low, there are cases where resonance thereof becomes lower than an upper limit frequency of a frequency band of feedback loop 104. In that case, there is a possibility that oscillation occurs in feedback loop 104. Hence, although foregoing position gain Kp and velocity gain Kv are desirably set high from the viewpoint of response to the input of the velocity command, those need to be kept in a range where oscillation does not occur in feedback loop 104.

The control apparatus of the present embodiment is provided with oscillation detecting section 105 and parameter operating section 106 for promptly stopping the oscillation even when such oscillation occurs in feedback loop 104.

Parameter operating section 106 receives input of internal set values outputted by parameter updating sections 116 and 117, and sequentially stores the respective values as update history every time the respective values are changed. Further, from oscillation detecting section 105, parameter operating section 106 is notified of an oscillation detection signal indicating whether or not oscillation in feedback loop 104 has been detected.

When this oscillation detection signal indicates detection of oscillation, parameter operating section 106 supplies a value before the update to the corresponding parameter updating section which is either parameter updating section 116 or 117 such that the most recently updated control parameter value is returned to the value before the update. Further, at this time, parameter operating section 106 notifies the corresponding parameter updating section of operation command signal dm indicating such an operation command as to select the value before the update as thus supplied and output the value. In response to this, the parameter updating section holds the value and also outputs the value as the internal set value.

On the other hand, when the oscillation detection signal indicates no detection of oscillation, parameter operating section 106 gives parameter updating sections 116 and 117 an operational instruction to output the external set value as it is as the internal set value by means of operation command signal dm. Namely, when the oscillation detection signal indicates no detection of oscillation, parameter updating sections 116 and 117 each output the external set value as it is as the internal set value.

With parameter operating section 106 and parameter updating sections 116 and 117 performing such processing, when the oscillation detection signal indicates no detection of oscillation, parameter operating section 106 gives parameter updating sections 116 and 117 an operational instruction to set a control parameter in accordance with the supplied set value by means of operation command signal dm, and when the oscillation detection signal indicates detection of oscillation, parameter operating section 106 gives parameter updating sections 116 and 117 an operational instruction to set such a control parameter as to narrow a frequency band width of feedback loop 104.

As thus described, the control apparatus of the present embodiment is characterized in that, when oscillation in feedback loop 104 is detected by oscillation detecting section 105, the internal set value of the control parameter in feedback loop 104 is turned back and set by operations of parameter updating sections 116 and 117, made to perform by parameter operating section 106, such that the internal set value becomes a one-previous set value. Namely, when the oscillation detection signal indicates detection of oscillation, in accordance with operation command signal dm of parameter operating section 106, parameter updating sections 116 and 117 each turns the control parameter, which was most recently updated and set, back to the control parameter before the update and sets the turned-back control parameter in feedback loop 104.

Figure 3:
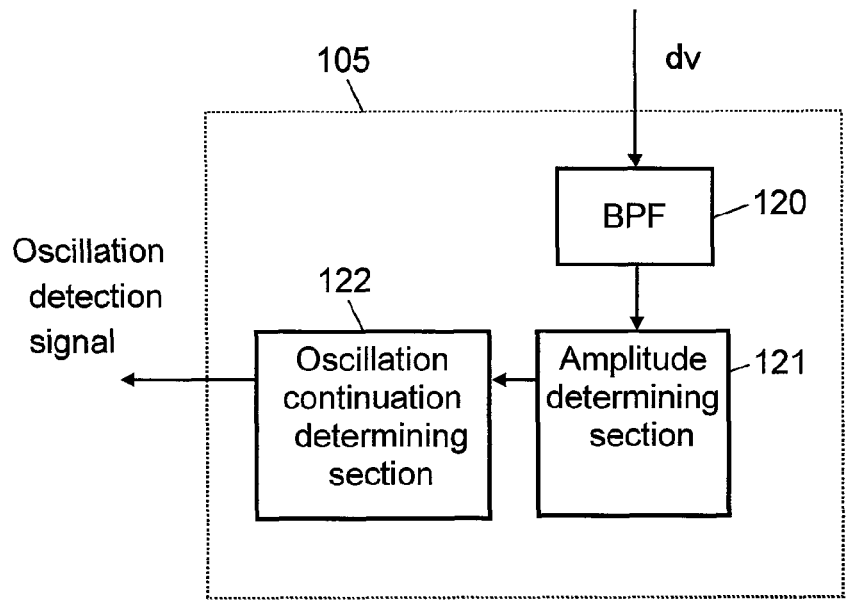
FIG. 3 is a block diagram showing a detailed configuration of an oscillation detecting section in Embodiment 1 of the present invention.
Figure 4:
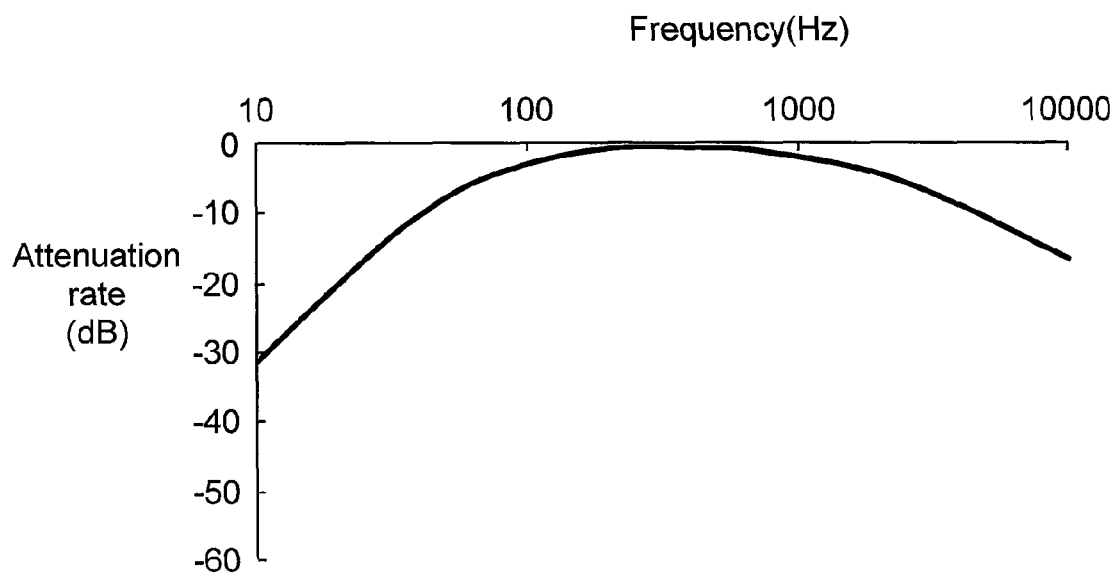
FIG. 4 is a diagram showing an example of a frequency characteristic of a band-pass filter of the same oscillation detecting section.

FIG. 3 is a block diagram showing a detailed configuration of oscillation detecting section 105. In FIG. 3, velocity detection signal dv indicating a motor velocity inputted into oscillation detecting section 105 is first inputted into band-pass filter 120. FIG. 4 is a diagram showing an example of frequency characteristics of band-pass filter 120. Velocity detection signal dv is outputted with a high frequency component and a low frequency component mutually cut off by band-pass filter 120 having frequency characteristic as shown in FIG. 4. This process is done for the purpose of cutting off a noise component to accurately detect oscillation of feedback loop 104. The output signal of band-pass filter 120 is inputted into amplitude determining section 121.

Amplitude determining section 121 determines whether an amplitude of the inputted signal is larger or smaller than a predetermined amplitude value. Amplitude determining section 121 outputs a binary signal which is taken as an H-level signal when the amplitude is determined to be large and taken as an L-level signal when the amplitude is determined to be small. The binary signal indicating a result of this determination is supplied to oscillation continuation determining section 122.

Oscillation continuation determining section 122 determines whether or not stable and reliable oscillation has occurred in feedback loop 104 based upon the signal from amplitude determining section 121. Namely, oscillation continuation determining section 122, for example, counts the time when the inputted signal is at the H-level, to determine continuity of oscillation of feedback loop 104. Oscillation continuation determining section 122 outputs a binary signal which is taken as the H-level signal when the oscillation of feedback loop 104 is determined to be continuous and is taken as the L-level signal when the oscillation is determined otherwise.

As a more specific constitutional example of such oscillation continuation determining section 122, an up-down counter (hereinafter simply referred to as "counter" as appropriate) is provided inside oscillation continuation determining section 122, and configured so as to count up when the input signal is at the H-level, and count down when the signal is at the L-level. Further, such a determination device as to determine an output value of the counter is provided and configured so as to output a binary signal which is taken as the H-level signal determined to be continuous oscillation when this output value of the counter becomes not less than a predetermined value and is taken as the L-level signal when the output value becomes otherwise. With such a configuration, oscillation continuation determining section 122 can be realized. It should be noted that in the following description of an operation in each embodiment, an operation example is cited with a configuration where oscillation detecting section 105 includes oscillation continuation determining section 122 having the counter as thus described.

In addition, feedforward gain Kf in feedforward gain multiplying section 110 described above is a parameter related to a response of servo motor 101 to the input of the velocity command. Since such feedforward gain Kf basically has no relation with oscillation that occurs in feedback loop 104, feedforward gain Kf is distinguished from other control parameters included in feedback loop 104. Further, feedforward gain Kf is often set, normally, fixed to a value of the order of 0.3. Moreover, although such a constitutional example where feedforward gain Kf is fixedly set is shown in the present embodiment, the configuration may be one where feedforward gain Kf can be set from the outside as in the case of the velocity command and the other control parameters.

Next, an operation of the servo motor control apparatus of the present embodiment configured as above is described, citing a specific example. Further, as described above, a description is given here by use of an example where oscillation continuation determining section 122 has the counter.

Figure 5:
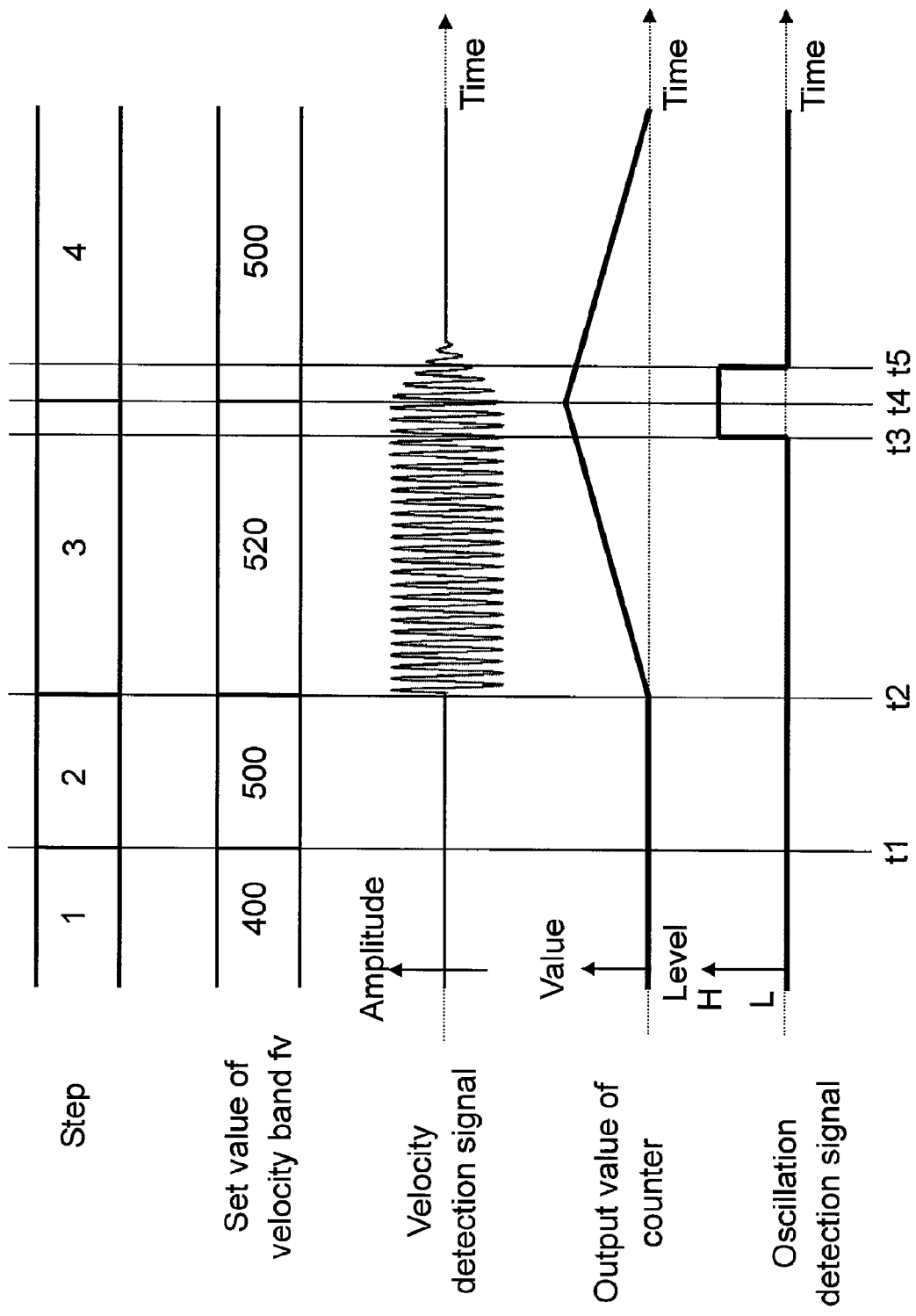
FIG. 5 is a timing chart showing a set value and a state of each signal in each step in the servo motor control apparatus in Embodiment 1 of the present invention.

First, a description is given, citing such an operational example as to set velocity band fv being the control parameter in accordance with the order of steps for manual adjustment as shown in table 1. Here, an example is given of the case where position gain Kp as the control parameter is a fixed, unchanged value as shown in table 1. Further, FIG. 5 is a timing chart showing a set value and a state of each signal in each step shown in table 1.

TABLE 1

| Step | fv (rad/sec) | Kp (rad/sec) |
|---|---|---|
| 1 | 400 | 100 |
| 2 | 500 | 100 |
| 3 | 520 | 100 |
| 4 | 500 | 100 |

First, for example, at the time of starting manual adjustment of the control parameters, the respective internal set values are set in combination of the respective control parameters as shown in step 1 of table 1. It is to be noted that a description is given, assuming that oscillation has not occurred in feedback loop 104 at this point of time.

Next, after the control parameters shown in step 1 have been set, the set value of velocity band fv is further changed from "400" to "500" at time t1 as step 2, as shown in FIG. 5. Since oscillation has not occurred in feedback loop 104 at this stage either, the set value of velocity band fv is further changed from "500" to "520" at time t2 as step 3. FIG. 5 shows a state where the internal set value of velocity band fv is increased until step 3 with the aim of improvement in response, for example, and thereby the frequency band width of feedback loop 104 increases, to cause occurrence of oscillation in feedback loop 104. Namely, since oscillation occurs in feedback loop 104, velocity detection signal dv that is supplied to oscillation detecting section 105 also vibrates as shown in FIG. 5. Thereby, after time t2, amplitude determining section 121 outputs an oscillation detection signal (H-level) indicating detection of oscillation to oscillation continuation determining section 122. For this reason, as shown in FIG. 5, the output value of the counter of oscillation continuation determining section 122 increases, and exceeds a predetermined value at time t3. Oscillation continuation determining section 122 then outputs the oscillation detection signal (H-level) indicating detection of oscillation at this point of time, whereby such an oscillation detection signal is notified from oscillation detecting section 105 to parameter operating section 106.

Every time the internal set value outputted from parameter updating section 117 changes, parameter operating section 106 sequentially stores the value. In response to the change as detection of oscillation of the oscillation detection signal at time t3, parameter operating section 106 outputs "500" as the value before the update of the internal set value, outputted from parameter updating section 117, namely the value of velocity band fv before the update, to parameter updating section 117 at time t4. Further, parameter operating section 106 gives parameter updating section 117 an operational instruction to select "500" as the value before the update and output the selected value.

Consequently, the internal set value outputted from parameter updating section 117 is returned from "520" to "500". This narrows the frequency band width of feedback loop 104, and after time t4, the oscillation is converged, accompanied by a decrease in counter value, as shown in FIG. 5. Subsequently, at time t5, oscillation continuation determining section 122 switches the signal to the oscillation detection signal (L-level) indicating the stop of the oscillation, and thereby a series of processing is completed. Namely, when oscillation occurs due to setting of "520" as the external set value, eventually, the internal set value is changed to "500" as shown in step 4 of table 1 and the state is returned to one similar to the state where "500" was inputted as the set value of velocity band fv from the outside.

As thus described, for example, when the set value of the control parameter is changed to the optimal value in accordance with the load in manual adjustment or the like, in the case of occurrence of oscillation in feedback loop 104, the present control apparatus automatically performs processing of returning the control parameter back to a value before the update by means of oscillation detecting section 105, parameter operating section 106, and parameter updating sections 116 and 117. Therefore, according to the present control apparatus, it is possible to stop oscillation that occurs in feedback loop 104 in a short period of time. Further, since manually stopping the oscillation is not required and limit values of the control parameters can be seen, it is possible to perform a control parameter adjusting operation smoothly in a short period of time.

Next, a description is given, citing such an operational example as to set velocity band fv being the control parameter in accordance with the order of steps as shown in table 2. Herein, also cited is an example where position gain Kp as the control parameter is a fixed value as shown in table 2. Further, FIG. 6 is a timing chart showing a state of each signal in accordance with setting at each step shown in table 2.

TABLE 2

| Step | fv (rad/sec) | Kp (rad/sec) |
|---|---|---|
| 1 | 400 | 100 |
| 2 | 500 | 100 |
| 3 | 600 | 100 |
| 4 | 500 | 100 |
| 5 | 400 | 100 |

Figure 6:
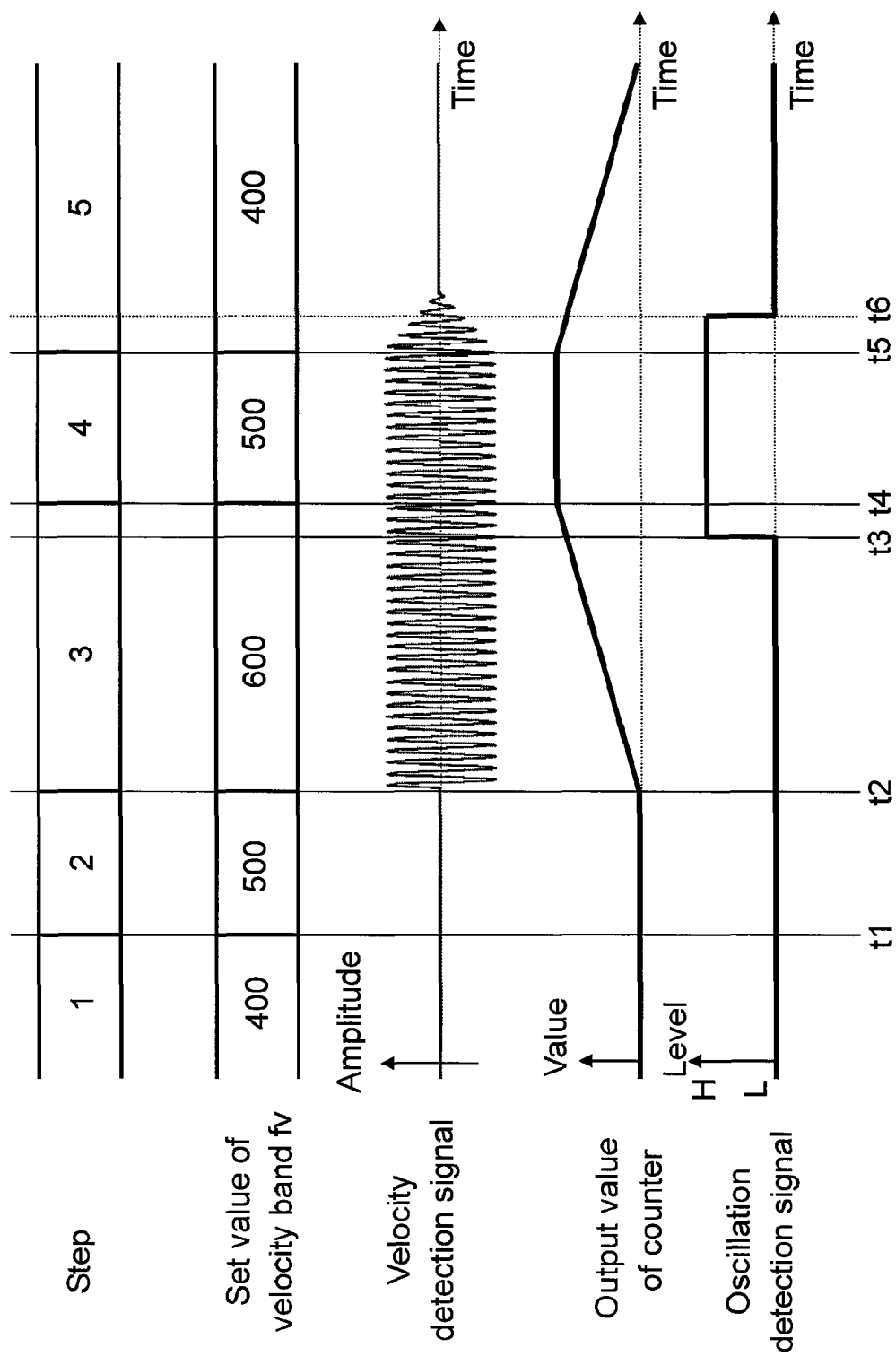
FIG. 6 is a timing chart showing another example of a set value and a state of each signal in each step in the same control apparatus.

First, the same processing as the processing in the case of FIG. 5 is performed until time t2 shown in FIG. 6. Further, the set value of velocity band fv is changed from "500" to "600" at time t2 as step 3. Thereby, as in the case of FIG. 5, the frequency band width of feedback loop 104 increases, leading to occurrence of oscillation in feedback loop 104, and as shown in FIG. 6, velocity detection signal dv that is supplied to oscillation detecting section 105 also vibrates.

With occurrence of such oscillation, as shown in FIG. 6, the output value of the counter of oscillation continuation determining section 122 increases, and at time t3, the oscillation detection signal (H-level) indicating detection of oscillation is notified from oscillation detecting section 105 to parameter operating section 106. Upon receipt of such an oscillation detection signal at time t3, parameter operating section 106 outputs at time t4 "500" as the value of the output value of parameter updating section 117 before the update, namely the value of velocity band fv before the update, to parameter updating section 117.

Consequently, the output value of parameter updating section 117 is returned from "600" to "500" again. Although such an example as to stop the oscillation by the operation as above was given in the case of FIG. 5, such a case where oscillation continues after time t4 is shown in FIG. 6. Namely, as shown in FIG. 6, velocity detection signal dv continuously vibrates after time t4.

When oscillation continues as thus described, as shown in FIG. 6, the counter value reaches a saturated level, and also, oscillation detecting section 105 continues to output the oscillation detection signal indicating detection of oscillation. Upon receipt of this signal, parameter operating section 106 outputs at time t5 "400" as the output value of parameter updating section 117 further before being updated to "500", namely the value of velocity band fv further before the update, to parameter updating section 117.

Consequently, the frequency band width of feedback loop 104 is further narrowed, leading to convergence of the oscillation of velocity detection signal dv as well as a decrease in counter value, as shown in FIG. 6. Thereafter, at time t6, oscillation continuation determining section 122 switches the signal to the oscillation detection signal (L-level) indicating the stop of the oscillation, and thereby a series of processing is completed. Namely, the state is eventually returned to one equivalent to the state where "400" was inputted as the set value of velocity band fv from the outside as shown step 5 in table 2.

As thus described, when the set value of the control parameter is changed, in the case of occurrence of oscillation in feedback loop 104, the present control apparatus continuously and automatically performs processing of returning the control parameter back to the value before the update. Therefore, according to the present control apparatus, it is possible to stop oscillation that occurs in feedback loop 104 in a short period of time. Further, since manually stopping the oscillation is not required and limit values of the control parameters can be seen, it is possible to perform the control parameter adjusting operation smoothly in a short period of time.

Next, a description is given, citing such an operational example as to set velocity band fv and position gain Kp being the control parameters in accordance with the order of steps as shown in table 3. Here, as shown in table 3, set values of "400" and "100" are first set respectively for velocity band fv and position gain Kp in step 1, velocity band fv is then updated from "400" to "500" in step 2, position gain Kp is updated from "100" to "80" in step 3, and position gain Kp is updated from "80" to "70" in step 4. Further, a description is given below, citing an example of a case where oscillation does not occur in feedback loop 104 in the processing up to this point and oscillation occurs at the time when velocity band fv is updated from "500" to "560" in step 5.

TABLE 3

| Step | fv (rad/sec) | Kp (rad/sec) |
|---|---|---|
| 1 | 400 | 100 |
| 2 | 500 | 100 |
| 3 | 500 | 80 |
| 4 | 500 | 70 |
| 5 | 560 | 70 |
| 6 | 500 | 70 |

First, due to occurrence of oscillation in step 5, parameter operating section 106 outputs "500" as the value before the update to parameter updating section 117.

Consequently, the output value of parameter updating section 117 is returned from "560" to "500" again, whereby the process reaches step S6, and also, the oscillation having occurred in feedback loop 104 stops.

As thus described, even in the case of respectively changing two kinds of control parameters, when oscillation occurs in feedback loop 104, the present control apparatus automatically performs processing of selectively returning the corresponding control parameters back to the value before the update. Therefore, according to the present control apparatus, it is possible to stop oscillation that occurs in feedback loop 104 in a short period of time. Further, since manually stopping oscillation is not required and limit values of the control parameters can be seen, it is possible to perform the control parameter adjusting operation smoothly in a short period of time.

As described above, in the servo motor control apparatus in the present embodiment, parameter updating sections 116 and 117 each update the control parameter to the value inputted from the outside and output the updated value, and also, parameter operating section 106 acts to return the value of the control parameter back to the value before the update when oscillation detecting section 105 detects oscillation of feedback loop 104, whereby it is possible to realize a servo motor control apparatus capable of stopping oscillation that occurs in feedback loop 104 in a short period of time, and performing the control parameter adjusting operation smoothly in a short period of time.

Embodiment 2

Figure 7:
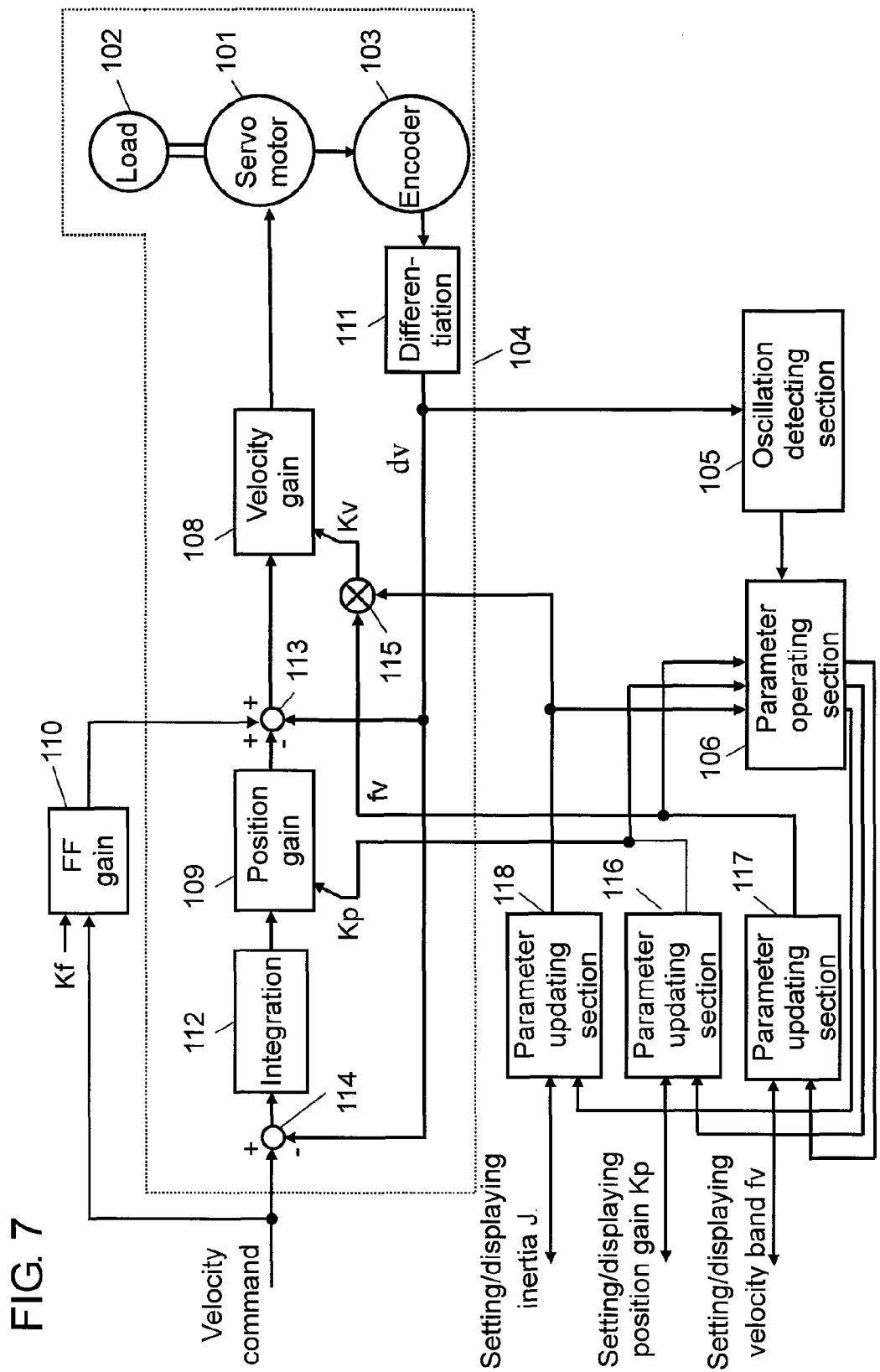
FIG. 7 is a block diagram of a servo motor control apparatus in Embodiment 2 of the present invention.

FIG. 7 is a block diagram of a servo motor control apparatus in Embodiment 2 of the present invention. In comparison with Embodiment 1, parameter updating section 118 which captures a set value of inertia J as a control parameter from the outside, and updates a value in accordance with this set value is further provided in Embodiment 2. Further, parameter updating sections 116, 117, and 118 constitute the updating section. It is to be noted that in FIG. 7, the same constituents as those in FIG. 1 are provided with the same reference numerals as those in FIG. 1, and detailed descriptions thereof are not given.

In FIG. 7, parameter updating section 118 is provided with a set value of inertia J from the external host equipment or the like. Parameter updating section 118 outputs the optimal set value of inertia J as an output value in accordance with an operational instruction of parameter operating section 106. The output value of inertia J outputted from parameter updating section 118 is supplied to multiplication section 115. Thereby, an internal set value of inertia J inside the feedback loop is set as the control parameter. Further, the output value as the internal set value of inertia J outputted from parameter updating section 118 is also supplied to parameter operating section 106.

Parameter operating section 106 in the present embodiment receive an input of an output value outputted by parameter updating section 118 in addition to inputs of output values outputted by parameter updating sections 116 and 117, and sequentially stores the respective values as update history every time the respective values are changed. Further, when notified of detection of oscillation by an oscillation detection signal from oscillation detecting section 105 after update of the value of inertia J, parameter operating section 106 outputs a value of inertia J before the update to parameter updating section 118. Upon receipt of the value, parameter updating section 118 returns the output value of inertia J to be outputted back to the value before the update.

Incidentally, as described above, velocity gain Kv in velocity gain multiplying section 108 is set as a value obtained by multiplication of a set value of inertia J of servo motor 101 including load 102 and a set value of velocity band fv in multiplication section 115. Therefore, the set value of inertia J has an influence on the foregoing value of velocity gain Kv and also on oscillation of feedback loop 104. Hence, even when inertia J is updated, oscillation could occur in feedback loop 104. The set value of inertia J is often treated separately from the other control parameters such as the set value of velocity band fv and the set value of position gain Kp, but it can be regarded as part of the control parameter in a broad sense for the above reason. Therefore, in the present embodiment, such a configuration is formed where, when oscillation occurs in feedback loop 104 due to a change in internal set value of inertia J, the internal set value of inertia J is also returned to the value before the update.

Next, an operation of the servo motor control apparatus of the present embodiment configured as above is described, citing a specific example. Here, as shown in table 4, set values of "400", "100" and "1.0" are first set respectively for velocity band fv, position gain Kp and inertia J in step 1, velocity band fv is then updated from "400" to "500" in step 2, position gain Kp is updated from "100" to "80" in step 3, and inertia set value J is updated from "1.0" to "1.2" in step 4. Further, a description is given below, citing an example of a case where oscillation does not occur in feedback loop 104 in the processing up to this point and oscillation occurs at the time when inertia set value J is updated from "1.2" to "1.4" in step 5.

TABLE 4

| Step | fv (rad/sec) | Kp (rad/sec) | J (kg · m2) |
|---|---|---|---|
| 1 | 400 | 100 | 1.0 |
| 2 | 500 | 100 | 1.0 |
| 3 | 500 | 80 | 1.0 |
| 4 | 500 | 80 | 1.2 |

TABLE 4-continued

| Step | fv (rad/sec) | Kp (rad/sec) | J (kg · m2) |
|---|---|---|---|
| 5 | 500 | 80 | 1.4 |
| 6 | 500 | 80 | 1.2 |

First, due to occurrence of oscillation in step 5, oscillation detecting section 105 notifies parameter operating section 106 of an oscillation detection signal indicating detection of oscillation. In response to this, parameter operating section 106 outputs "1.2" as the value before the update to parameter updating section 118.

Consequently, the output value of parameter updating section 118 is returned from "1.4" to "1.2" again, whereby the process reaches step S6, and also, the oscillation having occurred in feedback loop 104 stops.

As thus described, even in the case of respectively changing three kinds of control parameters, when oscillation occurs in feedback loop 104, the present control apparatus automatically performs processing of selectively returning the corresponding control parameters back to the values before the update by means of oscillation detecting section 105, parameter operating section 106, and parameter updating sections 116, 117, and 118. Therefore, according to the present control apparatus, it is possible to stop oscillation that occurs in feedback loop 104 in a short period of time. Further, since manually stopping oscillation is not required, it is possible to perform the control parameter adjusting operation smoothly in a short period of time.

Embodiment 3

Figure 8:
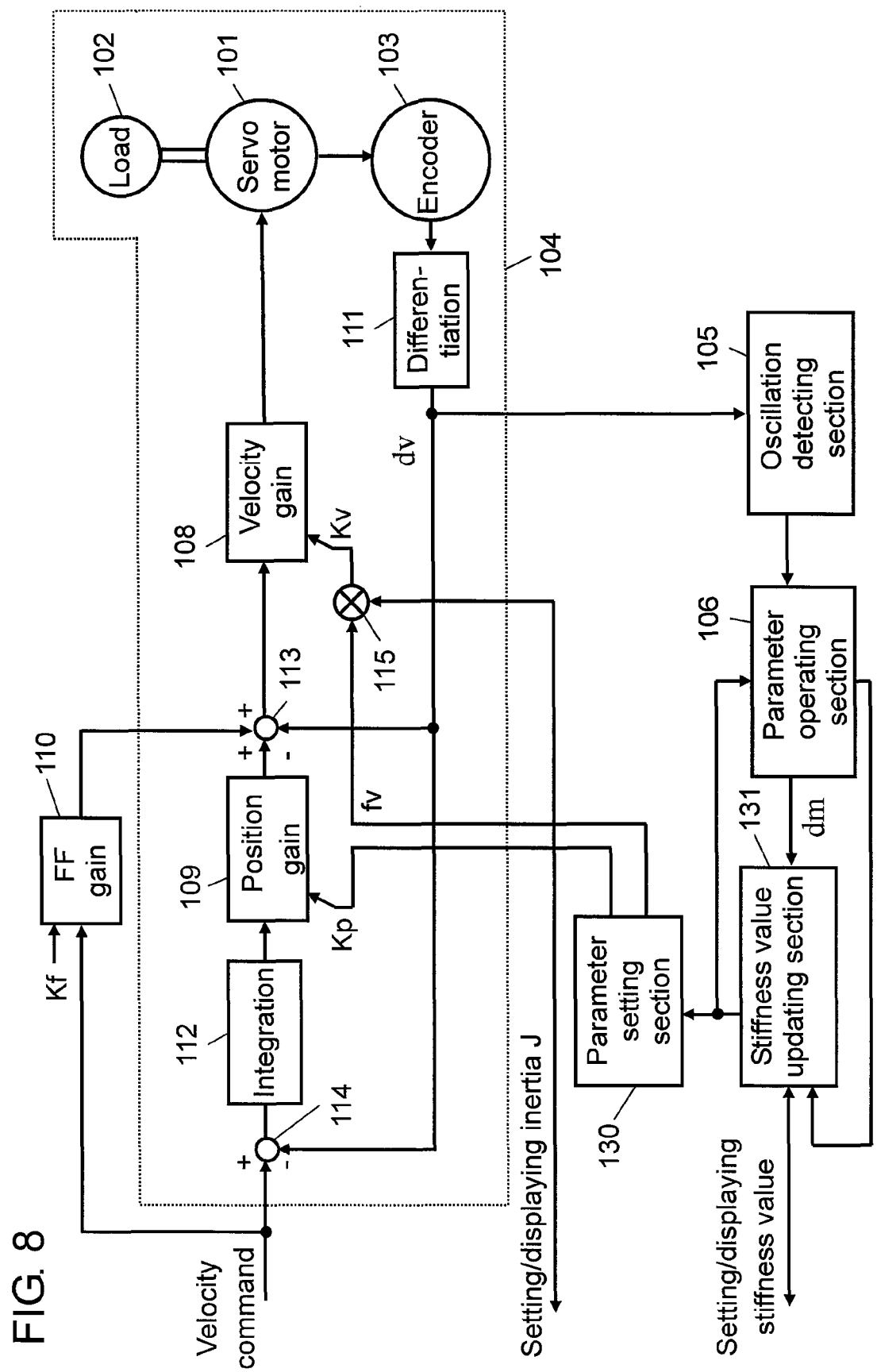
FIG. 8 is a block diagram of a servo motor control apparatus in Embodiment 3 of the present invention.

FIG. 8 is a block diagram of a servo motor control apparatus in Embodiment 3 of the present invention. In comparison with Embodiment 1, parameter setting section 130 and stiffness value updating section 131 are provided in place of parameter updating sections 116 and 117 in Embodiment 3. Further, parameter setting section 130 and stiffness value updating section 131 constitute the updating section. It is to be noted that in FIG. 8, the same constituents as those in FIG. 1 are provided with the same reference numerals as those in FIG. 1, and detailed descriptions thereof are not given.

Further, in the present embodiment, a stiffness set value whose value range has previously been determined is selected and set from the external host equipment or the like, thereby to form a configuration where the control parameters in accordance with stiffness of the load can be set. Namely, for example, eight ranks of stiffness set value from "0" to "7" are previously set, and the value is set to "0" in the case of driving the load with low rigidity while the value is set to "7" in the case of driving the load with high rigidity. Then, for example when "0" is set as the stiffness set value from the host equipment or the like, the control parameters for driving the load with low stiffness are set inside feedback loop 104. With such a configuration, a user of the control apparatus can set the control parameters corresponding to the load without being conscious of the control parameters.

As shown in FIG. 8, in the control apparatus of the present embodiment, position gain Kp and velocity band fv as the control parameters in feedback loop 104 are set by parameter setting section 130. Further, values of the respective control parameters set by parameter setting section 130 are decided in accordance with a stiffness set value (hereinafter simply referred to as "stiffness value" as appropriate) inputted from the outside. Such a stiffness value is supplied to parameter setting section 130 through stiffness value updating section 131. Namely, parameter setting section 130 stores set values of position gain Kp and velocity band fv with respect to stiffness values in a form like a conversion table, and when a stiffness value is notified, parameter setting section 130 outputs set values of position gain Kp and velocity band fv corresponding to the notified stiffness value.

In order to supply parameter setting section 130 with such a stiffness value, the control apparatus of the present embodiment includes stiffness value updating section 131 for updating each value of the stiffness value in accordance with a set value from the outside, and also includes, as in Embodiment 1 and the like, parameter operating section 106 for storing an update history of each output value outputted by stiffness value updating section 131, and oscillation detecting section 105 for detecting oscillation of feedback loop 104 and notifying parameter operating section 106 of a result of the detection.

Stiffness value updating section 131 is supplied with an external set value as a stiffness value for setting control parameters corresponding to stiffness of a load from the external host equipment or the like. Further, stiffness value updating section 131 selects the optimal set value in accordance with an operational instruction from parameter operating section 106, outputs the selected set value as an internal set value, and supplies the value to parameter setting section 130. Moreover, the internal set value outputted from stiffness value updating section 131 is also supplied to parameter updating section 116.

Parameter operating section 106 receives an input of an internal set value from stiffness value updating section 131, and every time each value is changed, parameter operating section 106 sequentially stores each value as update history. Further, from oscillation detecting section 105, parameter operating section 106 is notified of an oscillation detection signal indicating whether or not oscillation in feedback loop 104 has been detected.

When the oscillation detection signal indicates detection of oscillation, parameter operating section 106 supplies the value before the update to stiffness value updating section 131 such that the most recently updated stiffness value is returned to the value before the update. Further, at this time, parameter operating section 106 notifies stiffness value updating section 131 of such an operational instruction as to select the value before the update as thus supplied and output the value by means of operation command signal dm. In response to this, stiffness value updating section 131 holds the value and also outputs the value as the internal set value.

On the other hand, when the oscillation detection signal indicates no detection of oscillation, parameter operating section 106 gives stiffness value updating section 131 an operational instruction to output the external set value as it is as the internal set value by means of operation command signal dm. Namely, when the oscillation detection signal indicates no detection of oscillation, the external set value is supplied as it is as the internal set value to parameter setting section 130.

As thus described, the control apparatus of the present invention is characterized in that, when oscillation in feedback loop 104 is detected by oscillation detecting section 105, the stiffness value is set as turned back so as to become a one-previous set value by an operation of parameter controlling section 106 performed on stiffness value updating section 131, and thereby, the internal set value of the control parameter in feedback loop 104 is also set as turned back so as to become a one-previous set value. Namely, in the control apparatus of the present embodiment, when the oscillation detection signal indicates detection of oscillation, in accordance with the operational instruction of parameter operating section 106, stiffness value updating section 131 returns the most recently updated and set stiffness value back to the stiffness value before the update, and supplies the turned-back stiffness value to parameter setting section 130.

Figure 9:
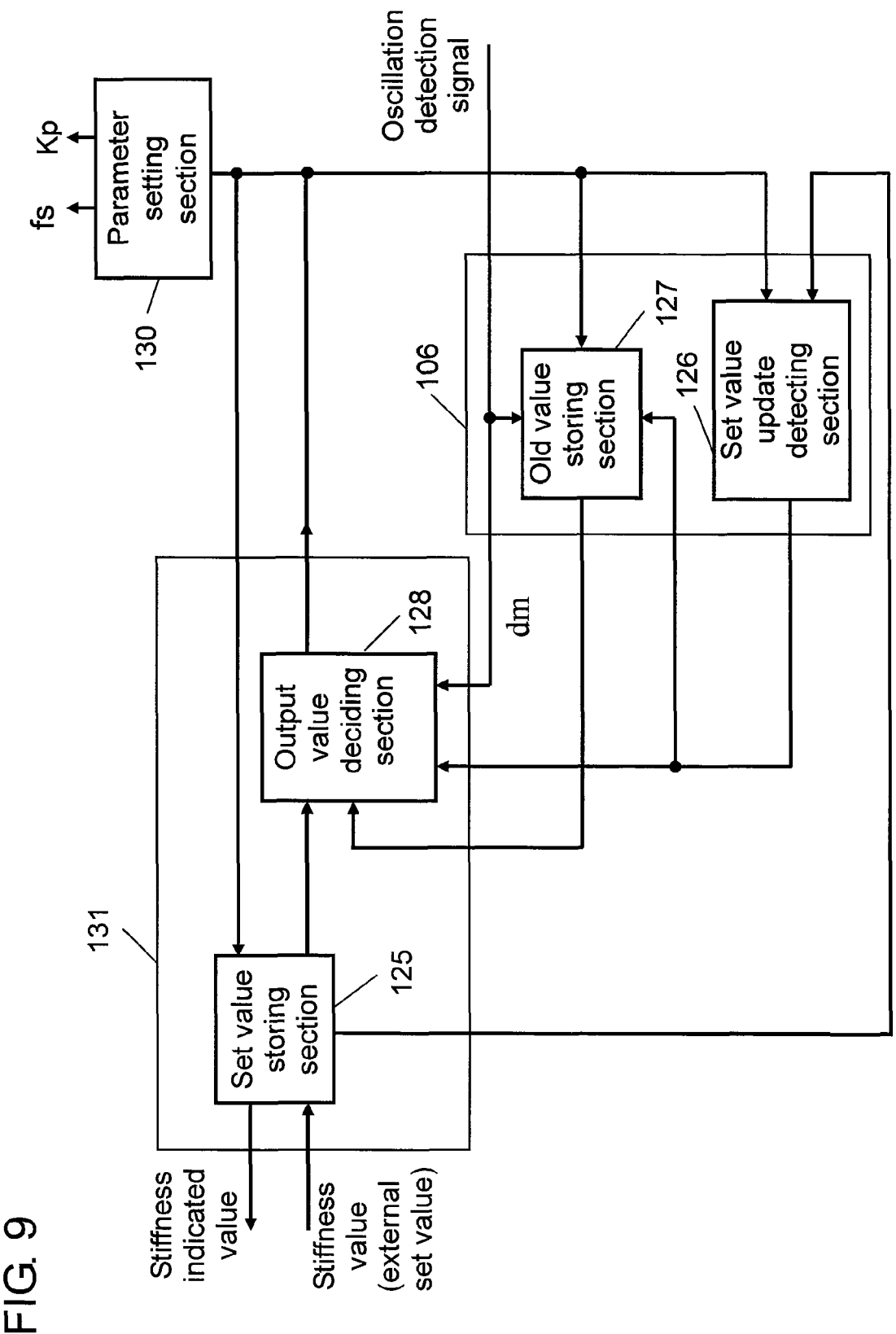
FIG. 9 is a block diagram showing a detailed configuration of a main portion of the same control apparatus.

FIG. 9 is a block diagram showing a detailed configuration of a main portion of FIG. 8. As shown in FIG. 9, stiffness value updating section 131 has set value storing section 125 and output value deciding section 128. Further, parameter operating section 106 has set value update detecting section 126 and old value storing section 127. Setting value storing section 125 temporarily stores an input value for stiffness setting from the outside, and then outputs the value to output value deciding section 128. When it is detected that the value has changed by comparing the inputted input value for stiffness setting with an output value of stiffness value updating section 131, set value update detecting section 126 gives output value deciding section 128 a command to update the inputted stiffness value and output the updated value. At the same time, set value update detecting section 126 gives old value storing section 127 a command to store the value before the update, the value having been outputted by output value deciding section 128. When oscillation detecting section 105 detects oscillation of feedback loop 104, output value deciding section 128 captures the value before the update which is stored in old value storing section 127, and outputs the value. In that case, the output value of output value deciding section 128 is again inputted into set value storing section 125, and the value stored in set value storing section 125 is rewritten to the output value of output value deciding section 128. This process is done for the purpose of making the updated stiffness value outputted by stiffness value updating section 131 checkable as a stiffness indication from the outside.

Next, an operation of the servo motor control apparatus of the present embodiment configured as above is described, citing a specific example.

In FIG. 8, as described above, integers are generally allocated for the stiffness value that is manually set from the outside at the time of manual adjustment and the like. As for an operational example here, a description is given, citing an example of allocating eight kinds of integers from "0" to "7" as the stiffness value set from the outside, namely, the stiffness value.

Further, frequency band fs of feedback loop 104 corresponding to the stiffness value is allocated, and moreover, with respect to this frequency band fs, respective values of Kv/J and Kp are decided. Here, symbol Kv denotes velocity gain, symbol Kp denotes position gain Kp, and symbol J denotes inertia as a moment of inertia including both motor 101 and load 102. A relation of: Kv/J=2πfs (symbol π denotes a circular constant), is established between Kv/J and fs. Moreover, assuming that a response attenuation coefficient is 1, a relation of: Kp=¼·Kv/J, is established. Furthermore, for feedforward gain Kf, a value on the order of 0.3 is generally used from the view point of response of feedback loop 104 to a velocity command. Therefore, the table for the control parameters, a well-balanced standard combination of control parameters is, for example, as shown in table 5.

TABLE 5

| Stiffness | fs (Hz) | Kv/J (rad/sec) | Kp (rad/sec) | Kf |
|---|---|---|---|---|
| 0 | 10 | 63 | 16 | 0.3 |
| 1 | 20 | 126 | 31 | 0.3 |
| 2 | 30 | 188 | 47 | 0.3 |

TABLE 5-continued

| Stiffness | fs (Hz) | Kv/J (rad/sec) | Kp (rad/sec) | Kf |
|---|---|---|---|---|
| 3 | 60 | 377 | 94 | 0.3 |
| 4 | 100 | 628 | 157 | 0.3 |
| 5 | 200 | 1257 | 314 | 0.3 |
| 6 | 300 | 1885 | 471 | 0.3 |
| 7 | 600 | 3770 | 942 | 0.3 |

Table 5 shows that respective corresponding values of frequency band fs of feedback loop 104 are allocated to the stiffness values from "0" to "7", thereby resulting in decision of respective values of Kv/J, Kp, Kf with respect to the stiffness values "0" to "7". Hence, deciding magnitudes of moment of inertia J leads to decision of all values of the control parameters in stiffness setting as the optimal values with respect to frequency band fs. Subsequently, the values of the respective control parameters are transferred to arithmetic operation sections corresponding respectively to velocity gain multiplying section 108, position gain multiplying section 109 and feedforward gain multiplying section 110, which are included in feedback loop 104. Further, as found from comparison between the stiffness value and frequency band fs in table 5, the higher the stiffness value, frequency band fs of feedback loop 104 becomes wider, and thereby excellent response or tracking can be obtained with respect to an input of the velocity command.

In addition, although an value of inertia J as the moment of inertia is decided by manual input or automatic estimation in each servo motor control apparatus, a description is given here assuming that a correct value has been set for the value of inertia J.

Figure 10:
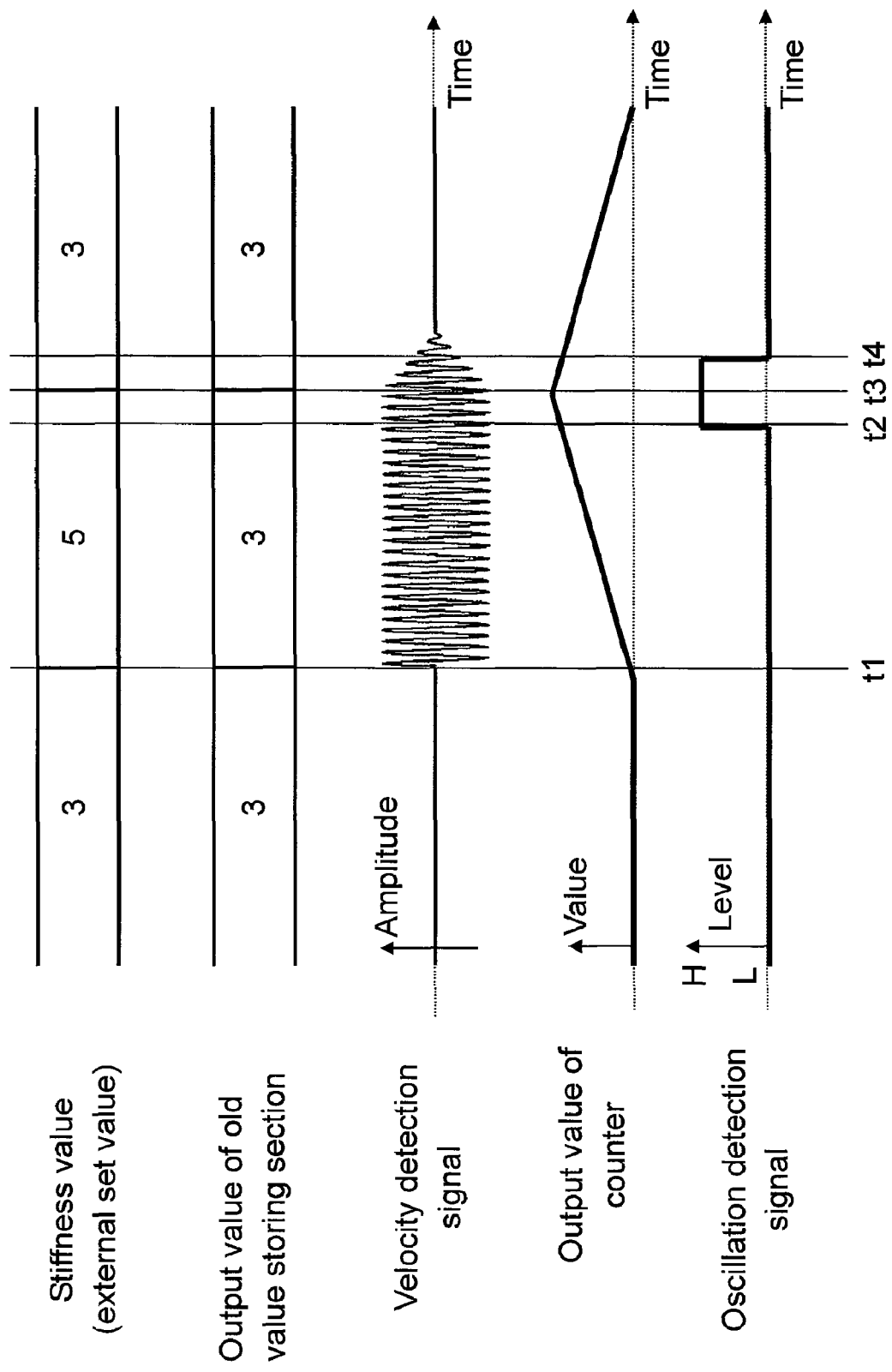
FIG. 10 is a timing chart for describing an operational example of the same control apparatus.

FIG. 10 shows a timing chart for describing an example of the control apparatus of the present embodiment. First, as shown in FIG. 10, a stiffness value with its initial value being "3" is set, and an operation in the case of changing the value to "5" at time t1 is described. It is to be noted that respective values shown in table 5 are used for the stiffness value and the control parameters corresponding thereto. Further, as oscillation detecting section 105, an example of oscillation continuation determining section 122 as shown in FIG. 3 having the foregoing counter is used.

First, as shown in FIG. 10, until time t1, the stiffness value is set as the initial value of "3", and at this time, neither velocity detection signal dv is vibrating, nor does oscillation occur in feedback loop 104.

Next, at time t1, a stiffness value of "5" is supplied from the outside, and the value of set value storing section 125 changes from "3" to "5". Setting value update detecting section 126 detects this value change, and gives a command to output an output value of set value storing section 125 to output value deciding section 128. Further, set value update detecting section 126 gives old value storing section 127 a command to store the output value before the update which is outputted by output value deciding section 128. Thereby, as shown in FIG. 10, the value of old value storing section 127 is "3" after time t1.

As thus described, the output value of set value storing section 125 is supplied to parameter setting section 130, and the values of the control parameters are changed from those corresponding to the stiffness value of "3" to those corresponding to the stiffness value of "5". FIG. 10 shows such a case where, due to the change in stiffness value as above, frequency band fs of feedback loop 104 becomes wider and velocity detection signal dv starts vibrating after time t1. When such oscillation occurs, as shown in FIG. 10, an output value of the counter of oscillation continuation determining section 122 in oscillation detecting section 105 increases, and at time t2, the oscillation detection signal (H-level) indicating detection of oscillation is notified from oscillation detecting section 105 to parameter operating section 106. Upon receipt of such an oscillation detection signal at time t3, parameter operating section 106 gives output value deciding section 128 an operational instruction to capture the stiffness value of "3" before the update which is stored in old value storing section 127 and output the value. Upon receipt of this instruction, output value deciding section 128 outputs at time t3 the stiffness value of "3" before the update which was captured from old value storing section 127.

Consequently, the internal set value that is supplied from output value deciding section 128 to parameter setting section 130 is returned from stiffness value of "5" to "3". This narrows the frequency band width of feedback loop 104, leading to convergence of the oscillation after time t3, accompanied by a decrease in counter value, as shown in FIG. 10. Subsequently, at time t4, oscillation continuation determining section 122 switches the signal to the oscillation detection signal (L-level) indicating stoppage of the oscillation, and thereby a series of processing is completed. Namely, when oscillation occurs due to setting of the stiffness value of "5" as the external set value, eventually, as shown in FIG. 10, the internal set value is changed to stiffness value of "3" and the state is returned to one similar to the state where "3" was inputted as the stiffness value from the outside.

As thus described, even when the stiffness value is changed to a higher value, in the case of occurrence of oscillation in feedback loop 104, the present control apparatus automatically performs processing of returning the stiffness value back to the value before the update, whereby it is possible to stop oscillation that occurs in feedback loop 104 in a short period of time, and also to smoothly perform a stiffness value adjusting operation.

Figure 11:
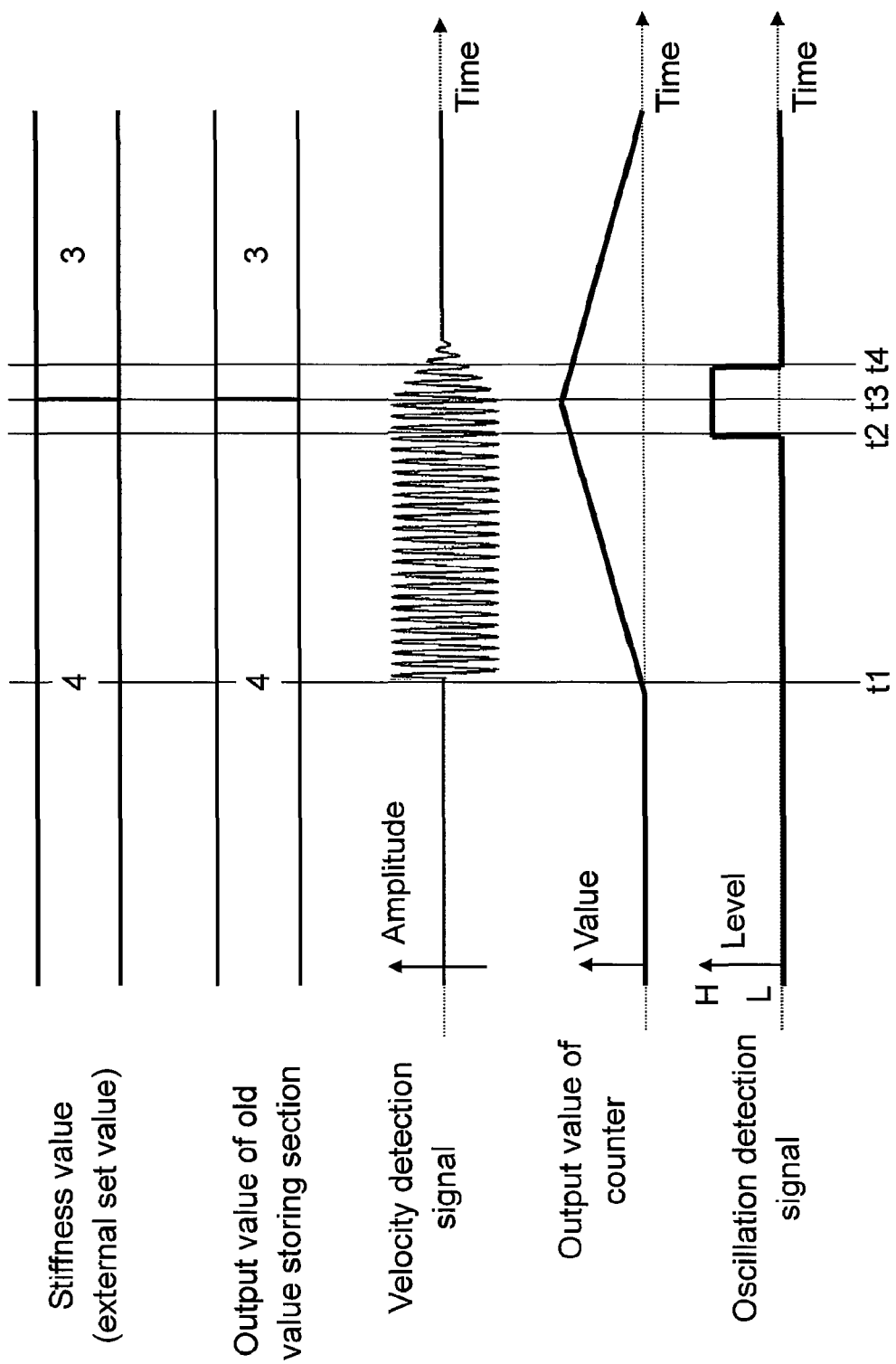
FIG. 11 is a timing chart for describing another operational example of the same control apparatus.

FIG. 11 is a timing chart for describing another operational example of the control apparatus of the present embodiment. Next described is an operation in a case where the stiffness value is started with initial value of "4" as shown in FIG. 11. Further, FIG. 11 shows such a case where feedback loop 104 is in a dormant state before time t1, and starts to act as in an active state at time t1, and at this time, oscillation occurs in feedback loop 104.

As shown in FIG. 11, at time t2, oscillation detecting section 105 detects oscillation of feedback loop 104. In this case, since the stiffness value has never been changed until this time, the stiffness value before the update is regarded to be the initial value of "4".

Therefore, since the current output value of stiffness value updating section 131 is a value equal to the output value before the update and the output value before the update cannot be lower, an operation is performed in this case so as to output a value corresponding to stiffness lower by a rank of "1" than the current output value. Namely, upon receipt of the oscillation detection signal (H-level) indicating detection of oscillation shown in FIG. 11, output value deciding section 128 outputs at time t3 a value as an output value updated to "3" that is the value corresponding to stiffness lower by the rank of "1" from the initial value of "4". In this case, the value of old value storing section 127 is also set to "3" as the same value at time t3, as shown in FIG. 11.

Consequently, the band width of frequency band fs of feedback loop 104 is narrowed and after time t3, the oscillation is converged, accompanied by a decrease in counter value, to complete a series of processing. Further, the output value of output value deciding section 128 is inputted into set value storing section 125, and set value storing section 125 rewrites the stored stiffness value from the initial value of "4" to "3". Namely, the state becomes one similar to the state where "3" was inputted as the stiffness value from the outside.

As thus described, such a configuration is formed where, when oscillation detecting section 105 detects oscillation of feedback loop 104, stiffness value updating section 131 compares the current updated output value with the output value before the update, and updates its output value to a value corresponding to stiffness lower by a predetermined rank than the current updated output value in the case of the output value before the update being a value corresponding to higher stiffness or the case of the current updated output value being equal to the output value before the update. Accordingly, even when oscillation occurs in the case of setting the initial value of the stiffness value or the like, processing of updating the stiffness value to the value corresponding to stiffness that is lower by a predetermined rank is automatically performed, whereby it is possible to stop oscillation that occurs in feedback loop 104 in a short period of time, and also to smoothly perform a stiffness value adjusting operation.

Figure 12:
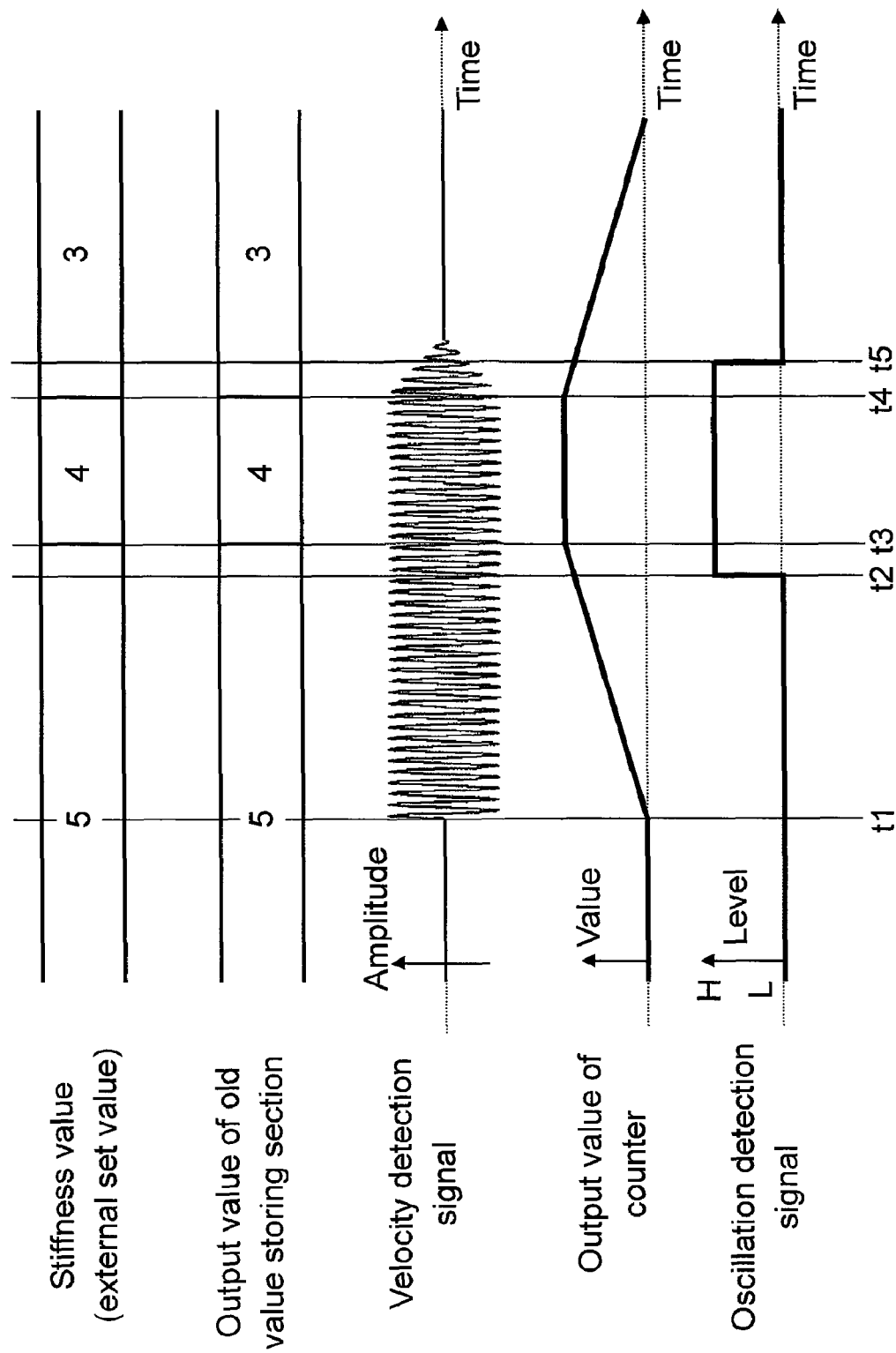
FIG. 12 is a timing chart for describing yet another operational example of the same control apparatus.

FIG. 12 is a timing chart for describing yet another operational example of the control apparatus of the present embodiment. Next described is an operation in a case where the stiffness value is started with initial value of "5" as shown in FIG. 12. FIG. 12 also shows such a case where feedback loop 104 is in the dormant state before time t1, and starts to act as in the active state at time t1, and at this time, oscillation occurs in feedback loop 104.

As shown in FIG. 12, at time t2, oscillation detecting section 105 detects oscillation of feedback loop 104. In this case as well, since the stiffness value has never been changed until this time, the stiffness value before the update is regarded to be the initial value of "5".

Therefore, since the current output value of stiffness value updating section 131 is a value equal to the output value before the update and the output value before the update cannot be lower, an operation is performed in this case so as to output a value corresponding to stiffness lower by the rank of "1" than the current output value. Namely, at time t3, output value deciding section 128 outputs value of "4" as an updated output value that is the value corresponding to stiffness lower by the rank of "1" from the initial value of "5". Further, the value of old value storing section 127 is also set to "4" as the same value at time t3.

FIG. 12 shows such a case where oscillation continues to occur despite updating of the output value as described above. Namely, although the band width of frequency band fs of feedback loop 104 is slightly narrowed as a result of updating the output value, it is not yet at a sufficiently low level, and thereby, velocity detection signal dv vibrates and oscillation continues to occur after time t3. Further, the counter value has reached a saturated level, and oscillation continuation determining section 122 continues to output a value at the H-level indicating oscillation.

In this case, since the current output value of stiffness value updating section 131 is a value corresponding to stiffness lower than the output value before the update, an operation is performed so as to output a value corresponding to stiffness that is further lower by the rank of "1" than the current output value. Namely, at time t4, output value deciding section 128 outputs value of "3" as an updated output value that is the value corresponding to stiffness further lower by the rank of "1" than the current output value of "4". Moreover, the value of old value storing section 127 is also set to "3" as the same value at time t4.

Since this further narrows the band width of frequency band fs of feedback loop 104, as shown in FIG. 12, the vibration of velocity detection signal dv is converged and the counter value is reduced, to complete a series of processing. Moreover, a value outputted by output value deciding section 128 is inputted into set value storing section 125, and the stored stiffness value is rewritten to "3". Namely, the state comes to one similar to the state where "3" was inputted as the stiffness value from the outside.

As thus described, such a configuration is formed where, when oscillation detecting section 105 detects oscillation of feedback loop 104, stiffness value updating section 131 compares the current updated output value with the output value before the update, and updates its output value to a value corresponding to stiffness lower by a predetermined rank than the current updated output value in the case of the output value before the update being a value corresponding to higher stiffness or the case of the current updated output value being equal to the output value before the update. Accordingly, even when oscillation occurs in the case of setting the initial value of the stiffness value or some other case, processing of updating the stiffness value to the value corresponding to stiffness that is lower by a predetermined rank at each time is automatically performed until the oscillation stops, whereby it is possible to stop oscillation that occurs in feedback loop 104 in a short period of time, and also to smoothly perform a stiffness value adjusting operation.

Incidentally, in the case of the operational example as shown in FIG. 12, the stiffness value is started with the initial value of "5", and the output value of stiffness value updating section 131 is updated in two steps, from "5" to "4" and from "4" to "3". For this reason, a slightly longer period of time is required until the oscillation of feedback loop 104 eventually stops as compared with the operational example shown in FIG. 11. Therefore, it can be said that in the case of the operational example as shown in FIG. 12, the degree of damage inflicted by this oscillation to load 102 slightly increases.

For example, when the state of feedback loop 104 changes from the dormant state to the active state at the time of power-on or the like, it may be immediately after the changing of load 102, and in that case, stiffness and a moment of inertia of load 102 is changed. Thus, there is a possibility that the stiffness value is significantly shifted from the optimal value. In such a case, there is a concern that updating the output value of stiffness value updating section 131 in stages as the operational example shown in FIG. 12 results in a relatively longer period of time required until eventual stoppage of the oscillation, to increase the degree of damage inflicted by the oscillation to load 102.

Figure 13:
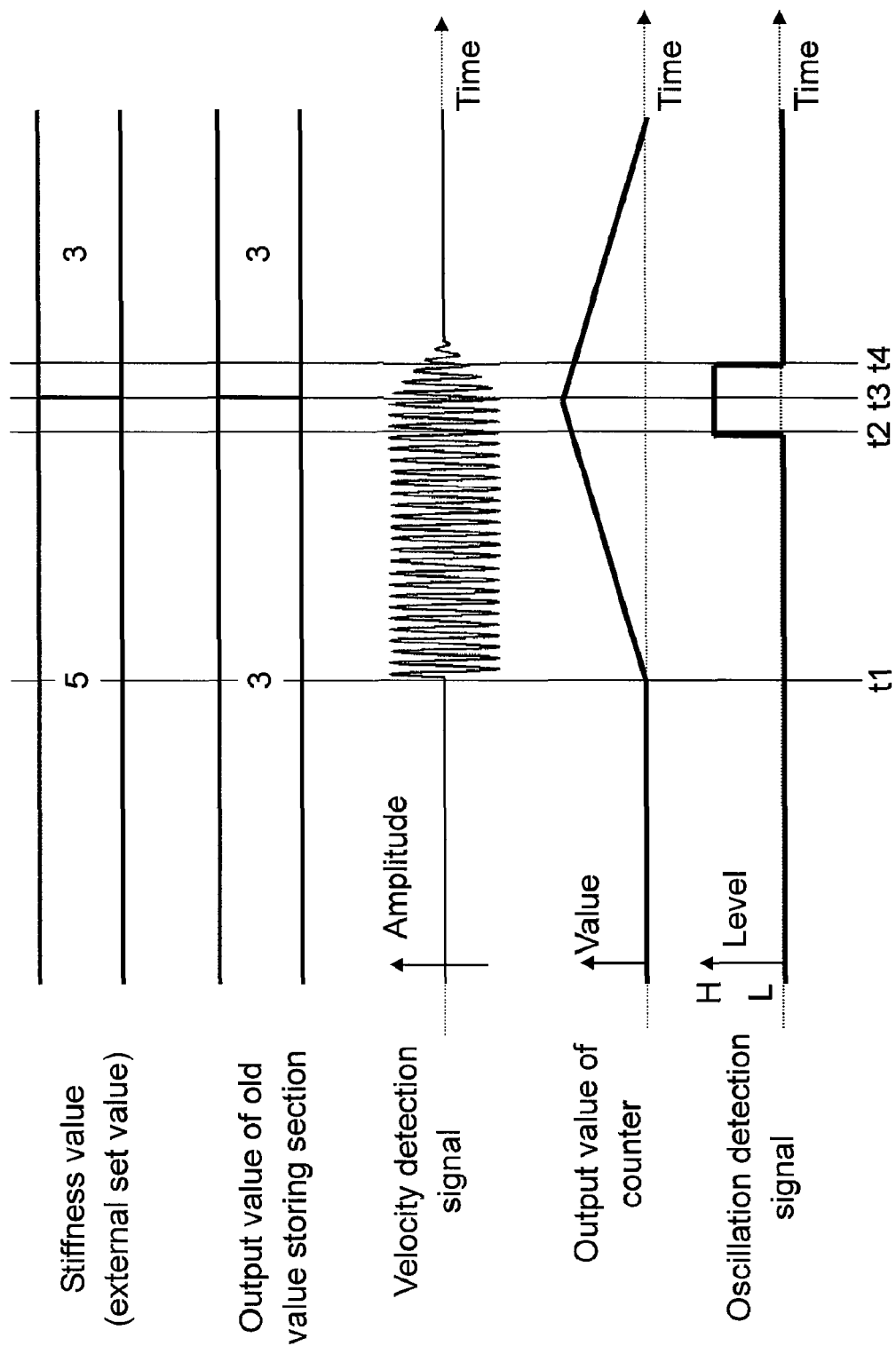
FIG. 13 is a timing chart for describing yet another operational example of the same control apparatus.

FIG. 13 is a timing chart for describing yet another operational example of the control apparatus of the present embodiment. In FIG. 13, such an operational example as to suppress the time required until stoppage of oscillation is cited as compared with the operational example shown in FIG. 12. In the foregoing description, the value before the update as the output value of stiffness value updating section 131, namely the value of old value storing section 127, is regarded as "5" that is a value equal to the initial value of the stiffness value, whereas in FIG. 13, an operational example is shown based upon such a method as to set a value corresponding to predetermined stiffness with which the oscillation of feedback loop 104 is expected to stop reliably.

Although the output value of old value storing section 127 is "5" at time t1 in the case of FIG. 12, the output value of old value storing section 127 is "3" in this operational example as shown in FIG. 13. This is because "3" is set as the value corresponding to predetermined stiffness with which oscillation of feedback loop 104 is expected to stop reliably as described above.

Oscillation detecting section 105 detects oscillation of feedback loop 104 at time t2. At this time, as for the output value of stiffness value updating section 131, the value before the update corresponds to lower stiffness. Therefore, as shown in FIG. 13, the output value of stiffness value updating section 131 is updated from "5" to "3" at time t3. Consequently, the band width of frequency band fs of feedback loop 104 is narrowed sufficiently, and hence the oscillation starts to be converged at time t3 as shown in FIG. 13.

As thus described, in the present embodiment, such a configuration is formed where, when the state of the feedback loop changes from the dormant state to the active state, the stiffness value updating section sets a value as the output value before the update, the value corresponding to predetermined stiffness with which the oscillation of the feedback loop is expected to stop reliably. Thereby, even when the state of feedback loop 104 changes from the dormant state to the active state with the initial value of the stiffness value being high, in the case of occurrence of oscillation in feedback loop 104, the control apparatus of the present embodiment automatically performs processing of updating the stiffness value to a value corresponding to predetermined stiffness. It is thereby possible to stop oscillation that occurs in feedback loop 104 in a short period of time, and to suppress damage inflicted to load 102 at the minimum.

Figure 14:
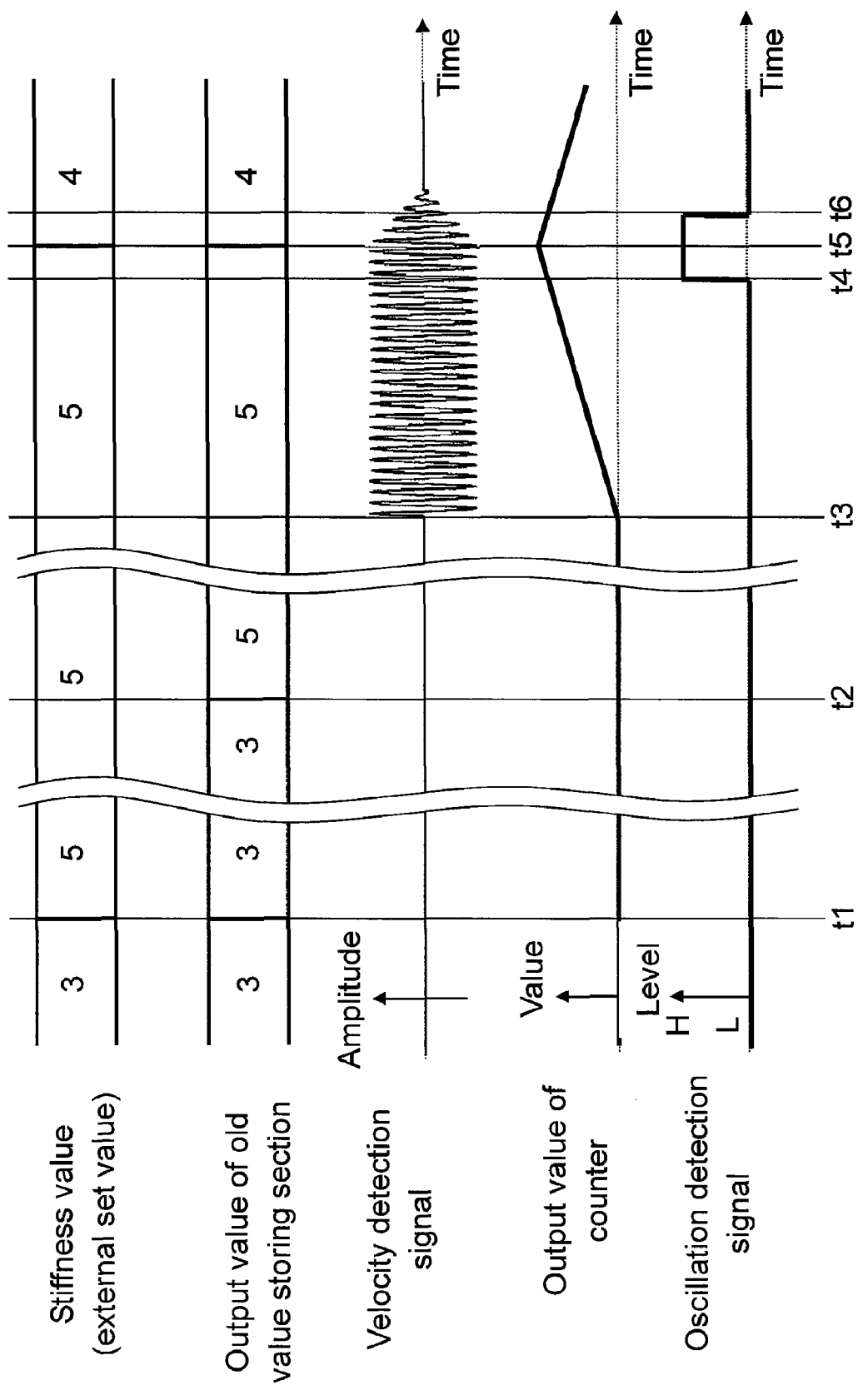
FIG. 14 is a timing chart for describing yet another operational example of the same control apparatus.

FIG. 14 is a timing chart for describing yet another operational example of the control apparatus of the present embodiment. Next described is an operational example of such a case where the stiffness value is set from the initial value of "3" to "5" at time t1, oscillation does not occur in feedback loop 104 until time t3, and oscillation occurs for the first time at time t3, as shown in FIG. 14. Further, it is assumed here that the time from time t1 to time t3 is relatively long and is, for example, five seconds.

As shown in FIG. 14, the output value of old value storing section 127 is "3" at time t1. Subsequently, at time t2 after the lapse of predetermined time (e.g. two seconds) from time t1, set value update detecting section 126 gives old value storing section 127 a command to store the output value of stiffness value updating section 131. Therefore, the output value of old value storing section 127 changes from "3" to "5" at time t2.

Thereafter, as shown in FIG. 14, oscillation occurs in feedback loop 104 at time t3, and oscillation detecting section 105 detects the oscillation at time t4. At this time, with the value of old value storing section 127 being "5", the output value of stiffness value updating section 131 before the update is regarded as "5". Accordingly, the operation thereafter is performed similarly to the operation described in FIG. 11, the output value of stiffness value updating section 131 is "4" as a value corresponding to stiffness lower by the rank of "1" at time t5, and the oscillation of feedback loop 104 stops at time t6.

As shown in FIG. 14, judging from that oscillation has not occurred in feedback loop 104 for a relatively long time from time t1 to time t3, there is a high possibility that "5" as a value set as the stiffness value at time t1 is close to the optimal value as for the stiffness value corresponding load 102 of motor 101. Hence, even when oscillation occurs in feedback loop 104 thereafter, in such a case, it can be said that there is a higher possibility that, a value obtained by updating the output value to "4" as the value corresponding to stiffness lower by the rank of "1" than the current output value and outputting the value is closer to the optimal value as the stiffness value and is thus more desirable than a value obtained by returning the output value of stiffness value updating section 131 back to "3" as the value before the update.

In such a manner, even when oscillation occurs in feedback loop 104 after the lapse of predetermined time from updating of the stiffness value, the control apparatus of the present embodiment automatically performs processing of updating the stiffness value to the optimal value, so as to stop oscillation that occurs in feedback loop 104 in a short period of time, and also to smoothly perform a stiffness value adjusting operation.

In addition, although it was described in the present embodiment that the output value is updated to the value corresponding to stiffness lower by the rank of "1" than the current output value in the case of the output value of stiffness value updating section 131 before the update being not the value corresponding to stiffness lower than the updated output value, a case can be considered where oscillation having occurred in feedback loop 104 can be more promptly stopped by updating the output value to a value corresponding to stiffness lower by the rank of "1" or higher, for example a value corresponding to stiffness lower by a rank of "2", and outputting the value. It is thus desirable in this case to select an operation in accordance with a request to the control apparatus.

As described above, when oscillation detecting section 105 detects oscillation of feedback loop 104 while stiffness value updating section 131 updates the stiffness value to the inputted value and outputs the value, the operation of updating the output value to the optimal value is automatically performed, whereby it is possible to realize a servo motor control apparatus capable of stopping oscillation that occurs in feedback loop 104 in a short period of time, and smoothly performing a stiffness value adjusting operation.

Embodiment 4

Figure 15:
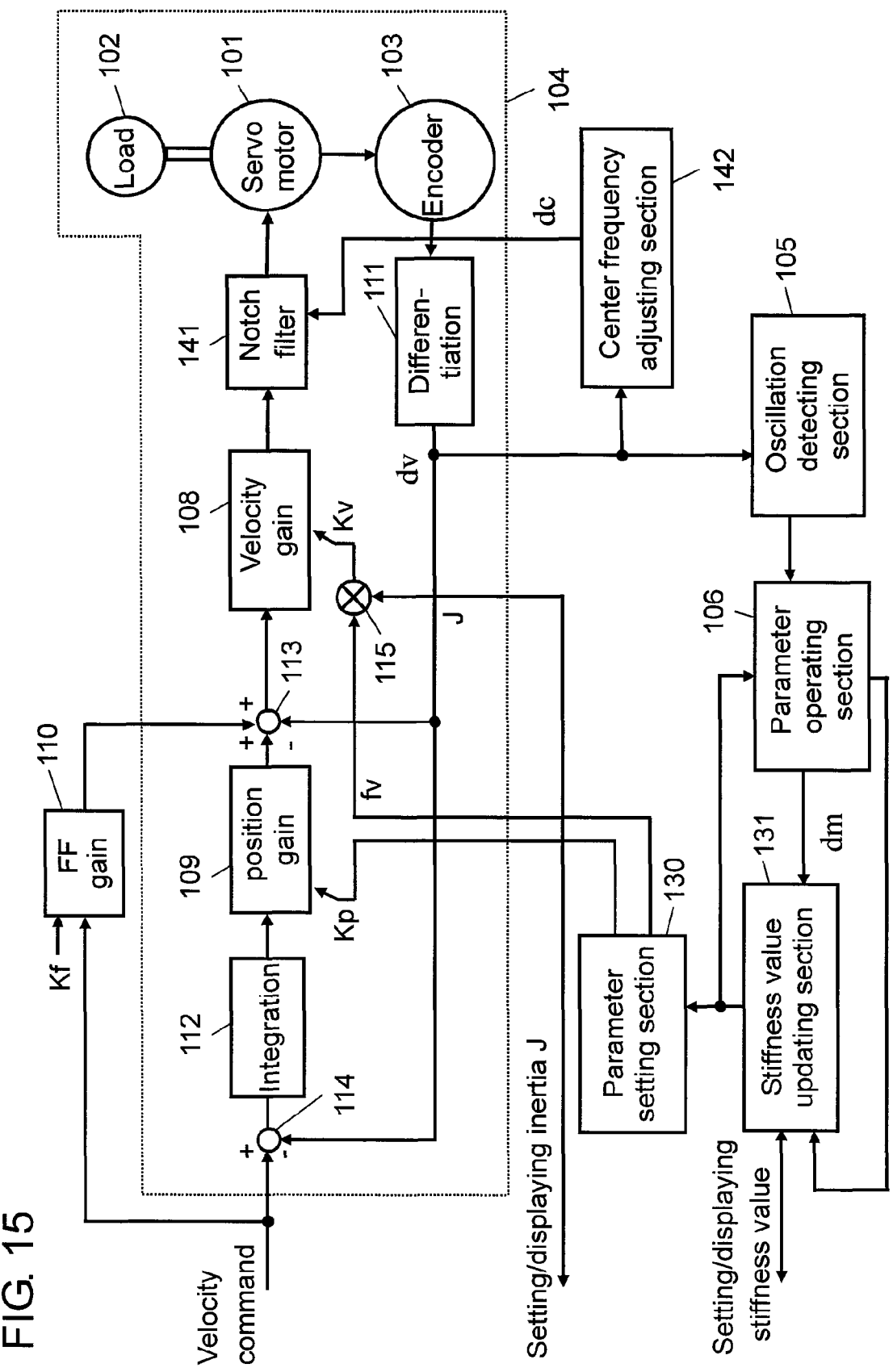
FIG. 15 is a block diagram of a servo motor control apparatus in Embodiment 4 of the present invention.

FIG. 15 is a block diagram of a servo motor control apparatus in Embodiment 4 of the present invention. In comparison with Embodiment 3, notch filter 141 and center frequency adjusting section 142 are further provided in Embodiment 4. It is to be noted that in FIG. 15, the same constituents as those in FIG. 8 are provided with the same reference numerals as those in FIG. 8, and detailed descriptions thereof are not given.

In the present embodiment, a rotation control signal outputted from velocity gain multiplying section 108 is supplied to first notch filter 141. Notch filter 141 operates so as to cut off a signal component having a predetermined band width with a frequency as a center frequency at the center. Further, notch filter 141 has a function of making the center frequency variable by a command from the outside. In the present embodiment, the rotation control signal with a specific frequency component removed therefrom as above is outputted from notch filter 141, and a drive signal corresponding to this rotation control signal is supplied to motor 101.

Figure 16A:
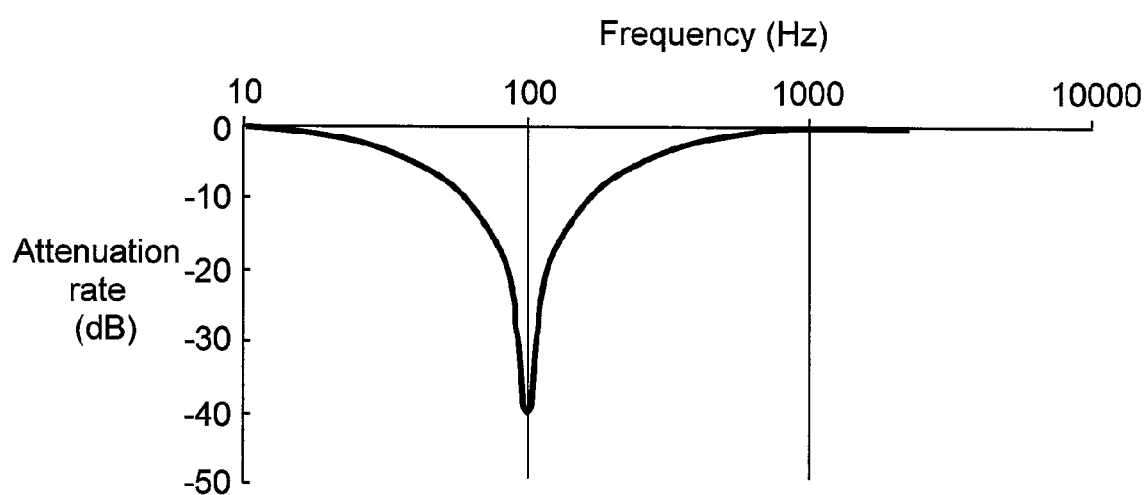
FIG. 16A is a diagram showing a frequency transferring characteristic in the case of a center frequency of a notch filter of the same control apparatus being 100 Hz.
Figure 16B:
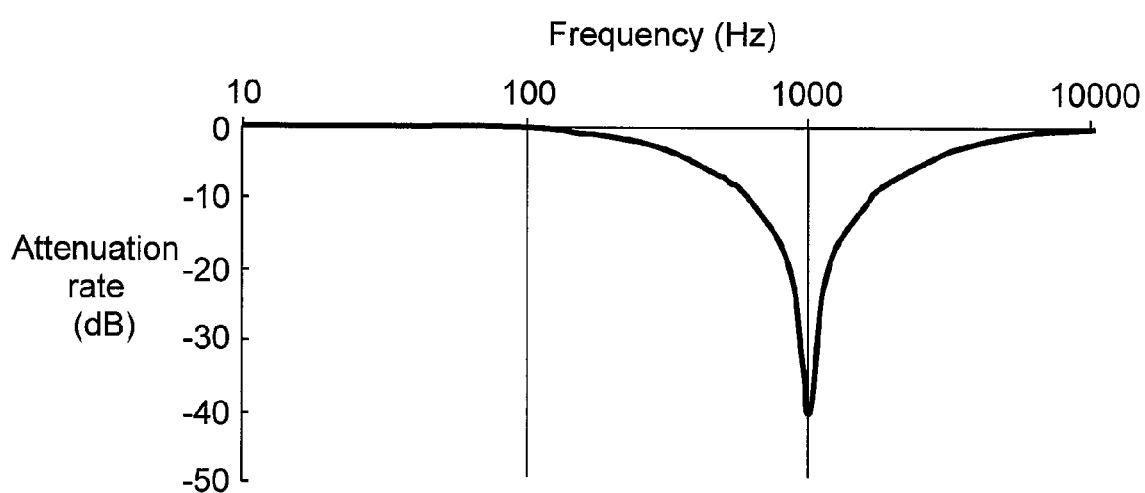
FIG. 16B is a diagram showing a frequency transferring characteristic in the case of a center frequency of a notch filter of the same control apparatus being 1000 Hz.

FIGS. 16A and 16B are views showing frequency transfer characteristics of notch filter 141, where FIG. 16A shows the case of the center frequency being 100 Hz, and FIG. 16B shows the case of the center frequency being 1000 Hz. In notch filter 141, the center frequency for cutoff can be varied by a command from the outside, for example, in the range of 100 Hz to 1000 Hz as shown in FIGS. 16A and 16B.

Further, center frequency adjusting section 142 is supplied with velocity detection signal dv from differential operation section 111. Center frequency adjusting section 142 generates center frequency adjustment signal dc through use of supplied velocity detection signal dv, and outputs the signal to notch filter 141.

Based upon this center frequency adjustment signal dc, notch filter 141 adjusts the center frequency for cutoff.

Figure 17:
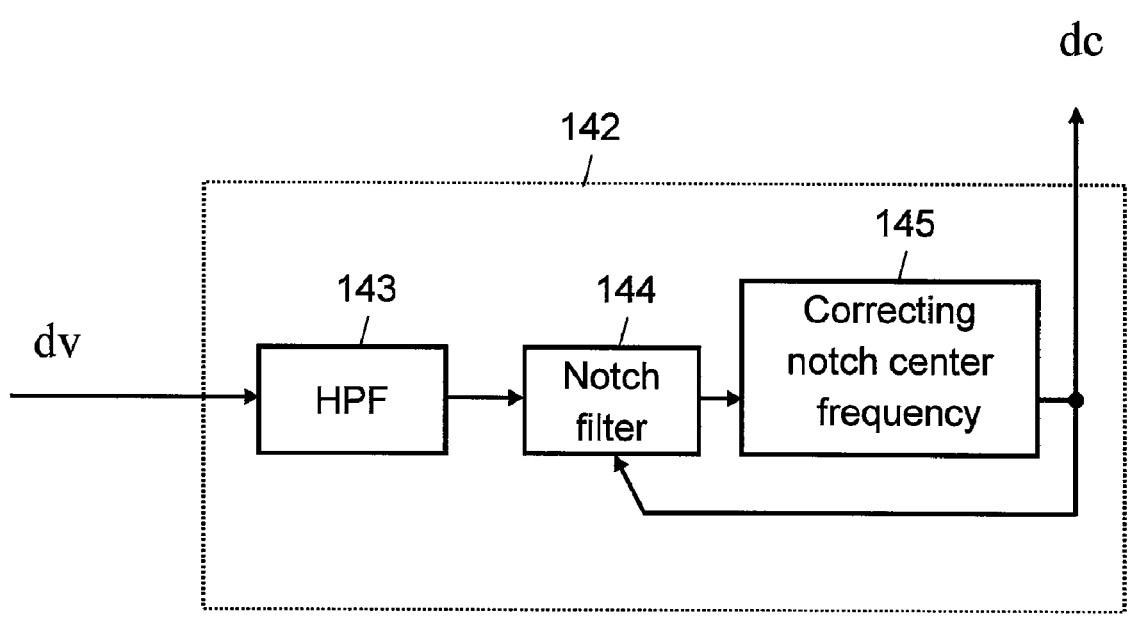
FIG. 17 is a block diagram showing a detailed configuration of a center frequency adjusting section of the same control apparatus.

FIG. 17 is a block diagram showing a detailed configuration of center frequency adjusting section 142. In FIG. 17, velocity detection signal dv supplied from differential operation section 111 is supplied to high-pass filter 143. For the velocity detection signal dv, high-pass filter 143 cuts off a signal component with a frequency lower than a predetermined frequency, only extracts a high-frequency signal component, and outputs the component. The high-frequency signal component outputted from high-pass filter 143 is supplied to second notch filter 144. Notch filter 144 has the same characteristics and function as those of notch filter 141, cuts off a predetermined frequency component at the center frequency directed from the outside, and outputs the component. The signal outputted from notch filter 144 is supplied to notch center frequency correcting section 145. Notch center frequency correcting section 145 outputs to notch filter 144 center frequency adjustment signal dc for directing the center frequency of notch filter 144 so as to minimize an amplitude of a signal outputted from notch filter 144. Then, center frequency adjustment signal dc is supplied to notch filter 141.

Notch filter 141 and center frequency adjusting section 142 as thus configured act such that, when oscillation occurs in feedback loop 104 and vibration occurs in velocity detection signal dv, the center frequency of notch filter 141 is automatically adjusted so as to cut off the frequency component of the vibration, and the oscillation having occurred in feedback loop 104 is stopped.

Next, an operation of the servo motor control apparatus of the present embodiment configured as above is described, citing a specific example.

Figure 18:
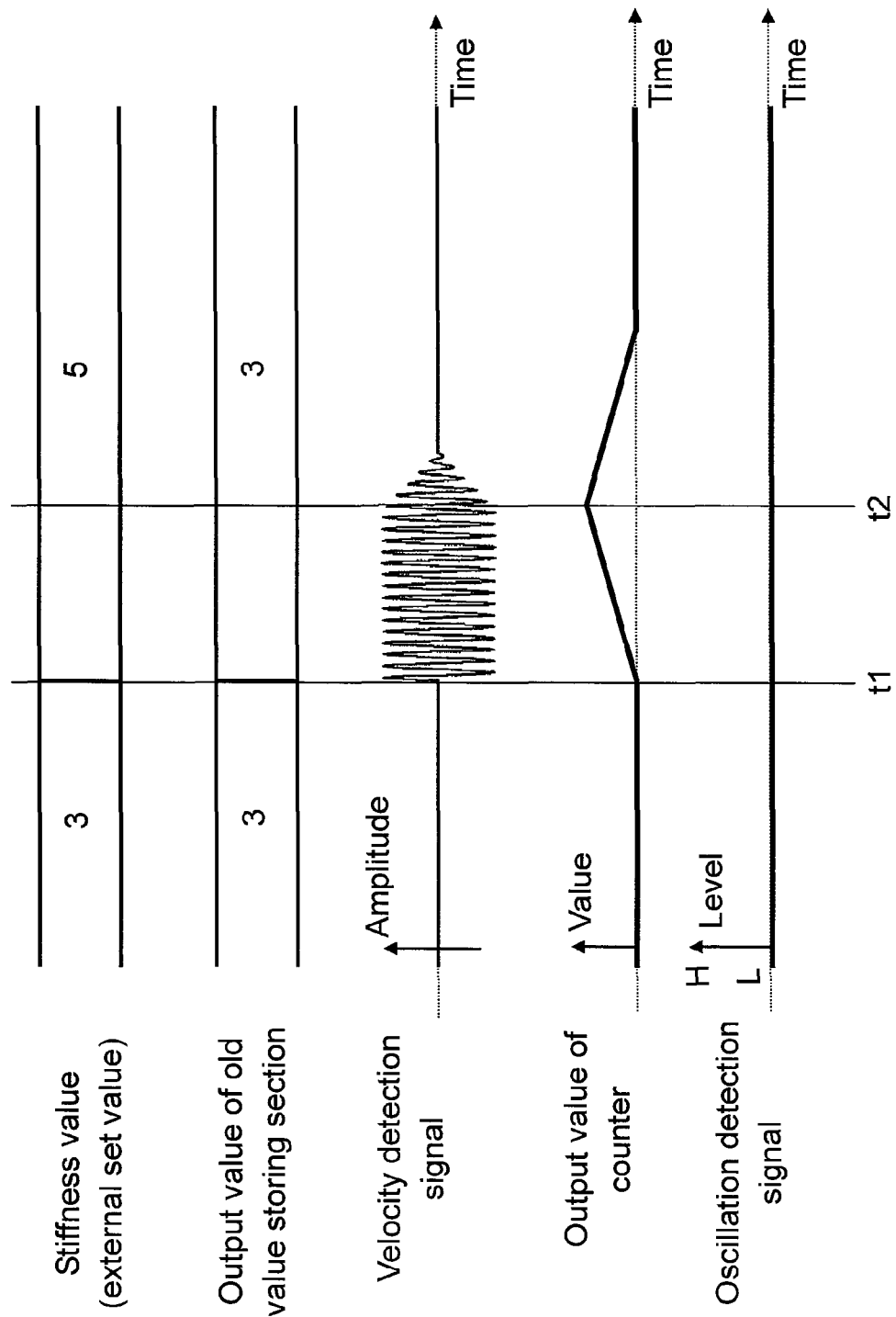
FIG. 18 is a timing chart for describing an operational example of the same control apparatus.

FIG. 18 is a timing chart for describing an operational example of the control apparatus of the present embodiment. First described is an operation of a case where the stiffness value is set as the initial value of "3" and changed to "5" at time t1, as shown in FIG. 18. It should be noted that the values shown in table 5 are used for the stiffness values and control parameters corresponding thereto. Further, as oscillation detecting section 105, an example of oscillation continuation determining section 122 as shown in FIG. 3 is provided with the counter mentioned above is used.

First, as shown in FIG. 18, until time t1, the stiffness value is set as the initial value of "3", and at this time, neither velocity detection signal dv is vibrating, nor does oscillation occur in feedback loop 104.

Next, at time t1, a stiffness value of "5" is supplied from the outside, and the value of set value storing section 125 changes from "3" to "5". FIG. 18 shows such a case where, due to the change in stiffness value as thus described, the band width of frequency band fs of feedback loop 104 increases and velocity detection signal dv starts to vibrate after time t1.

Such velocity detection signal dv is also inputted into center frequency adjusting section 142. Notch center frequency correcting section 145 adjusts its output signal and outputs the signal such that notch filter 144 cuts off the frequency of velocity detection signal dv, namely the center frequency of notch filter 144 is consistent with the frequency of the vibrating velocity detection signal dv. Center frequency adjustment signal dc outputted by center frequency adjusting section 142 gives notch filter 141 a command to make its center frequency consistent with the center frequency of notch filter 144, and thereby acting so as to stop the oscillation of feedback loop 104.

As a result, when the oscillation of feedback loop 104 stops at time t2, the counter having been counting up starts to count down at time t2. Namely, since the counter starts to count down before oscillation continuation determining section 122 reaches a predetermined value for determination of occurrence of oscillation, oscillation continuation determining section 122 continues to output a value at the L-level without outputting a value at the H-level indicating detection of oscillation.

Therefore, as shown in FIG. 18, the output value of stiffness value updating section 131 is kept at the stiffness value of "5" after time t2.

Meanwhile, there may be a case where the oscillation of feedback loop 104 does not stop as a result of adjustment of the center frequency of notch filter 141 by means of center frequency adjustment signal dc. Examples of the case include a case where the frequency of the oscillation deviates from the variable range of the center frequency of notch filter 141, or a case where the value of velocity gain Kv is excessively large. In such cases, as shown in FIG. 10 in Embodiment 3, oscillation continuation determining section 122 outputs a value at the H-level and returns the output value of stiffness value updating section 131 from the stiffness value of "5" back to "3", thereby stopping the oscillation of feedback loop 104.

It is to be noted that predetermined time is required for the counter value inside oscillation continuation determining section 122 to reach a predetermined value as described above. Making this predetermined time longer than the time (e.g. 200 msec) required for center frequency adjusting section 142 to adjust the center frequency of notch filter 141 can prevent stiffness value updating section 131 from updating its output value during the time when center frequency adjusting section 142 adjusts the center frequency of notch filter 141. Thereby, the output value of stiffness value updating section 131 is kept at the current stiffness value when the oscillation by action of notch filter 141 is stopped, and the output value of stiffness value updating section 131 is returned from the current stiffness value back to the stiffness value before the update when the oscillation by action of notch filter 141 is not stopped, and in such a manner, it is possible to perform an operation of stopping the oscillation of feedback loop 104.

Further, in this case, since the band width of frequency band fs of feedback loop 104 is larger with the stiffness value being "5" rather than the stiffness value being "3", the response to the velocity command is better and more desirable. Namely, since there is a possibility that a higher stiffness value is held in the present embodiment than in Embodiment 3, the response to the velocity command is also more desirable, or an equivalent response is shown.

Further, although the time required for adjustment of the center frequency of notch filter 141 is estimated as fixed time as described above in the present embodiment, in a case where processing of adjusting the center frequency is observed and this processing is completed earlier than estimated time, an operation of returning the output value of stiffness value updating section 131 from the current stiffness value back to the stiffness value before the update to stop the oscillation of feedback loop 104 before the estimated time point is also possible. This operation is more desirable since it allows earlier stoppage of the oscillation of feedback loop 104.

As described above, also in the case where notch filter 141 for suppressing oscillation of feedback loop 104 and center frequency adjusting section 142 for adjusting the center frequency thereof are provided, when oscillation occurs in feedback loop 104, the control apparatus of the present embodiment appropriately and automatically performs processing of holding the stiffness value as it currently is or returning the stiffness value back to the value before the update, whereby it is possible to stop oscillation that occurs in feedback loop 104 in a short period of time, and smoothly perform a stiffness value adjusting operation.

Embodiment 5

Figure 19:
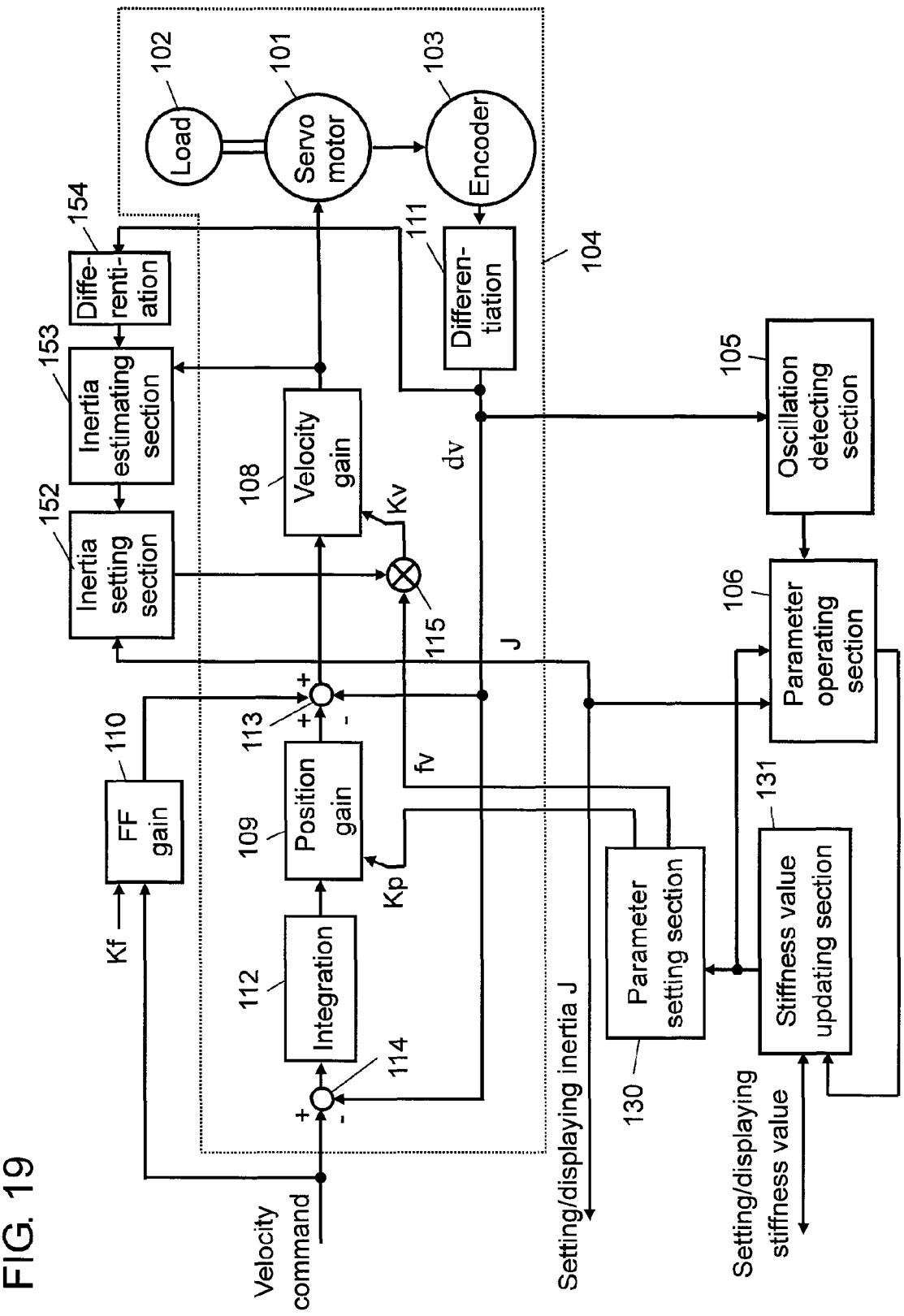
FIG. 19 is a block diagram of a servo motor control apparatus in Embodiment 5 of the present invention.

FIG. 19 is a block diagram of a servo motor control apparatus in Embodiment 5 of the present invention. In comparison with Embodiment 3, Embodiment 5 is characterized in that a function of estimating and setting inertia J as a moment of inertia of load 102 including motor 101 are provided. In order to realize such a function, the control apparatus in the present embodiment further includes inertia setting section 152, inertia estimating section 153 and differential operation section 154 in addition to the configuration described in Embodiment 3. It is to be noted that in FIG. 19, the same constituents as those in FIG. 8 are provided with the same reference numerals as those in FIG. 8, and detailed descriptions thereof are not given.

In FIG. 19, velocity detection signal dv outputted from first differential operation section 111 is supplied to second differential operation section 154. Differential operation section 154 further performs a differential operation on supplied velocity detection signal dv, to output an acceleration detection signal corresponding to a rotational acceleration of motor 101. The acceleration detection signal is supplied to inertia estimating section 153.

Inertia estimating section 153 is supplied with a rotation control signal corresponding to a torque command, outputted from velocity gain multiplying section 108, along with the acceleration detection signal. Based on these two kinds of signals, inertia estimating section 153 estimates the moment of inertia of load 102 including motor 101, and outputs the value as an inertia estimated value.

Inertia setting section 152 is supplied the inertia estimated value and with an inertia value as a set value of inertia J set from the external host equipment or the like. Inertia setting section 152 outputs the inertia estimated value from inertia estimating section 153 as the inertia set value when the inertia estimated value is effective. Further, inertia setting section 152 outputs the inertia J value from the outside as the inertia set value when the inertia estimated value is not effective. It is to be noted that such a configuration may be formed where this inertia set value is notified to the external host equipment or the like, and displayed outside in the host equipment or the like.

Here, inertia estimating section 153 is capable of estimating the moment of inertia of load 102 including motor 101 based upon the following principle. Namely, when the moment of inertia of motor 101 and load 102 is denoted as $J_L$, the rotational acceleration of motor 101 as $\beta$, and the torque given to servo motor 101 as T, the relation: $T = J_L \times \beta$, is established as a physical law. Based upon such a principle, inertia estimating section 153 estimates moment of inertia $J_L$ from two kinds of signals, an acceleration detection signal corresponding to rotational acceleration $\beta$ and a rotation control signal corresponding to torque T. More specifically, it is possible to estimate inertia by use of a technique such as iterative least square technique.

Further, from the viewpoint of the principle of operation, inertia estimating section 153 cannot accurately estimate a value of the moment of inertia of load 102 including motor 101 unless motor 101 rotates with a certain degree of acceleration or higher for a certain period of time or longer. Hence it is necessary to use an inertia initial set value as a provisional value in place of the inertia estimated value during the time when inertia estimating section 153 estimates the value of the moment of inertia of load 102 including motor 101. Therefore, the present embodiment is configured such that inertia setting section 152 outputs the set value of inertia J from the outside as the inertia initial set value before the inertia estimated value becomes effective, and outputs the inertia estimated value as the inertia set value after the value becomes effective.

Further, in the case of such a configuration, as for the inertia initial set value, a value that appears close to an actual value is generally used as the moment of inertia of load 102 including motor 101. However, there are cases where displacement has occurred between the inertia initial set value and the value of the actual moment of inertia or the inertia estimated value, and in that case, the value of velocity gain Kv changes before and after the inertia estimated value becomes effective.

For example, it is assumed that the inertia initial set value is a half of the value of the actual moment of inertia, and the inertia estimated value is a value equal to the value of the actual moment of inertia. In this case, the value of velocity gain Kv increases as being doubled before and after the inertia estimated value becomes effective. As thus described, when the inertia initial set value is a value smaller than the inertia estimated value, the value of velocity gain Kv increases. When the value of the actual moment of inertia remains unchanged before and after the inertia estimated value becomes effective, the actual frequency band width of feedback loop 104 increases by an amount of the increase in velocity gain Kv. Thus, there is a possibility that oscillation occurs in feedback loop 104 after the inertia estimated value becomes effective.

Therefore, the present embodiment is also configured to include oscillation detecting section 105, parameter operating section 106 and stiffness value updating section 131, thereby to automatically and promptly stop the oscillation having occurred in feedback loop 104.

An operation of the servo motor control apparatus configured as above is described, citing a specific example.

Figure 20:
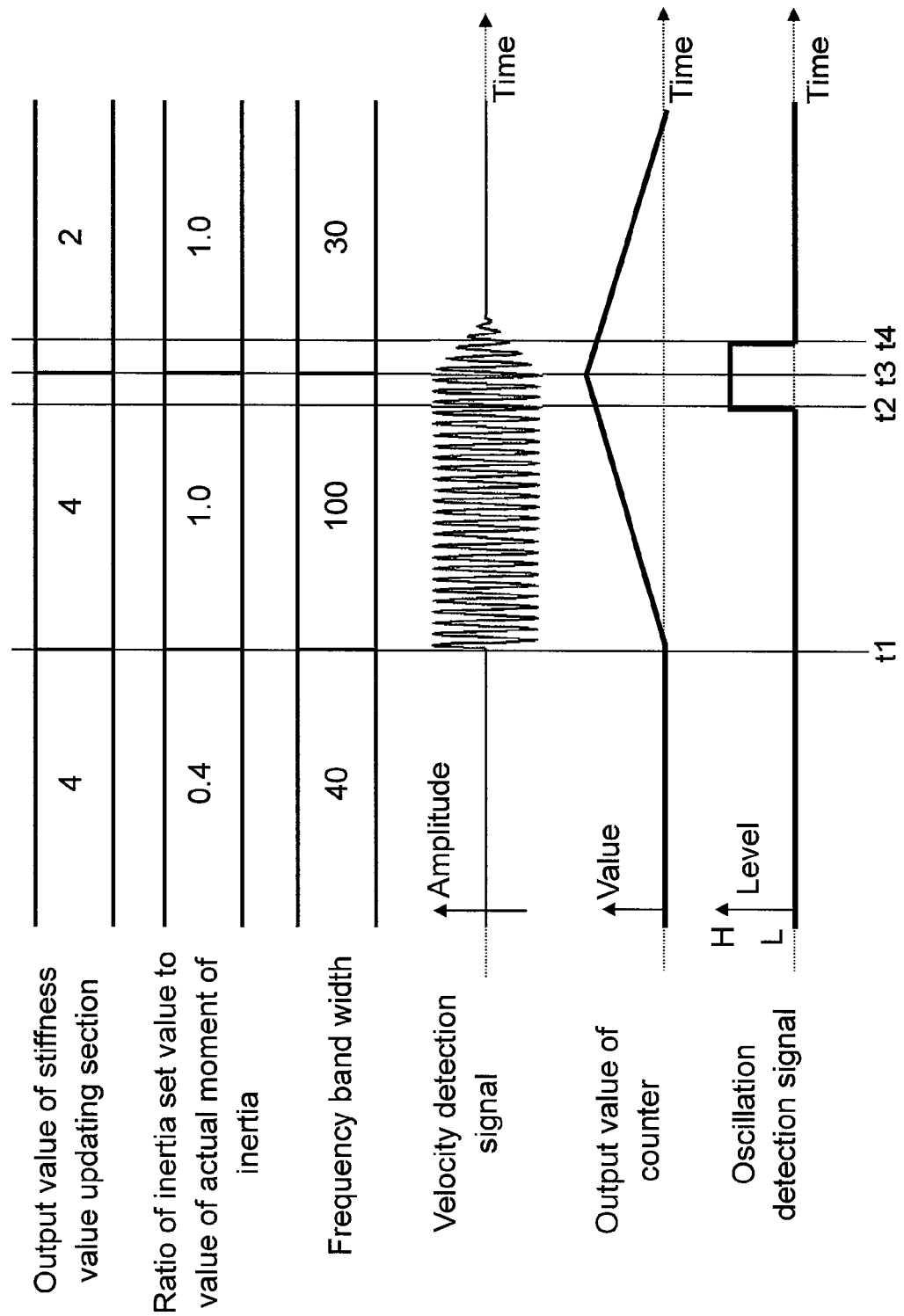
FIG. 20 is a timing chart for describing an operational example of the same control apparatus.

FIG. 20 is a timing chart for describing an operational example of the control apparatus of the present embodiment.

FIG. 20 shows a ratio of the inertia set value to the value of the actual moment of inertia, the value of the actual frequency band width of feedback loop 104 (unit: Hz) and the like, along with the output value of stiffness value updating section 131. When the inertia set value is denoted as Js and the value of the actual moment of inertia as Jr, a value indicating the actual frequency band width fsr of feedback loop 104 with respect to frequency band set value fs is: fsr=fs×(Js/Jr). Further, as for the stiffness value and the control parameters corresponding thereto, the respective values shown in table 5 are used. As oscillation detecting section 105, used is an example where oscillation continuation determining section 122 as shown in FIG. 3 includes the counter as described above.

In FIG. 20, cited is such an example where the inertia estimated value is not effective before time t1, and the inertia initial set value, namely the inertia set value Js at this point of time, is 0.4 times as large as the value of the actual moment of inertia Jr. Since the set value of frequency band fs is 100 (Hz) with respect to the stiffness value of "4" from table 5, actual frequency band width fsr is: fsr=100×0.4=40 (Hz).

At time t1, the inertia estimated value becomes effective, and the output value of the inertia setting section and the value of the actual moment of inertia become equal to each other, that is, the ratio of these values becomes 1.0. In this case, actual frequency band width fsr is: fsr=100×1.0=100 (Hz).

Further, since the actual frequency band width of feedback loop 104 becomes larger, oscillation occurs in feedback loop 104 at time t1.

When such oscillation occurs, as shown in FIG. 20, the output value of the counter of oscillation continuation determining section 122 in oscillation detecting section 105 increases, and at time t2, an oscillation detection signal (H-level) indicating detection of oscillation is notified from oscillation detecting section 105 to parameter operating section 106.

Upon receipt of such notification of the oscillation detection signal (H-level), parameter operating section 106 gives stiffness value updating section 131 an operational instruction as follows. Namely, upon receipt of this operational instruction, stiffness value updating section 131 outputs as the stiffness value to be outputted the stiffness value of "2" lower by a predetermined rank (in this case, rank="2") than the current stiffness value of "4" at time t3.

Consequently, the frequency band set value fs becomes narrower, and as shown in FIG. 20, actual frequency band width fsr of feedback loop 104 is also: fsr=30×1.0=30 (Hz). This leads to convergence of the oscillation, and along with the convergence, the counter value also decreases. Thereafter, oscillation continuation determining section 122 switches the signal to an oscillation detection signal (L-level) indicating stoppage of the oscillation at time t4, and thereby a series of processing is completed. Namely, as shown in FIG. 20, the internal set value is eventually changed to the stiffness value of "2", and the state returns to one similar to the state where "2" was inputted as the stiffness value from the outside.

Namely, the control apparatus of the present embodiment is configured such that, when the oscillation detection signal indicates detection of oscillation after the inertia estimated value becomes effective, in accordance with the operational instruction of parameter operating section 106, stiffness value updating section 131 switches the stiffness value to a value corresponding to stiffness lower by a predetermined rank than the current value, and this switched value is supplied to parameter setting section 130.

As thus described, when the actual frequency band width of feedback loop 104 increases with increase in inertia set value outputted by inertia setting section 152, to cause occurrence of oscillation in feedback loop 104, the control apparatus of the present embodiment automatically performs processing of updating the stiffness value to a value corresponding to stiffness lower by a predetermined rank. Thereby, it is possible to stop oscillation that occurs in feedback loop 104 in a short period of time and suppress damage inflicted to load 102 at the minimum.

In addition, when the value of the predetermined rank is too small, it takes a long time to stop the oscillation having occurred in feedback loop 104 due to repetition of the above series of operations and on the other hand, when the value is too large, the possibility is high that the oscillation having occurred in feedback loop 104 is reliably stopped in a short period time, however the necessity occurs thereafter for manually readjusting the stiffness value from the outside. Therefore, it is necessary to set an appropriate value taking both the advantage and disadvantage into consideration.

Figure 21:
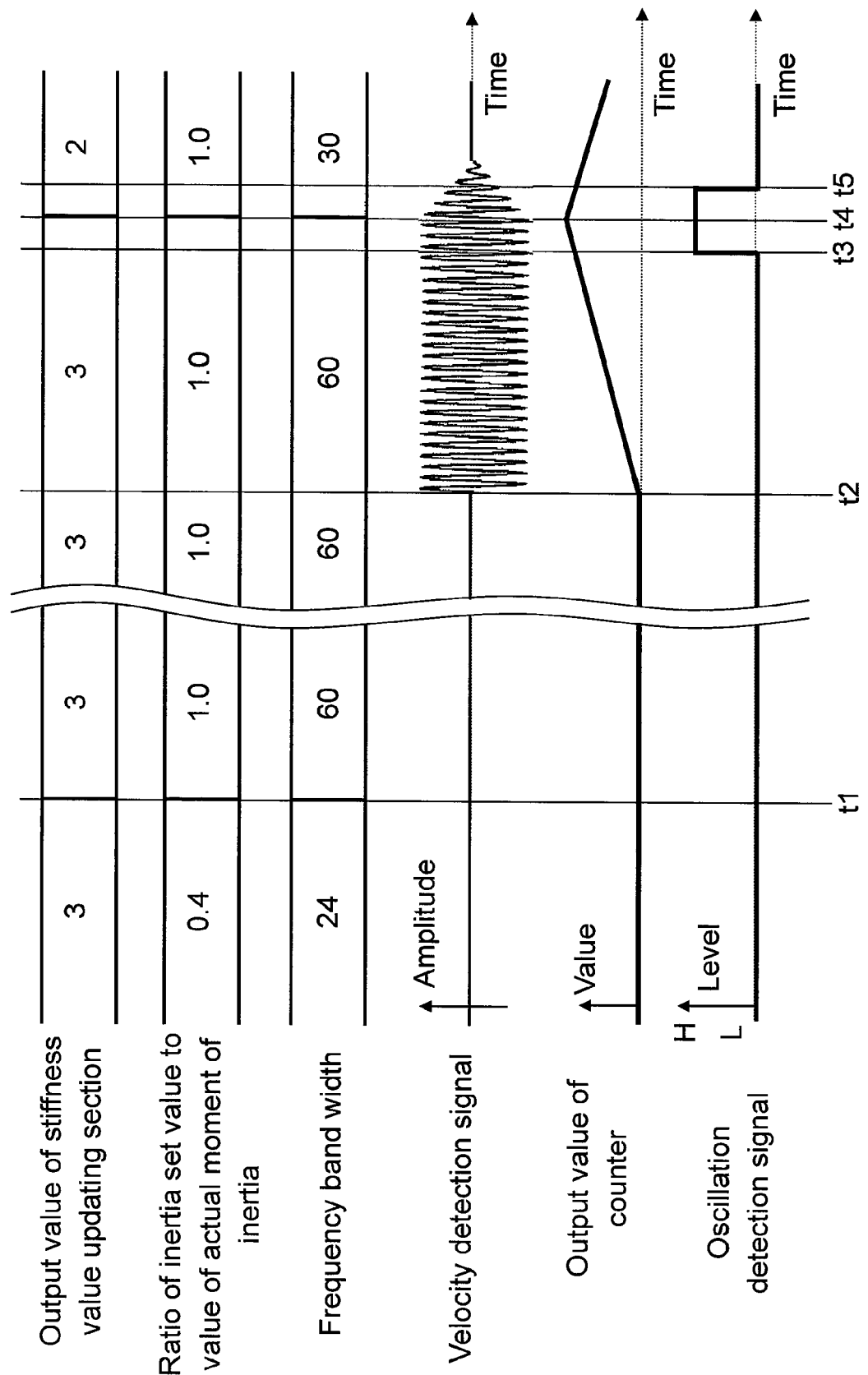
FIG. 21 is a timing chart for describing another operational example of the same control apparatus.

FIG. 21 is a timing chart for describing another operational example of the control apparatus of the present embodiment. Next described is an operation in the case of the stiffness value being started with an initial value of "3" as shown in FIG. 21. Further, as in the case of FIG. 20, before time t1, the inertia estimated value is not effective, and the inertia initial set value, namely the inertia set value Js at this point of time, is 0.4 times as large as the value of the actual moment of inertia Jr. Since the frequency band set value fs is 60 (Hz) with respect to the stiffness value of "3" from table 5, actual frequency band width fsr of feedback loop 104 is: fsr=60× 0.4=24 (Hz).

The output value of inertia estimating section 153 becomes effective at time t1, and the inertia set value as the output value of inertia setting section 152 and the value of the actual moment of inertia become equal to each other, that is, the ratio of these values becomes 1.0. In this case, actual frequency band width fsr of feedback loop 104 is: fsr=60×1.0=60 (Hz). In the case of the stiffness value being started with "4" as in FIG. 20, oscillation soon occurred in feedback loop 104 at time t1, but in this case, actual frequency band width fsr of feedback loop 104 is 60 (Hz) which is relatively narrow and at the level on the verge of exciting the oscillation. Therefore, oscillation does not occur at time t1, and oscillation occurs in feedback loop 104 at time t2. Further, in this case, it is assumed that the time from time t1 to time t2 is longer than predetermined time (e.g. 1 second). Hence oscillation is detected similarly at time t3, but the output value of stiffness value updating section 131 is updated at time t4 to the stiffness value of "2" as a value corresponding to stiffness lower, not by the foregoing rank of "2" but by the rank of "1", with respect to the stiffness value of "3" at the time of start.

Consequently, the frequency band set value fs becomes lower, and as shown in FIG. 21, actual frequency band width fsr of feedback loop 104 is also: fsr=30×1.0=30 (Hz), and the oscillation is converged. As thus described, that the time from the inertia estimated value becoming effective until oscillation occurring in feedback loop 104 is long means that the stiffness value for stopping the oscillator is not significantly deviated from the stiffness value of "3" at the time of start. Therefore, in this case, a more desirable result is obtained by updating the stiffness value to the stiffness value of "2" as a value corresponding to stiffness lower by the rank of "1" with respect to the stiffness value of "3" at the time of start than updating the stiffness value to the stiffness value of "1" as a value corresponding to stiffness lower by the rank of "2". This is because, when the value is updated to the stiffness value of "1", the stiffness value "2" needs to be manually set from the outside again in order to operate feedback loop 104 with the stiffness value of "2" as the optimal value.

As thus described, when oscillation of feedback loop 104 is detected beyond predetermined time from the output of inertia estimating section 153 becoming effective, stiffness value updating section 131 performs processing of switching its output value to a value corresponding to stiffness lower by the rank of "1" than the current output value, so as to stop the oscillation that occurs in feedback loop 104 in a short period of time, and set the output value of stiffness value updating section 131 to a more desirable stiffness value in accordance with conditions.

In this case, the operation is switched based upon whether or not the time from the output of inertia estimating section 153 becoming effective until oscillation of feedback loop 104 being detected is beyond the predetermined time. Instead, for example, a plurality of periods of time are provided as T1, T2, . . . (T1<T2), and the stiffness value is updated to a stiffness value corresponding to stiffness lower by a rank of "K0" when the time is not beyond time T1, the stiffness value is updated to a stiffness value corresponding to stiffness lower by a rank of "K1" when the time is beyond time T1 and not beyond time T2, the stiffness value is updated to a stiffness value corresponding to stiffness lower by a rank of "K2" when the time is beyond time T2, and the ranks are made to satisfy: K0>K1>K2. Namely, setting the optimal stiffness value in a more meticulous manner is possible by setting the rank sequentially smaller with increase in time from the output of inertia estimating section 153 becoming effective until oscillation of feedback loop 104 being detected.

As thus described, in the control apparatus of the present embodiment, when the oscillation detection signal indicates detection of oscillation within predetermined time from the inertia estimated value becoming effective, stiffness value updating section 131 switches its output value to a value corresponding to stiffness lower by a predetermined first rank than the current output value. Further, when the oscillation detection signal indicates detection of oscillation after the predetermined time from the inertia estimated value becoming effective, stiffness value updating section 131 switches its output value to a value corresponding to stiffness lower by a predetermined second rank than the current output value, wherein first rank is larger than second rank.

Embodiment 6

Figure 22:
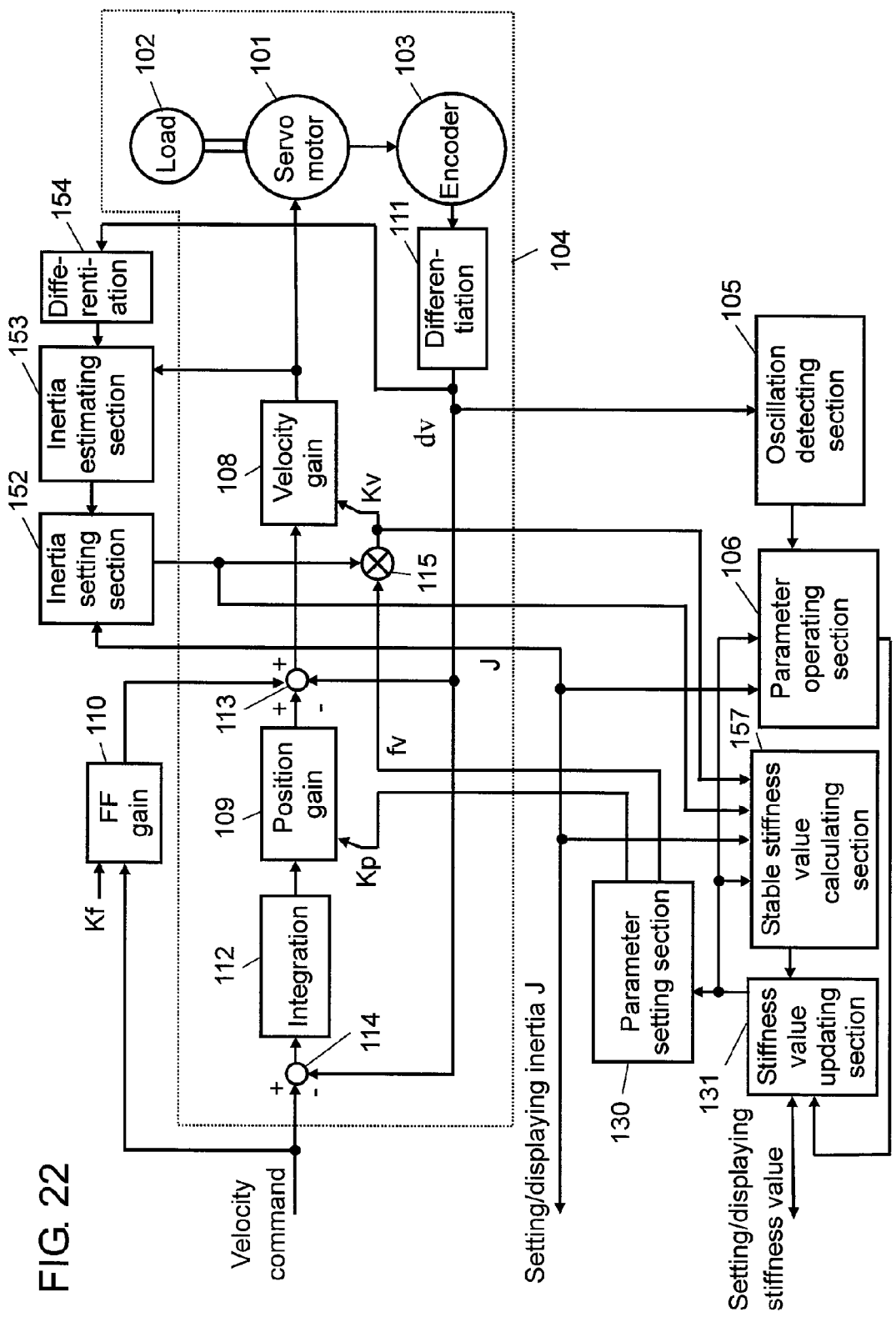
FIG. 22 is a block diagram of a servo motor control apparatus in Embodiment 6 of the present invention.

FIG. 22 is a block diagram of a servo motor control apparatus in Embodiment 6 of the present invention. In comparison with Embodiment 5, stable stiffness value calculating section 157 is further provided in Embodiment 6. It is to be noted that in FIG. 22, the same constituents as those in FIG. 8 are provided with the same reference numerals as those in FIG. 8, and detailed descriptions thereof are not given. Further, in the present embodiment, a description is given, assuming that a velocity gain calculating section is configured which multiplies an inertia set value from inertia setting section 152 and a frequency band set value by means of multiplication section 115, and outputs the obtained value as a velocity gain.

In FIG. 22, stable stiffness value calculating section 157 is supplied with an inertia initial set value from the outside, an inertia set value outputted by inertia setting section 152, an output value of multiplication section 115, and a stiffness value outputted by stiffness value updating section 131. Stable stiffness value calculating section 157 calculates a stable stiffness value based upon these supplied values, and supplies the calculated value to stiffness value updating section 131.

This stable stiffness value is calculated in accordance with a definition that the stable stiffness value is a value corresponding to the highest stiffness as a stiffness value after the output of inertia estimating section 153 becomes effective in a range where the output value of multiplication section 115, namely the velocity gain calculating section, does not increase before and after the output of inertia estimating section 153 becomes effective. Practically, the stable stiffness value is equivalent when calculated in accordance with a definition that the stable stiffness value is a stiffness value corresponding to the highest stiffness under the condition that frequency band set value is not exceeding a value of a frequency band width calculated by: fs×(Ji/Js), where the inertia initial set value is referred to as Ji, the inertia set value after the inertia estimated value becoming effective is referred to as Js, and the frequency band set value corresponding to the current stiffness value is referred to as fs. This stable stiffness value means a stiffness value capable of reliably stopping oscillation having occurred in feedback loop 104 and corresponding to the highest stiffness, and the oscillation can be reliably stopped by switching the output value of stiffness value updating section 131 to the stable stiffness value.

As thus described, an operational example of the control apparatus in the present embodiment provided with stable stiffness value calculating section 157 is described. Here, FIGS. 20 and 21 are used for describing the operation of the present control apparatus.

In FIG. 20, the inertia estimated value becomes effective at time t1, and the output value of the inertia setting section and the value of the actual moment of inertia become equal to each other, that is, the ratio of these values becomes 1.0. At this time, since the actual frequency band width of feedback loop 104 becomes larger, oscillation occurs in feedback loop 104 at time t1. Consequently, as shown in FIG. 20, the output value of the counter of oscillation continuation determining section 122 in oscillation detecting section 105 increases, and at time t2, an oscillation detection signal (H-level) indicating detection of oscillation is notified from oscillation detecting section 105 to parameter operating section 106.

At this time, when the above-described frequency band fs×(Ji/Js) is calculated, fs=100 [Hz], Ji/Js=(Ji/Jr)/(Js/Jr)=0.4/1.0=0.4, and hence: fs×(Ji/Js)=100×0.4=40 [Hz]. The stiffness value corresponding to the highest stiffness under the condition of frequency band set value fs not exceeding this value is the stiffness value of "2" from table 5. Namely, at this time, the stable stiffness value outputted from stable stiffness value calculating section 157 is the stiffness value of "2". Therefore, stiffness value updating section 131 receives an operational instruction at the time of occurrence of oscillation from parameter operating section 106, switches the stiffness value to be outputted from the current stiffness value of "4" to the stiffness value of "2" as the stable stiffness value at time t4.

Consequently, the frequency band set value fs becomes lower, and as shown in FIG. 20, the oscillation is converged, and the counter value also decreases. Thereafter, oscillation continuation determining section 122 switches the signal to an oscillation detection signal (L-level) indicating stoppage of the oscillation at time t4, and thereby a series of processing is completed. Further, the output value of stiffness value updating section 131 is inputted into set value storing section 125, and the stored stiffness value is rewritten from "4" to "2". Namely, the state returns to one similar to the state where "2" was inputted as the stiffness value from the outside.

As thus described, when the actual frequency band width of feedback loop 104 increases with increase in inertia set value outputted by inertia setting section 152, to cause occurrence of oscillation in feedback loop 104, oscillation detecting section 105 and stiffness value updating section 131 automatically perform processing of updating the stiffness value to the stable stiffness value outputted by stable stiffness value calculating section 157, and it is thereby possible to stop oscillation that occurs in feedback loop 104 in a short period of time and suppress damage inflicted to load 102 at the minimum.

Next described is an operation in the case of the stiffness value being started with 3 as shown in FIG. 21.

In FIG. 21, shown is a case where, before time t1, the inertia estimated value is not effective, and the inertia initial set value, namely the inertia set value Js at this point of time is 0.4 times as large as the value of the actual moment of inertia Jr. Further, at time t1, the inertia estimated value becomes effective, and the inertia set value and the value of the actual moment of inertia become equal to each other, that is, the ratio of these values becomes 1.0.

At this time, when the above-described frequency band fs×(Ji/Js) is calculated, fs=60 [Hz], Ji/Js=(Ji/Jr)/(Js/Jr)=0.4/1.0=0.4, and hence: fs×(Ji/Js)=60×0.4=24 [Hz]. The stiffness value corresponding to the highest stiffness under the condition of frequency band set value fs not exceeding this value is the stiffness value of "1" from table 5. Namely, at this time, the stable stiffness value outputted from stable stiffness value calculating section 157 is the stiffness value of "1".

In the case of the stiffness value being started with "4", oscillation soon occurred in feedback loop 104 at time t1, but this case is at the level on the verge of exciting the oscillation. Therefore, oscillation does not occur at time t1, and oscillation occurs in feedback loop 104 at time t2 as shown in FIG. 21. Further, in this case, it is assumed that the time from time t1 to time t2 is longer than predetermined time (e.g. 1 second). Hence oscillation is detected similarly at time t3, but the output value of stiffness value updating section 131 is updated at time t4 to the stiffness value of "2" as a value corresponding to stiffness lower, not by the stiffness value of "1" as the foregoing stable stiffness value, but by the rank of "1" with respect to the stiffness value of "3" at the time of start.

Consequently, the frequency band set value fs becomes lower, and as shown in FIG. 21, the oscillation is converged. As thus described, that the time from the output value of inertia estimating section 153 becoming effective until oscillation occurring in feedback loop 104 is long means that the stiffness value for stopping the oscillator is not significantly deviated from the stiffness value of "3" at the time of start. Therefore, in this case, a more desirable result is obtained by updating the stiffness value to the stiffness value of "2" as a value corresponding to stiffness lower by the rank of "1" with respect to the stiffness value of "3" at the time of start than updating the stiffness value to the stiffness value of "1" as the stable stiffness value.

As thus described, when oscillation of feedback loop 104 is detected beyond the predetermined time from the output of inertia estimating section 153 becoming effective, stiffness value updating section 131 performs the processing of switching its output value, regardless of a stable stiffness value of its output value, to a value corresponding to stiffness lower by the rank of "1" than the current output value. Thereby, it is possible to stop oscillation that occurs in feedback loop 104 in a short period of time, and set the output value of stiffness value updating section 131 to a more desirable stiffness value in accordance with conditions.

Figure 23:
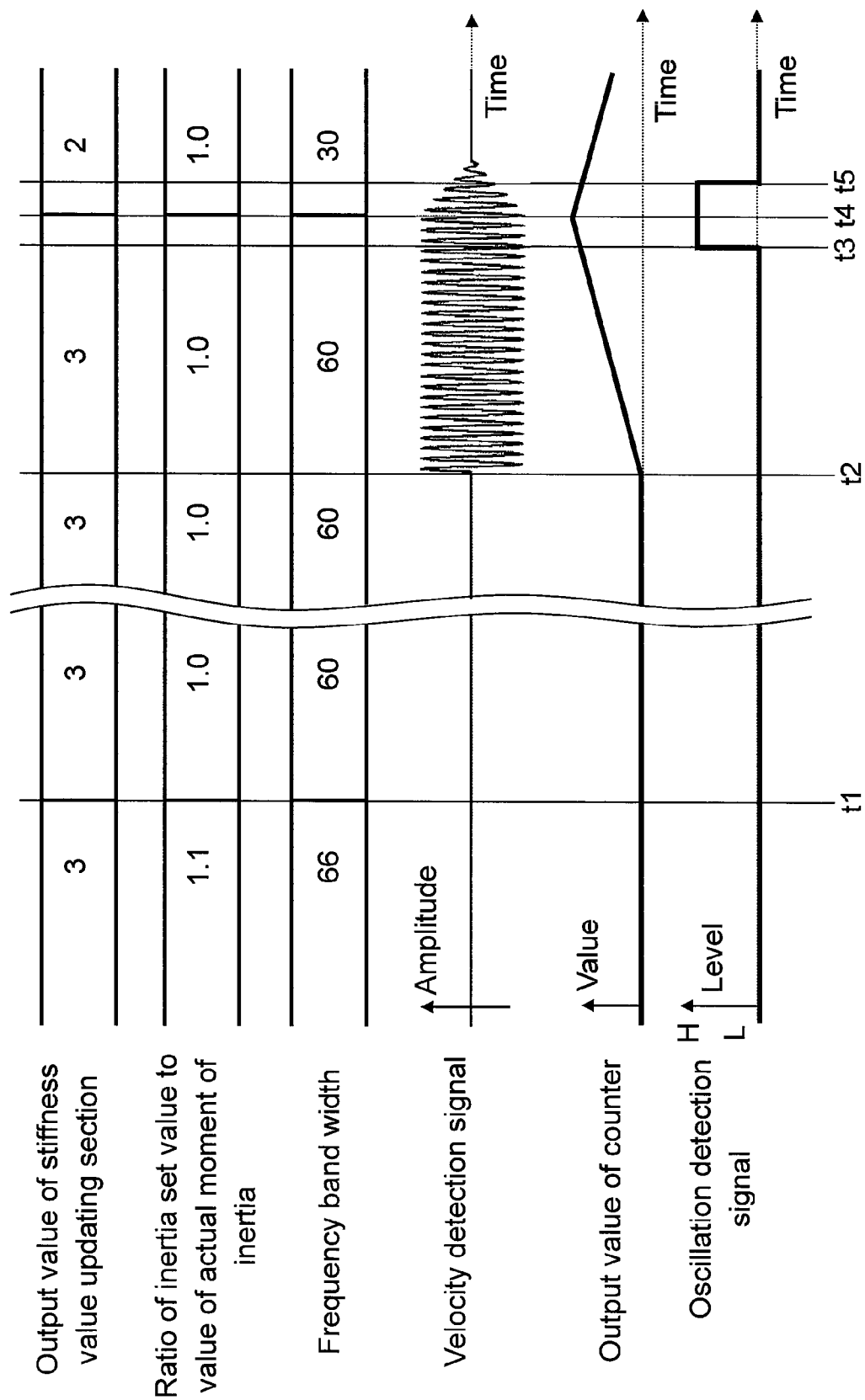
FIG. 23 is a timing chart for describing an operational example of the same control apparatus.

FIG. 23 is a timing chart for describing another operational example of the present control apparatus. Next described is an operation in the case of the stiffness value being started with "3" and the inertia initial set value, namely the inertia set value Js at this point of time, is 1.1 times as large as the value of the actual moment of inertia Jr, as shown in FIG. 23.

When the ratio of the output value of the inertia setting section to the value of the actual moment of inertia becomes 1.0 at time t1, in frequency band fs×(Ji/Js), described above, fs=60 [Hz], Ji/Js=(Ji/Jr)/(Js/Jr)=1.1/1.0=1.1, and hence: fs×(Ji/Js)=60×1.1=66 [Hz]. The stiffness value corresponding to the highest stiffness under the condition of frequency band set value fs not exceeding this value is the stiffness value of "3" from table 5. Namely, at this time, the stable stiffness value outputted from stable stiffness value calculating section 157 is the stiffness value of "3".

Since this case is at the level on the verge of exciting the oscillation, oscillation does not occur at time t1, and oscillation occurs in feedback loop 104 at time t2. Further, in this case, it is assumed that the time from time t1 to time t2 is shorter than predetermined time (e.g. 1 second). Oscillation is detected at time t3, and normally, the output value of stiffness value updating section 131 is updated at time t4 to the stiffness value of "3" as the foregoing stable stiffness value, however in this case, the stable stiffness value is not a value corresponding to stiffness lower than the current value. Therefore, the output value of stiffness value updating section 131 is updated at time t4 not to the stiffness value of "3" as the stable stiffness value but to the stiffness value of "2" as a value corresponding to stiffness lower by the rank of "1".

Consequently, the frequency band set value fs becomes lower, and the oscillation is converged. As thus described, when the inertia initial set value is larger than the output value of inertia estimating section 153, the stable stiffness value becomes a value corresponding to stiffness equal to or higher than the current stiffness. In that case, a more desirable result is obtained by updating the stiffness value to the stiffness value of "2" as a value corresponding to stiffness lower by the rank of "1" than by updating the stiffness value to the stiffness value of "3" as the stable stiffness value.

As thus described, regardless of whether or not the time from the output of inertia estimating section 153 becoming effective until oscillation of feedback loop 104 being detected is beyond the predetermined time, when the stable stiffness value outputted by stable stiffness value calculating section 157 is not a value corresponding to stiffness lower than the current stiffness value, stiffness value updating section 131 performs processing of switching its output value to a value corresponding to stiffness lower by the rank of "1" than the current output value. With such a configuration, it is possible to stop oscillator that occurs in feedback loop 104 in a short period of time, and set the output value of stiffness value updating section 131 to a more desirable stiffness value in accordance with conditions.

As thus described, the servo motor control apparatus in the present embodiment has stable stiffness value calculating section 157 which calculates, as a stable stiffness value, a value that satisfies a condition that an output value of the velocity gain calculating section after the inertia estimated value becoming effective is not higher than an output value of the velocity gain calculating section before the inertia estimated value becoming effective, and corresponds to the highest stiffness as a stiffness value after the inertia estimated value becoming effective. The control apparatus is configured such that stiffness value updating section 131 switches its output value to an output value of stable stiffness value calculating section 157 when the oscillation detection signal indicates detection of oscillation within predetermined time from the inertia estimated value becoming effective, and stiffness value updating section 131 switches its output value to a value corresponding to stiffness lower by a predetermined rank than the current output value when the oscillation detection signal indicates detection of oscillation after the predetermined time from the inertia estimated value becoming effective.

Further, the control apparatus of the present embodiment may be configured such that, when the oscillation detection signal indicates detection of oscillation within predetermined time from the inertia estimated value becoming effective and the stable stiffness value is a value corresponding to stiffness lower than the current value, the stiffness value updating section 131 switches its output value to an output value of the stable stiffness value calculating section 157, and, when the oscillation detection signal indicates detection of oscillation after the predetermined time from the inertia estimated value becoming effective, or when the oscillation detection signal indicates detection of oscillation within the predetermined time from the inertia estimated value becoming effective and the stable stiffness value is a value corresponding to stiffness not lower than the current stiffness, the stiffness value updating section 131 switches its output value to a value corresponding to stiffness lower by a predetermined rank than the current output value.

As thus described, according to the control apparatus of the present embodiment, when stiffness value updating section 131 updates to an inputted stiffness value and outputs the value and oscillation detecting section 105 detects oscillation of feedback loop 104, an operation of automatically updating the output value to the optimal value is performed. Thereby, it is possible to stop oscillation that occurs in feedback loop 104 in a short period of time, and realize a servo motor control apparatus with a small necessity for readjustment of the stiffness value from the outside.

Embodiment 7

Figure 24:
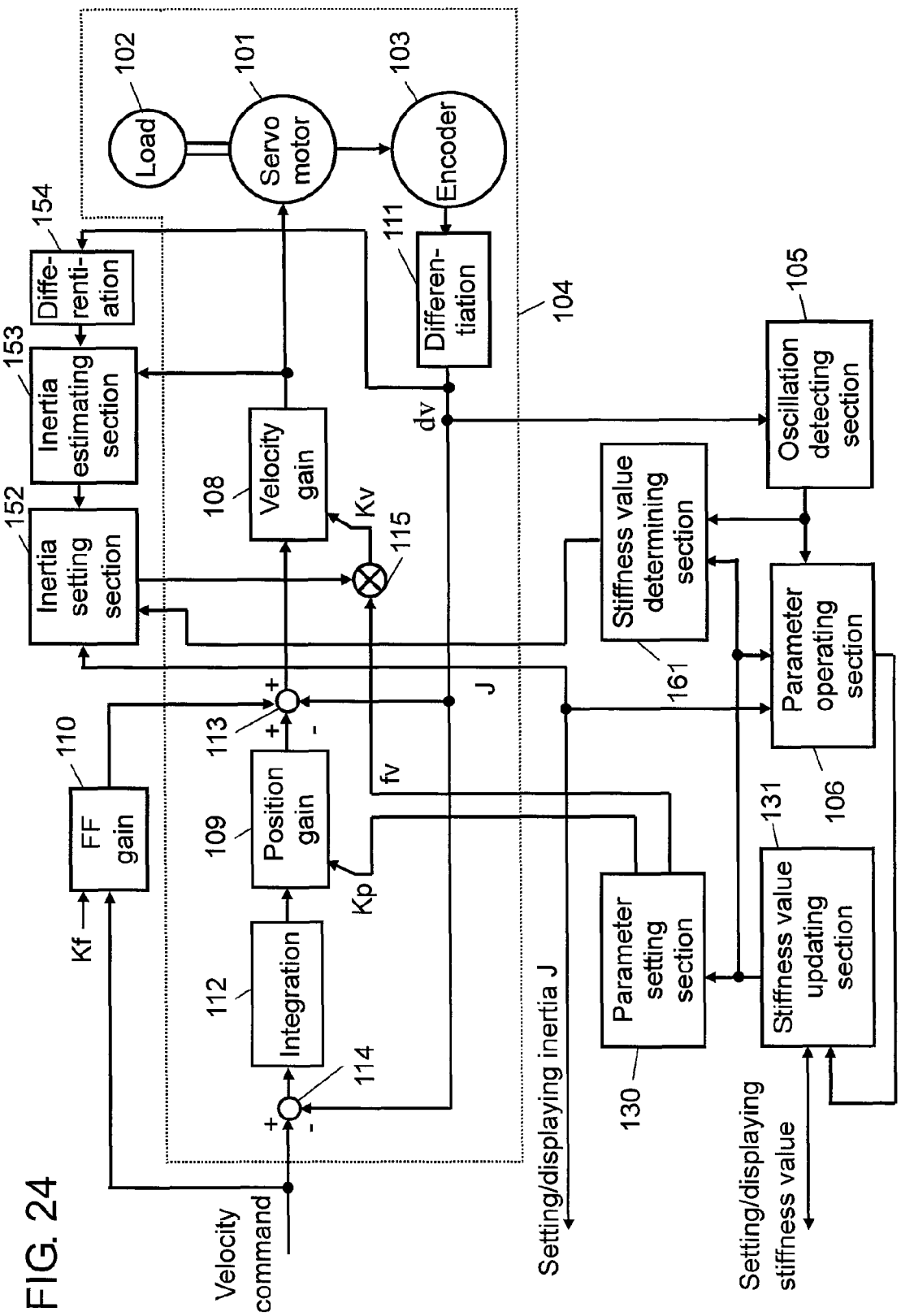
FIG. 24 is a block diagram of a servo motor control apparatus in Embodiment 7 of the present invention.

FIG. 24 is a block diagram of a servo motor control apparatus in Embodiment 7 of the present invention. In comparison with Embodiment 5, stiffness value determining section 161 is further provided in Embodiment 7. It is to be noted that in FIG. 24, the same constituents as those in FIG. 19 are provided with the same reference numerals as those in FIG. 19, and detailed descriptions thereof are not given.

In FIG. 24, stiffness value determining section 161 receives an input of an output value of stiffness value updating section 131, and determines whether or not the value is a value equal to a predetermined stiffness value or a value corresponding to stiffness lower than the predetermined stiffness value. Further, stiffness value determining section 161 receives an input of an oscillation detection signal outputted by oscillation detecting section 105, and determines whether or not oscillation has occurred in feedback loop 104. Subsequently, stiffness value determining section 161 outputs the value to inertia setting section 152 as a binary inertia reduction command signal which is an H-level signal for commanding inertia reduction when the output value of stiffness value updating section 131 is determined to be a value equal to a predetermined stiffness value or a value corresponding to stiffness lower than the predetermined stiffness value, and is determined to occur oscillation in feedback loop 104, and is an L-level signal when the output value is determined otherwise.

An operation of the servo motor control apparatus configured as above is described, citing a specific example. Further, also in the present embodiment, similar to Embodiment 5, an operation automatically and reliably stopping oscillation by the configuration shown in FIG. 24 is described, the oscillation occurring in a case where the value of velocity gain Kv increases and the actual frequency band width of feedback loop 104 increases, in the case of the inertia initial set value being larger than the value of the actual moment of inertia or in the case of a sudden change in moment of inertia of load 102.

Figure 25:
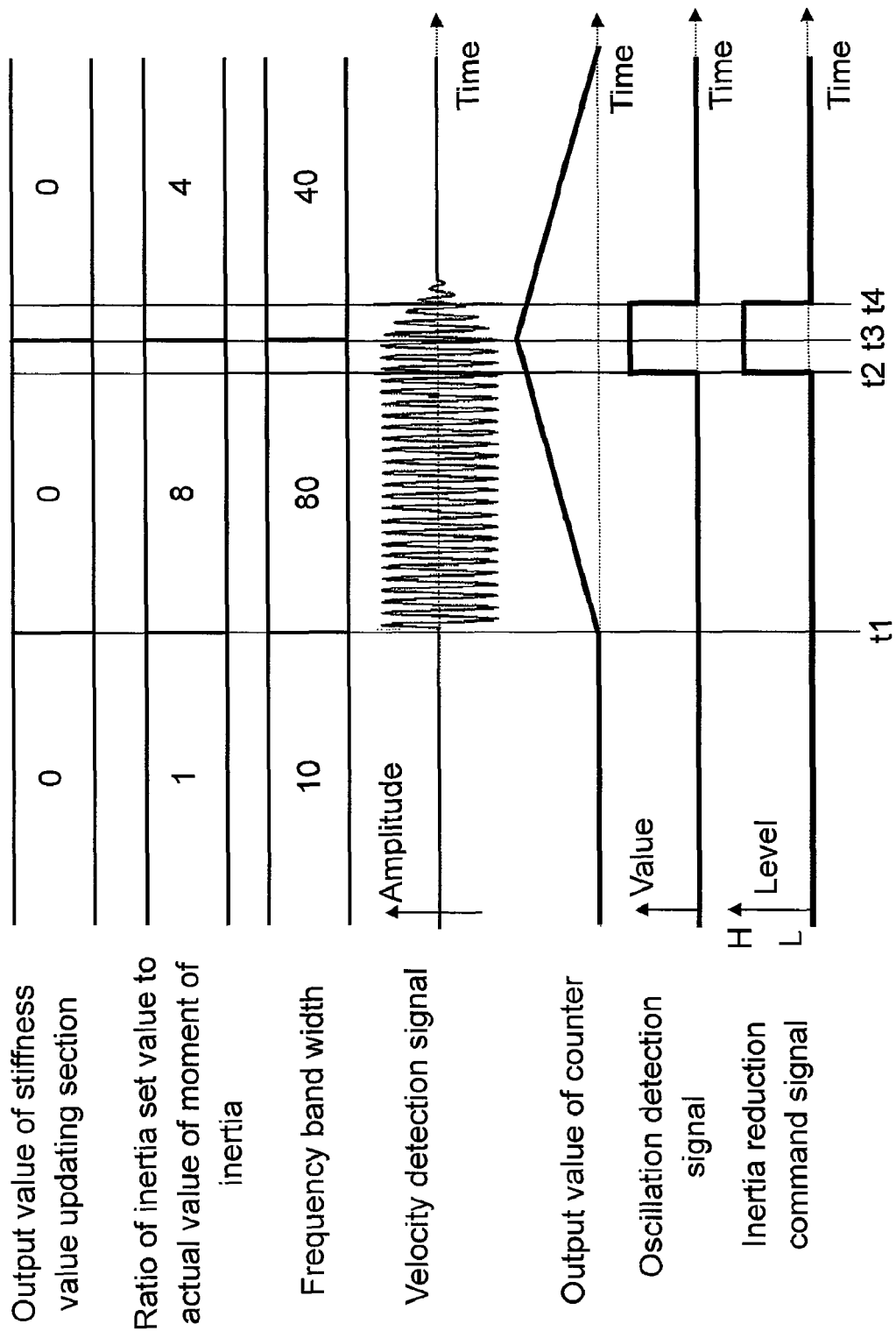
FIG. 25 is a timing chart for describing an operational example of the same control apparatus.

FIG. 25 is a timing chart for describing an operational example of the control apparatus of the present embodiment.

FIG. 25 shows a ratio of the inertia set value to the value of the actual moment of inertia, the value of the actual frequency band width fsr of feedback loop 104 (unit: Hz) and the like, along with the output value of stiffness value updating section 131. Further, as for the stiffness value and the control parameters corresponding thereto, the respective values shown in table 5 are used. As oscillation detecting section 105, an example is used where oscillation continuation determining section 122 as shown in FIG. 3 includes the counter as described above.

In FIG. 25, such an example is cited where, before time t1, the inertia estimated value as the output value of inertia estimating section 153 is effective, and the inertia set value Js is equal to the value of the actual moment of inertia Jr, that is, 1.0 time as large. Since the frequency band set value fs is 10 (Hz) with respect to the stiffness value of "1" from table 5, actual frequency band width fsr is: fsr=10×1.0=10 (Hz).

Further, at time t1, the moment of inertia of load 102 suddenly changes to one eighth of the value up to this point, and the inertia set value as the output value of inertia setting section 152 becomes eight times as large as the value of the actual moment of inertia. In this case, actual frequency band width fsr is: fsr=10×8=80 (Hz). Further, since the actual frequency band width of feedback loop 104 becomes larger, oscillation occurs in feedback loop 104 at time t1.

When such oscillation occurs, as shown in FIG. 25, the output value of the counter of oscillation continuation determining section 122 in oscillation detecting section 105 increases, and at time t2, an oscillation detection signal (H-level) indicating detection of oscillation is outputted from oscillation detecting section 105.

Stiffness value determining section 161 receives this oscillation detection signal, and at this time, the output value of stiffness value updating section 131 is equal to the stiffness value of "0" as the predetermined stiffness value. Therefore, as shown in FIG. 25, at time t2, stiffness value determining section 161 outputs to inertia setting section 152 an H-level value directing to reduce the inertia as the inertia reduction command signal.

Upon receipt of this inertia reduction command signal, inertia setting section 152 switches the inertia set value to a value reduced to a half of the current output value, and outputs the reduced value at time t3. Hence, as shown in FIG. 25, at time t3, the inertia set value changes from eight times to four times as large as the value of the actual moment of inertia.

Consequently, the value of actual frequency band width fsr of feedback loop 104 is also: fsr=10×4=40 (Hz). With this having led to a sufficient decrease in value of actual frequency band width fsr, the oscillation is converged, and along with the convergence, the counter value also decreases. Thereafter, at time t4, oscillation continuation determining section 122 switches the signal to an oscillation detection signal (L-level) indicating stoppage of the oscillation, and thereby a series of processing is completed.

As thus described, due to an apparent relative increase in inertia set value outputted by inertia setting section 152, the actual frequency band width of feedback loop 104 increases, and even when oscillation occurs in feedback loop 104, stiffness value determining section 161 automatically performs processing of reducing the inertia set value at a predetermined ratio, while judging the output value of stiffness value updating section 131. Therefore, according to the control apparatus of the present embodiment, it is possible to reliably stop oscillation that occurs in feedback loop 104, and keep damage which is inflicted to load 102 small.

Here, such an example was cited where, upon receipt of the inertia reduction command signal, inertia setting section 152 switches the inertia set value to be outputted to a value reduced into a half of the current output value and outputs the value, but the output value may be switched to a value not reduced into a half, but reduced at another ratio, and then outputted. In this case, there is a possibility that the inertia set value becomes excessively lower than the actual moment of inertia when the ratio for the reduction is high, and on the other hand, there is a possibility that it takes a long time until the oscillation stops when the ratio for the reduction is low. Therefore, the ratio for the reduction may be decided with both the advantage and disadvantage taken into consideration.

Further, the example of the predetermined stiffness value being the stiffness value of "0" was cited here. Basically, it is normal to select a value corresponding to the lowest stiffness as the predetermined stiffness value, but the predetermined stiffness value may not necessarily be the value corresponding to the lowest stiffness. Namely, for example, in this case, the predetermined stiffness value may be the stiffness value of "1". However, this predetermined stiffness value needs to be a stiffness value that reliably stops oscillation that occurs in feedback loop 104 when the inertia set value is a value equal to the actual moment of inertia.

Figure 26:
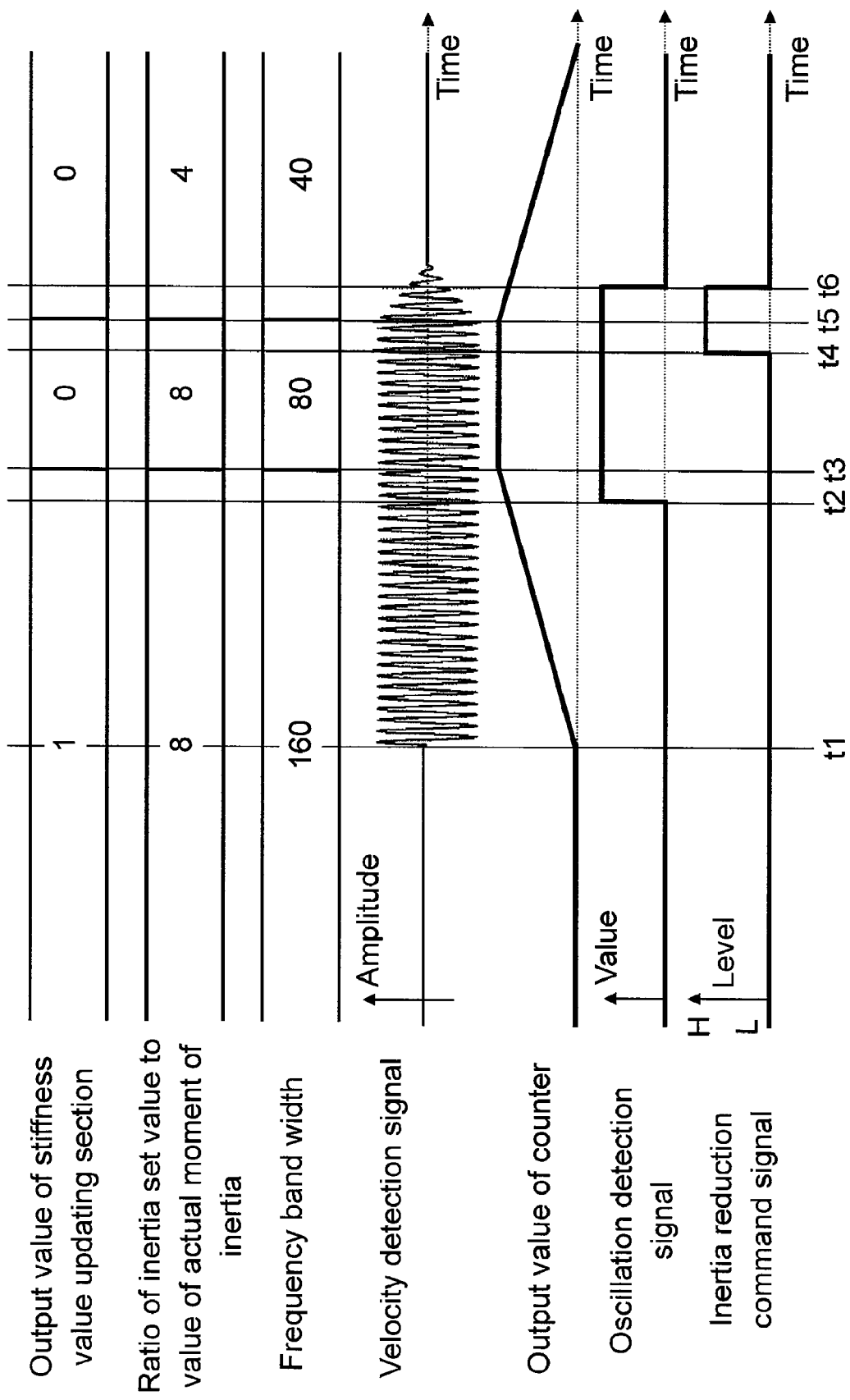
FIG. 26 is a timing chart for describing another operational example of the same control apparatus.

FIG. 26 is a timing chart for describing another operational example of the control apparatus of the present embodiment. Next described is an operation in a case where the stiffness value is started with "1" as shown in FIG. 26. FIG. 26 shows such a case where, as the inertia initial set value with respect to inertia setting section 152, a value eight times as large as the actual moment of inertia is set. In this case, since the frequency band set value fs is 20 (Hz) with respect to the stiffness value of "1" from table 5, actual frequency band width fsr of feedback loop 104 is: fsr=20×8=160 (Hz). Further, FIG. 26 shows such a case where, although the servo is turned on at time t1, oscillation occurs in feedback loop 104 at time t1 due to large actual frequency band width fsr. Namely, as shown in FIG. 26, since the counter value inside oscillation continuation determining section 122 becomes the predetermined value or larger at time t2, the oscillation detection signal shifts to the H-level indicating occurrence of oscillation at time t2.

Stiffness value determining section 161 receives this oscillation detection signal, and at this time, since the output value of stiffness value updating section 131 is the stiffness value of "1" which is a value corresponding to stiffness higher than the stiffness value of "0" as the predetermined stiffness value, stiffness value determining section 161 holds the value at the L-level as the inertia reduction command signal, and is thus in the state of not directing reduction in inertia.

On the other hand, upon receipt of the H-level value indicating occurrence of oscillation by means of this oscillation detection signal, stiffness value updating section 131 outputs at time t3 the stiffness value of "0" lower by a predetermined rank from the current stiffness value of "1", as the stiffness value to be outputted.

Thereby, the frequency band set value fs becomes lower, and as shown in FIG. 26, actual frequency band width fsr of feedback loop 104 is also: fsr=10×8=80 (Hz). However, since this is not low enough to stop the oscillation, as shown in FIG. 26, the oscillation undesirably continues without being converged after time t3. This is caused by the fact that the inertia set value outputted by inertia setting section 152, namely the inertia initial set value, is significantly larger than the value of the actual moment of inertia.

However, since the output value of stiffness value updating section 131 is becomes equal to the stiffness value of "0" as the predetermined stiffness value, as shown in FIG. 26, stiffness value determining section 161 outputs at time t4 the H-level value directing reduction in inertia to inertia setting section 152 as the inertia reduction command signal. Upon receipt of this inertia reduction command signal, inertia setting section 152 switches the inertia set value to be outputted to a value reduced into a half of the current output value and outputs the value at time t5. Therefore, at time t5, the output value of inertia setting section 152 changes from eight times to four times as large as the value of the actual moment of inertia.

Consequently, as shown in FIG. 26, actual frequency band width fsr of feedback loop 104 is also: fsr=10×4=40 (Hz). As thus described, since actual frequency band width fsr has sufficiently decreased, the oscillation is converged, and along with the convergence, the counter value also decreases. Thereafter, at time t6, oscillation continuation determining section 122 switches the signal to the oscillation detection signal (L-level) indicating stoppage of the oscillation, and thereby a series of processing is completed.

As thus described, even when oscillation occurs in feedback loop 104 due to the inertia initial set value being a larger value than the actual moment of inertia, stiffness value determining section 161 automatically performs processing of reducing the output value of inertia setting section 152 at a predetermined ratio while judging the output value of stiffness value updating section 131. Thereby, it is possible to reliably stop oscillation that occurs in feedback loop 104, and keep damage which is inflicted to load 102 small.

It is to be noted that even when actual frequency band width fsr of feedback loop 104 does not become a sufficiently low value and oscillation that occurs in feedback loop 104 does not stop as a result of switching the inertia set value outputted by inertia setting section 152 to a value reduced into a half of the current output value and outputting the reduced value, it is possible to reliably stop the oscillation by repeating the above series of processing until stoppage of the oscillation. However, it is required that frequency band set value fs corresponding to the predetermined stiffness value is a sufficiently low frequency.

Embodiment 8

Figure 27:
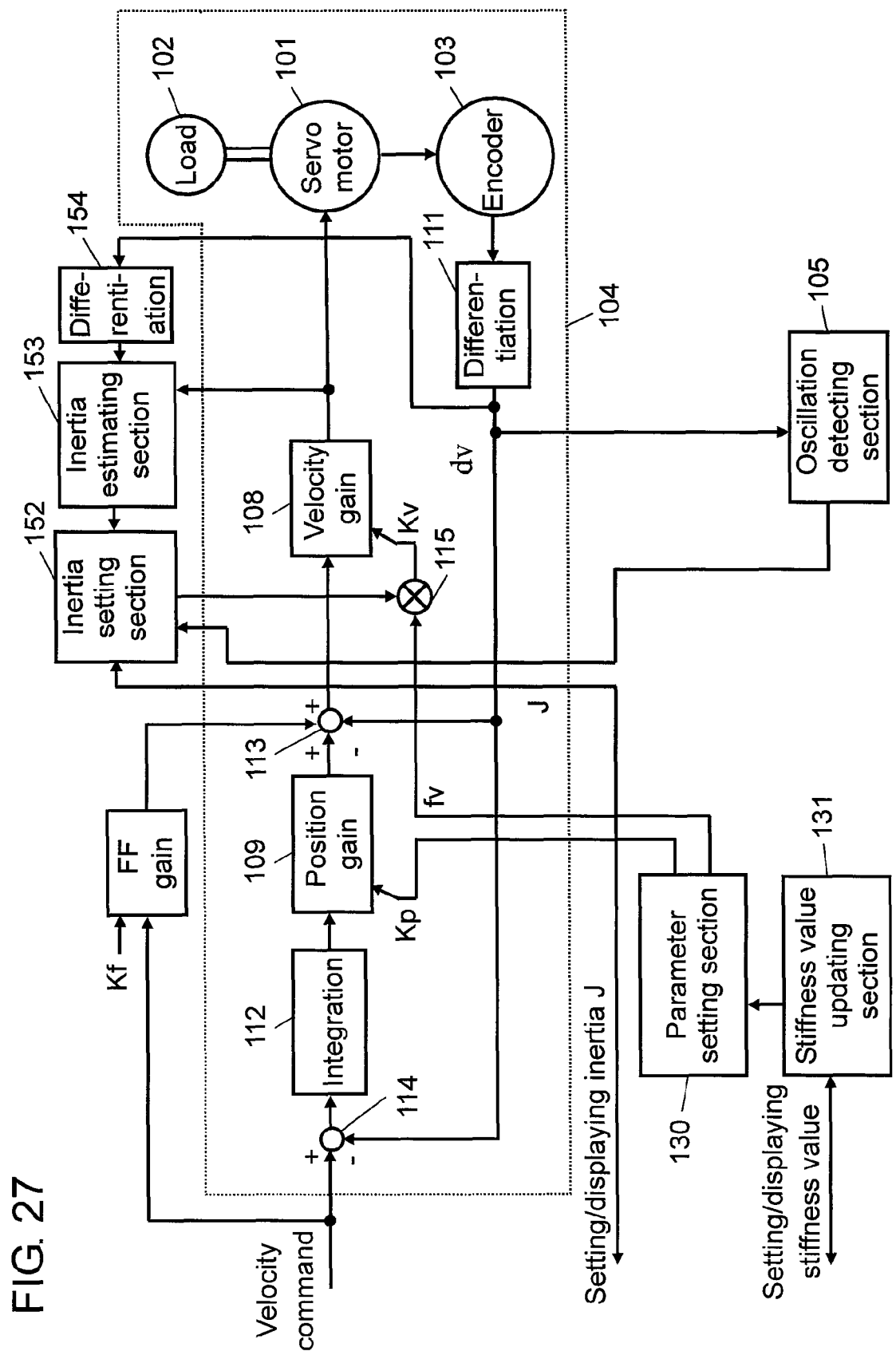
FIG. 27 is a block diagram of a servo motor control apparatus in Embodiment 8 of the present invention.

FIG. 27 is a block diagram of a servo motor control apparatus in Embodiment 8 of the present invention. It is to be noted that in FIG. 27, the same constituents as those in FIG. 24 are provided with the same reference numerals as those in FIG. 24, and detailed descriptions thereof are not given.

In comparison with Embodiment 7, in Embodiment 8, stiffness value determining section 161 is not provided and the oscillation detection signal of oscillation detecting section 105 is directly supplied to inertia setting section 152. Further, although the oscillation detection signal is inputted into stiffness value updating section 131 in FIG. 24, the oscillation detection signal is not inputted into stiffness value updating section 131 in FIG. 27.

An operation of the servo motor control apparatus configured as above is described, citing a specific example. It is to be noted that, as for the stiffness value and the control parameters corresponding thereto, the respective values shown in table 5 are used. As oscillation detecting section 105, an example is used where oscillation continuation determining section 122 as shown in FIG. 3 includes the counter as described above.

Figure 28:
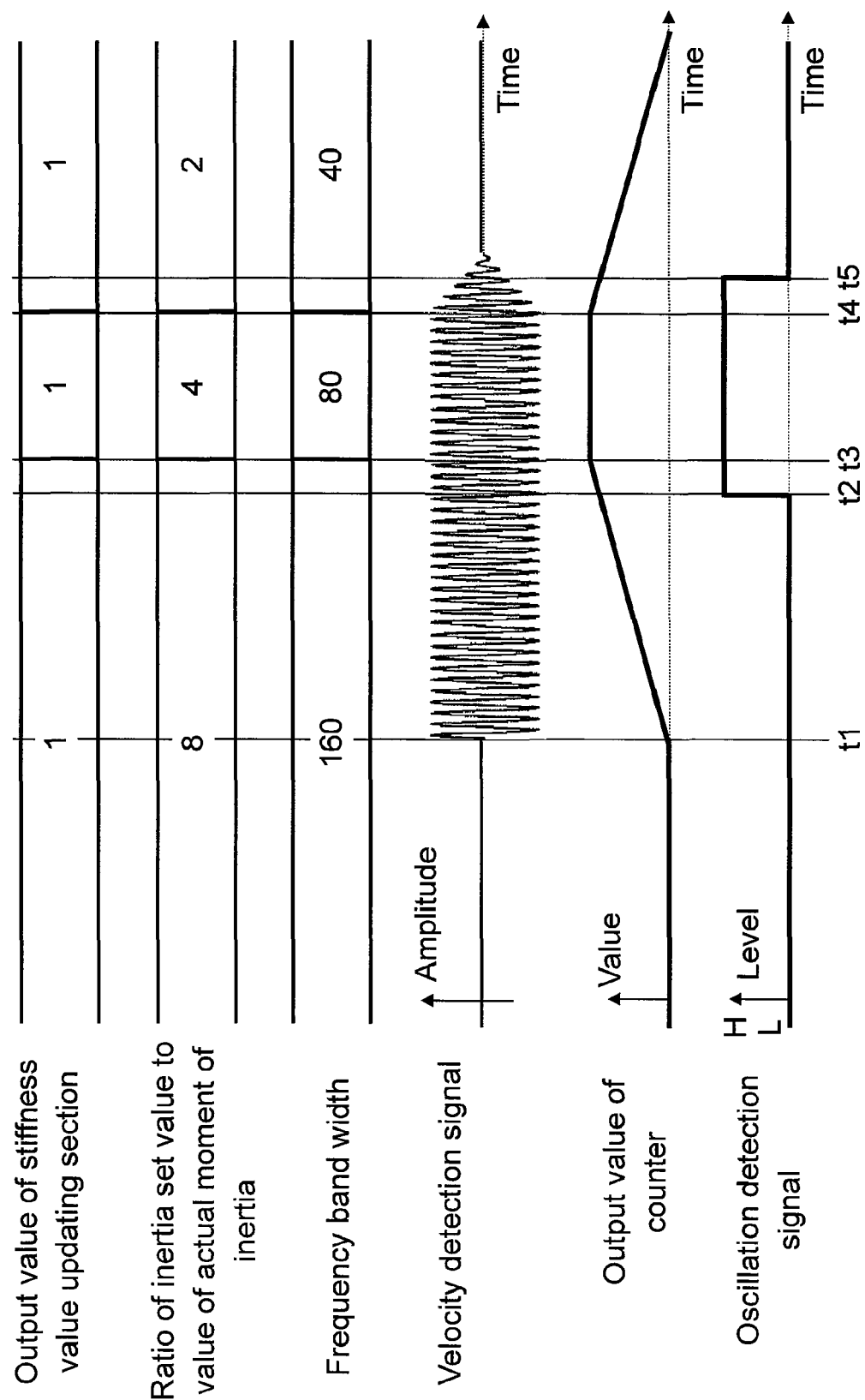
FIG. 28 is a timing chart for describing an operational example of the same control apparatus.
Figure 29:
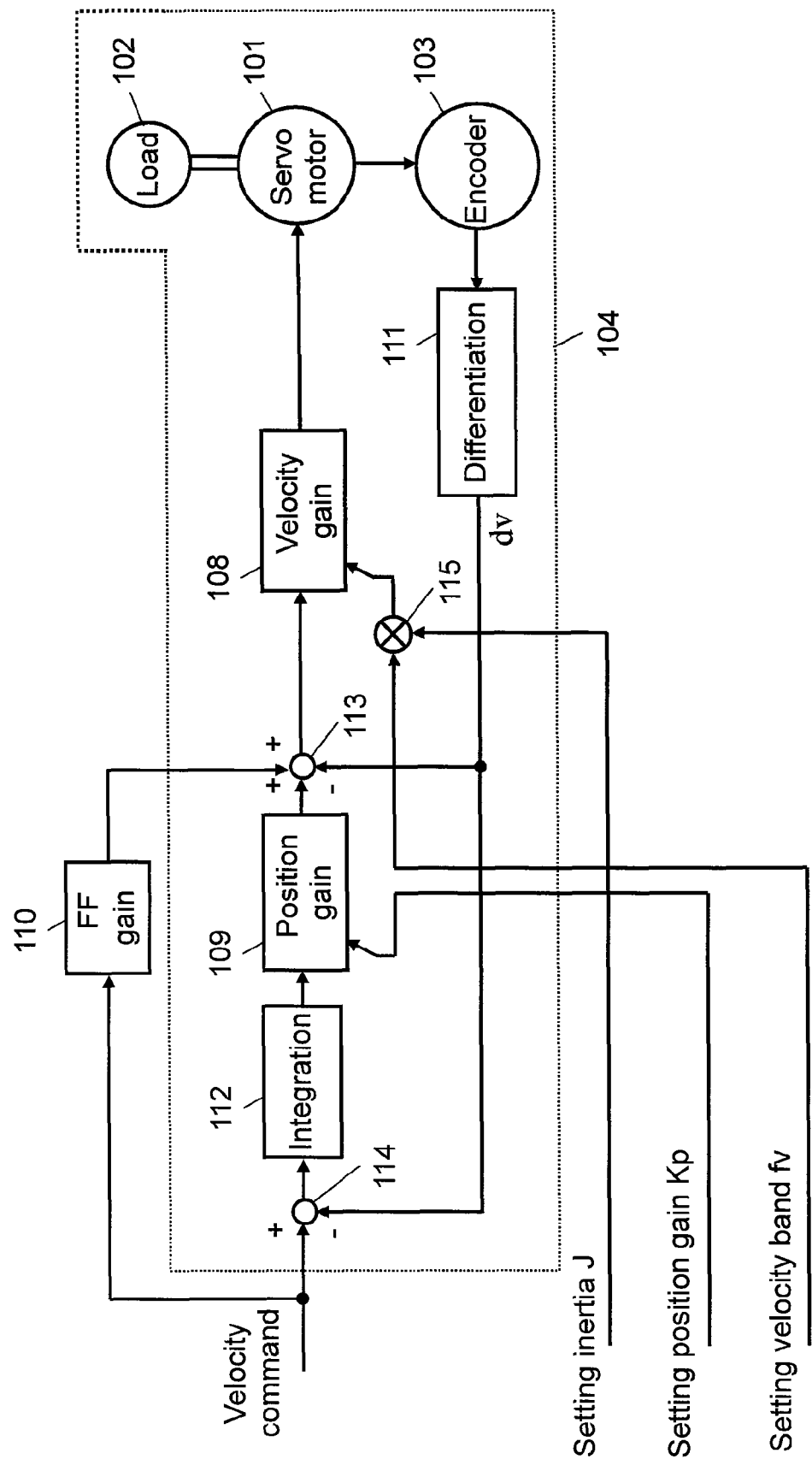
FIG. 29 is a block diagram showing a constitutional example of a conventional servo motor control apparatus.

FIG. 28 is a timing chart for describing an operational example of the control apparatus of the present embodiment. An operation in a case where the stiffness value is started with "1" and a value eight times as large as the actual moment of inertia is set at this time as the inertia initial set value with respect to inertia setting section 152, as shown in FIG. 28, is described. In this case, the value of frequency band set value fs is 20 (Hz) with respect to the stiffness value of "1" from table 5, actual frequency band width fsr of feedback loop 104 is: fsr=20×8=160 (Hz). Further, FIG. 28 shows such a case where, although the servo is turned on at time t1, oscillation occurs in feedback loop 104 at time t1 due to large actual frequency band width fsr. Namely, as shown in FIG. 28, since the counter value inside oscillation continuation determining section 122 becomes the predetermined value or larger at time t2, the oscillation detection signal shifts to the H-level indicating occurrence of oscillation at time t2.

Upon receipt of this oscillation detection signal, inertia setting section 152 switches its output value to the value reduced into a half of the current output value at time t3. Hence, as shown in FIG. 28, at time t3, the inertia set value changes from eight times to four times as large as the value of the actual moment of inertia.

Accordingly, as shown in FIG. 28, the actual frequency band width fsr of feedback loop 104 is: fsr=20×4=80 (Hz). However, since this is not low enough to stop the oscillation, as shown in FIG. 28, oscillation undesirably continues without being converged after time t3. Further, as shown in FIG. 28, the oscillation detection signal also remains at the H-level indicating detection of oscillation. Upon receipt of this, inertia setting section 152 switches its output value to a value reduced into a half of the current output value at time t4. Therefore, as shown in FIG. 28, at time t4, the output value of inertia setting section 152 changes from four times to twice the value of the actual moment of inertia.

Consequently, as shown in FIG. 28, actual frequency band width fsr of feedback loop 104 is also: fsr=20×2=40 (Hz). Since actual frequency band width fsr has sufficiently decreased, the oscillation is converged, and along with the convergence, the counter value also decreases. Thereafter, at time t6, oscillation continuation determining section 122 switches the signal to the oscillation detection signal (L-level) indicating stoppage of the oscillation, and thereby a series of processing is completed.

As thus described, depending upon conditions, even when the output value of stiffness value updating section 131 does not change, oscillation having occurred in feedback loop 104 can be stopped by inertia setting section 152 reducing its output value. However, the case where such an operation is possible is limited to a case where it is clear that the oscillation is caused by a deviation between the output value of the inertia setting section and the value of the actual moment of inertia and the output value of the actual inertia setting section becomes a value close to the value of the actual moment of inertia without changing the stiffness value, thereby stopping the oscillation. In such a case, since the oscillation stops without a decrease in stiffness value even when oscillation occurs in the feedback loop, it is possible to obtain a merit of being capable of keeping the optimal response to a velocity command or a position command without readjustment of the stiffness value.

As thus described, a servo motor control apparatus capable of reliably stopping oscillation that occurs in feedback loop 104 can be realized such that inertia setting section 152 performs an operation of automatically reducing its output value when oscillation detecting section 105 detects oscillation of feedback loop 104.

It is to be noted that in each of the foregoing embodiments, all sections required for the present invention are included in the same control apparatus, but each section may be included in a separate apparatus.

Further, the description was given in each of the foregoing embodiments, citing the example of the embodiment configured of the function block as shown in each block diagram, however for example, a servo motor control method may be employed which is realized by execution of processing in each block stepwise in accordance with a procedure. Specifically, a configuration may be formed where such a program as to sequentially execute steps corresponding to processing in respective blocks is stored into a memory or the like, and for example, a CPU such as a microprocessor sequentially reads the program stored in the memory, and executes processing in accordance with the read program.

Namely, for example, as a control procedure of the servo motor, a program is stored into the memory, the program including the steps of: detecting oscillation of the feedback loop; performing operational control on setting of a control parameter in the control parameter group of the feedback loop based upon detection of the oscillation; and being supplied with a set value for setting a control parameter and setting the control parameter in the feedback loop while making an update thereon in accordance with the operational control, wherein a control parameter in accordance with the supplied set value is set in the feedback loop by the operation control when the oscillation is not detected, and such a control parameter as to narrow a frequency band width of the feedback loop is set in the feedback loop by the operational control when the oscillation is detected. Then, the microprocessor sequentially reads this program stored in the memory and executes processing in accordance with the read program, to allow realization of the servo motor control method of the present invention.

Further, although the servo motor of Embodiment 4 has notch filter 141, this notch filter 141 may be applied to the servo motor of the other embodiment.

INDUSTRIAL APPLICABILITY

The servo motor control apparatus of the present invention is capable of promptly stopping oscillation, and adjusting control parameters smoothly in a short period of time while suppressing damage inflicted to a load at the minimum, and hence is useful as a control apparatus for a servo motor or other motor having a function of adjusting a variety of control parameters.

The invention claimed is:

1. A servo motor control apparatus, having a feedback loop which obtains an amount of deviations from command information notified from outside and information on a rotational operation detected by a detection section, performs arithmetic operation processing on the deviation amount by use of a predetermined control parameter group including a control gain, and controls a rotational operation of a servo motor by a rotation control signal generated by the arithmetic operation processing, to perform feedback control such that the rotational operation of the servo motor tracks the command information, the apparatus comprising:
    an oscillation detecting section, which detects oscillation of the feedback loop, to output an oscillation detection signal indicating a result of the detection;
    a parameter operating section, which gives an operational instruction to set a control parameter in the control parameter group of the feedback loop based upon the oscillation detection signal; and
    an updating section, which is supplied with a set value for setting a control parameter, and sets the control parameter in the feedback loop while making an update thereon in accordance with the operational instruction given by the parameter operating section, wherein the updating section includes:
    a stiffness value updating section, which is supplied with a stiffness value in accordance with stiffness of a load of the servo motor as the set value, and outputs the stiffness value while making an update thereon in accordance with an operational instruction of the parameter operating section; and
    a parameter setting section, which converts the stiffness value of the stiffness value updating section into a plurality of control parameter values, and supplies each of the converted control parameter values to the feedback loop, to set the values therein, and
    when the oscillation detection signal indicates detection of oscillation, in accordance with an operational instruction of the parameter operating section, the stiffness value updating section returns a most recently updated and set stiffness value back to a previous stiffness value, and supplies this turned-back stiffness value to the parameter setting section;
    when the oscillation detection signal indicates no detection of oscillation, the parameter operating section gives the updating section an operational instruction to set a control parameter in accordance with the supplied set value, and
    when the oscillation detection signal indicates detection of oscillation, the parameter operating section gives the updating section an operational instruction to set such a control parameter as to narrow a frequency band width of the feedback loop.

2. The servo motor control apparatus according to claim 1, wherein
    when the oscillation detection signal indicates detection of oscillation, in accordance with an operational instruction of the parameter operating section, the updating section sets a control parameter in the feedback loop so as to narrow the frequency band width by a change in setting of the control gain.

3. The servo motor control apparatus according to claim 1, wherein
    when the oscillation detection signal indicates detection of oscillation, in accordance with an operational instruction of the parameter operating section, the updating section returns a most recently updated and set control parameter back to a previous control parameter, and sets the turned-back control parameter in the feedback loop.

4. The servo motor control apparatus according to claim 1, wherein
    when a state of the feedback loop changes from a dormant state to an active state, the stiffness value updating section sets a value as the output value before the update, the value corresponding to predetermined stiffness with which the oscillation of the feedback loop is expected to stop reliably.

5. The servo motor control apparatus according to claim 1, wherein
    the feedback loop includes:
    a notch filter for suppressing oscillation; and
    a center frequency adjusting section, which adjusts a center frequency of the notch filter to minimize oscillation of the feedback loop, and
    the stiffness value updating section does not update the output value thereof while the center frequency adjusting section adjusts the center frequency of the notch filter.

6. The servo motor control apparatus according to claim 1, wherein
    the updating section includes:
    a stiffness value updating section, which is supplied with a stiffness value in accordance with stiffness of a load of the servo motor as the set value, and outputs the stiffness value while making an update thereon in accordance with an operational instruction of the parameter operating section; and
    a parameter setting section, which converts the stiffness value of the stiffness value updating section into a plurality of control parameter values, and supplies each of the converted control parameter values to the feedback loop, to set the values therein, and
    when the oscillation detection signal indicates detection of oscillation, in accordance with an operational instruction of the parameter operating section, the stiffness value updating section compares a current updated output value with the output value before the update, and updates the output value thereof to a value corresponding to stiffness lower by a predetermined rank than the current updated output value in either a case of the output value before the update being a value corresponding to higher stiffness or a case of the current updated output value and the output value before the update being equal to each other, to supply the updated value to the parameter setting section.

7. The servo motor control apparatus according to claim 1, wherein
the updating section includes:
a stiffness value updating section, which is supplied with a stiffness value in accordance with stiffness of a load of the servo motor as the set value, and outputs the stiffness value while making an update thereon in accordance with an operational instruction of the parameter operating section; and
a parameter setting section, which converts the stiffness value of the stiffness value updating section into a plurality of control parameter values, and supplies each of the converted control parameter values to the feedback loop, to set the values therein, and
when the oscillation detection signal indicates detection of oscillation, in accordance with an operational instruction of the parameter operating section, the stiffness value updating section
compares a current updated output value with the output value before the update,
returns the output value thereof back to the output value before the update when the output value before the update is a value corresponding to lower stiffness and unless not less than predetermined time has elapsed since the update of the output value,
updates the output value thereof to a value corresponding to stiffness lower by a predetermined rank than the current updated output value in any of a case of the output value before the update is a value corresponding to higher stiffness, a case of the current updated output value and the output value before the update being equal to each other, and a case of not less than the predetermined time having elapsed, and
supplies the updated value to the parameter setting section.

8. The servo motor control apparatus according to claim 1, further comprising:
an inertia estimating section, which estimates a moment of inertia of the servo motor and a load thereof, to output an inertia estimated value generated by the estimation; and
an inertia setting section, which outputs as an inertia set value being a value of the moment of inertia, the inertia estimated value after the value becomes effective, or an inertia value set as the moment of inertia before the inertia estimated value becomes effective, wherein
the updating section includes:
a stiffness value updating section, which is supplied with a stiffness value in accordance with stiffness of a load of the servo motor as the set value, and outputs the stiffness value while making an update thereon in accordance with an operational instruction of the parameter operating section; and
a parameter setting section, which converts the stiffness value of the stiffness value updating section into a plurality of control parameter values, and supplies each of the converted control parameter values to the feedback loop, to set the values therein, and
when the oscillation detection signal indicates detection of oscillation after the inertia estimated value becomes effective, in accordance with an operational instruction of the parameter operating section, the stiffness value updating section switches the stiffness value thereof to a value corresponding to stiffness lower by a predetermined rank than the current value, to supply the switched value to the parameter setting section.

9. The servo motor control apparatus according to claim 8, wherein
when the oscillation detection signal indicates detection of oscillation within predetermined time from the inertia estimated value becoming effective, the stiffness value updating section switches the output value thereof to a value corresponding to stiffness lower by a predetermined first rank than the current output value, and
when the oscillation detection signal indicates detection of oscillation after the predetermined time from the inertia estimated value becoming effective, the stiffness value updating section switches the output value thereof to a value corresponding to stiffness lower by a predetermined second rank than the current output value, and
the predetermined first rank has a larger value than the predetermined second rank.

10. The servo motor control apparatus according to claim 8, further having:
a velocity gain calculating section, which multiplies a set value of the moment of inertia of the servo motor and the load thereof by a frequency band set value, to output an obtained value as a velocity gain; and
a stable stiffness value calculating section, which calculates as a stable stiffness value a value that satisfies a condition that an output value of the velocity gain calculating section after the inertia estimated value becomes effective is not more than an output value of the velocity gain calculating section before the inertia estimated value becomes effective, and corresponds to the highest stiffness as a stiffness value after the inertia estimated value becomes effective, wherein
when the oscillation detection signal indicates detection of oscillation within predetermined time from the inertia estimated value becoming effective, the stiffness value updating section switches the output value thereof to an output value of the stable stiffness value calculating section, and,
when the oscillation detection signal indicates detection of oscillation after the predetermined time from the inertia estimated value becoming effective, the stiffness value updating section switches the output value thereof to a value corresponding to stiffness lower by a predetermined rank than the current output value.

11. The servo motor control apparatus according to claim 10, wherein
when the oscillation detection signal indicates detection of oscillation within predetermined time from the inertia estimated value becoming effective and the stable stiffness value is a value corresponding to stiffness lower than the current value, the stiffness value updating section switches the output value thereof to an output value of the stable stiffness value calculating section, and,
when the oscillation detection signal indicates detection of oscillation after the predetermined time from the inertia estimated value becoming effective, or when the oscillation detection signal indicates detection of oscillation within the predetermined time from the inertia estimated value becoming effective and the stable stiffness value is a value corresponding to stiffness not less than the current stiffness, the stiffness value updating section switches an output value thereof to a value corresponding to stiffness lower by a predetermined rank than the current output value.

12. The servo motor control apparatus according to claim 1, further including:
an inertia estimating section, which estimates a moment of inertia of the servo motor and a load thereof, to output an inertia estimated value generated by the estimation; and
an inertia setting section, which outputs either the inertia estimated value or an inertia value set as the moment of inertia as an inertia set value, wherein
when the oscillation detection signal indicates detection of oscillation, the inertia setting section switches the output value thereof to a value reduced at a predetermined ratio with respect to the current output value.

13. The servo motor control apparatus according to claim 12, wherein
the updating section includes:
a stiffness value updating section, which is supplied with a stiffness value in accordance with stiffness of a load of the servo motor as the set value, and outputs the stiffness value while making an update thereon in accordance with an operational instruction of the parameter operating section; and
a parameter setting section, which converts the stiffness value of the stiffness value updating section into a plurality of control parameter values, and supplies each of the converted control parameter values to the feedback loop, to set the values therein,
the section further including:
a stiffness value determining section, which outputs an inertia reduction command signal to the inertia setting section upon receipt of the oscillation detection signal and the stiffness value outputted by the stiffness value updating section, and
when the oscillation detection signal indicates detection of oscillation, upon determination of an output value of the stiffness value updating section as being a value equal to a predetermined stiffness value or a value corresponding to stiffness lower than the predetermined stiffness value, the stiffness value determining section gives the inertia setting section a command to switch the output value thereof to a value reduced at a predetermined ratio with respect to the current output value.

14. A servo motor control method, for a servo motor having a feedback loop which obtains an amount of deviations from command information notified from outside and information on a rotational operation detected by a detection section, performs arithmetic operation processing on the deviation amount by use of a predetermined control parameter group including a control gain, and controls a rotational operation of the servo motor by a rotation control signal generated by the arithmetic operation processing, to perform feedback control such that the rotational operation of the servo motor tracks the command information, the method comprising the steps of:
detecting oscillation of the feedback loop;
performing operational control on setting of a control parameter in the control parameter group of the feedback loop based upon detection of the oscillation; and
being supplied with a set value for setting a control parameter and setting the control parameter in the feedback loop while making an update thereon in accordance with the operational control, wherein being supplied with a stiffness value in accordance with stiffness of a load of the servo motor as the set value, and outputting the stiffness value while making an update thereon,
converting the stiffness value into a plurality of control parameter values, and supplying each of the converted control parameter values to the feedback loop, to set the values therein, and
when the oscillation is detected, a most recently updated and set stiffness value is returned back to a previous stiffness value for the converting of the stiffness value into the plurality of control parameter values,
when the oscillation is not detected, a control parameter in accordance with the supplied set value is set in the feedback loop by the operation control, and
when the oscillation is detected, such a control parameter as to narrow a frequency band width of the feedback loop is set in the feedback loop by the operational control.

\* \* \* \* \*